United States Patent [19]
Rowney et al.

[11] Patent Number: 5,996,076
[45] Date of Patent: Nov. 30, 1999

[54] SYSTEM, METHOD AND ARTICLE OF MANUFACTURE FOR SECURE DIGITAL CERTIFICATION OF ELECTRONIC COMMERCE

[75] Inventors: Kevin T. B. Rowney, San Francisco; Yuhua Chen, Palo Alto, both of Calif.

[73] Assignee: VeriFone, Inc., Santa Clara, Calif.

[21] Appl. No.: 08/801,026

[22] Filed: Feb. 19, 1997

[51] Int. Cl.[6] .................................................. G06F 11/00
[52] U.S. Cl. ............................................................ 713/201
[58] Field of Search ............................. 395/186, 187.01, 395/200.59, 200.62, 200.68, 200.79, 188.01, 831; 380/25, 4, 30

[56] References Cited

U.S. PATENT DOCUMENTS

| | | | |
|---|---|---|---|
| 3,651,511 | 3/1972 | Andrews et al. | 340/324 |
| 4,799,156 | 1/1989 | Shavit et al. | 364/401 |
| 4,977,595 | 12/1990 | Ohta et al. | 380/24 |
| 5,283,819 | 2/1994 | Glick et al. | 379/90 |
| 5,297,030 | 3/1994 | Vassigh | 705/25 |
| 5,442,791 | 8/1995 | Wrabetz et al. | 395/650 |
| 5,475,826 | 12/1995 | Fischer | 395/182.04 |
| 5,506,832 | 4/1996 | Arshi | 370/241 |
| 5,557,518 | 9/1996 | Rosen | 364/408 |
| 5,590,038 | 12/1996 | Pitroda | 385/241 |
| 5,590,197 | 12/1996 | Chen et al. | 380/24 |
| 5,671,279 | 9/1997 | Elgamal | 380/23 |
| 5,671,280 | 9/1997 | Aucsmith et al. | 380/30 |
| 5,677,955 | 10/1997 | Doggett et al. | 380/24 |
| 5,715,314 | 2/1998 | Payne et al. | 380/24 |
| 5,729,594 | 3/1998 | Klingman | 379/93.12 |
| 5,742,845 | 4/1998 | Wagner | 395/831 |
| 5,754,772 | 5/1998 | Leaf | 395/200.33 |
| 5,781,723 | 7/1998 | Yee et al. | 395/186 |
| 5,793,966 | 12/1998 | Amstein et al. | 395/200.01 |

FOREIGN PATENT DOCUMENTS

| | | |
|---|---|---|
| 0 326 699 | 8/1989 | European Pat. Off. . |
| 0 416 482 | 3/1991 | European Pat. Off. . |
| 0 527 639 | 2/1993 | European Pat. Off. . |
| 0 658 862 | 6/1995 | European Pat. Off. . |
| 0 666 681 | 8/1995 | European Pat. Off. . |
| 0 668 579 | 8/1995 | European Pat. Off. . |
| 2 251 098 | 6/1992 | United Kingdom . |

OTHER PUBLICATIONS

Warr, Michael. "Business Wants Telecom of the Future—Today," Telephony's Supercomm Wrap–up, pp. 12–13. Apr. 1991.

Müller, R., "Lon–Das Universelle Netzwerk, Teil 1." Elektronik., vol. 40, No. 22, Oct. 29, 1991, Munchen De. pp. 59–69, XP000268228.

(List continued on next page.)

*Primary Examiner*—Robert W. Beausoliel, Jr.
*Assistant Examiner*—Pierre E. Elisca
*Attorney, Agent, or Firm*—Sanford E. Warren, Jr.; Daniel J. Chalker; Gardere & Wynne, LLP

[57] ABSTRACT

Secure transmission of data is provided between a plurality of computer systems over a public communication system, such as the Internet. Secure transmission of data is provided from a party in communication with a first application resident on a first computer which is in communication with a second computer with a certification authority application resident thereon. The second computer is in communication with a third computer utilizing an administrative function resident thereon. The first, second and third computers are connected by a network, such as the Internet. A name-value pair for certification processing is created on said first computer and transmitted to an administrative function on the third computer. Then, the name-value pair is routed to the appropriate certification authority on the second computer. The administrative function also transmits other certification information from said administrative function to said certification authority on the second computer. Until, finally, a certificate is created comprising the name-value pair and the other certification information on the second computer. The certificate is utilized for authenticating identity of the party.

21 Claims, 42 Drawing Sheets

OTHER PUBLICATIONS

Snow, C.R. et al: "Simple Authentication" Software Practice & Experience., vol. 24, No. 5, May 1994, Chichester GB, pp. 437–447, XP0006555455, pp. 440–441.

Stallings, W. "Data and Computer Communications", 1994, MacMillan Publishing Co., New York, US, XP002069639, pp. 636–644, 663–666.

Anderson, R. et al. "Netcard—a Practical Electronic–cash System." International Workshop Proceedings, Security Protocols. International Workshop, Cambridge, UK, Apr. 10–12. p. 49. XP00203977.

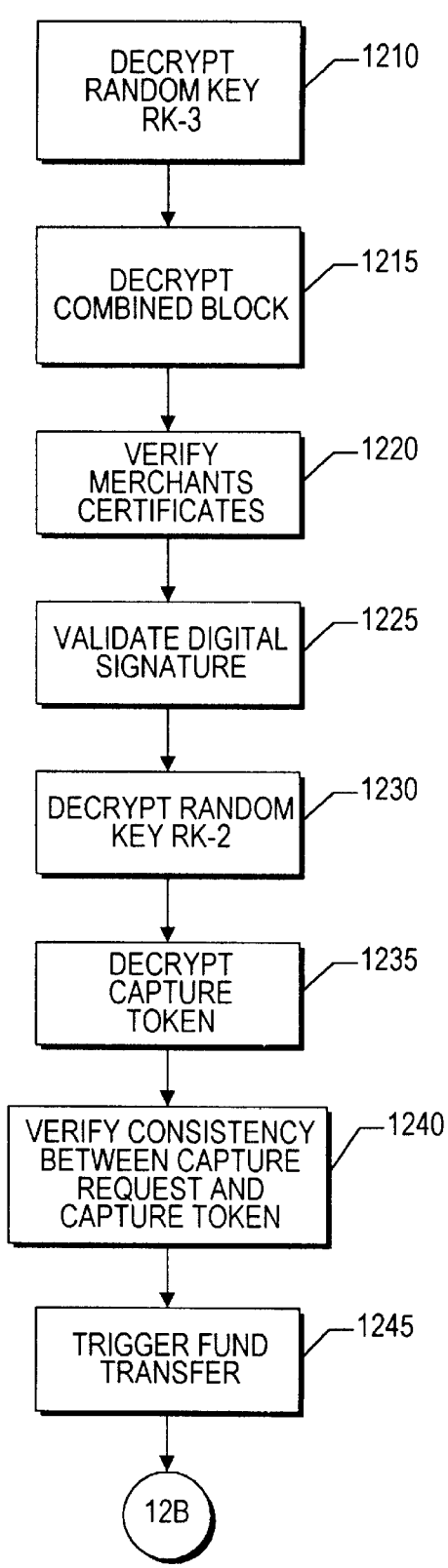
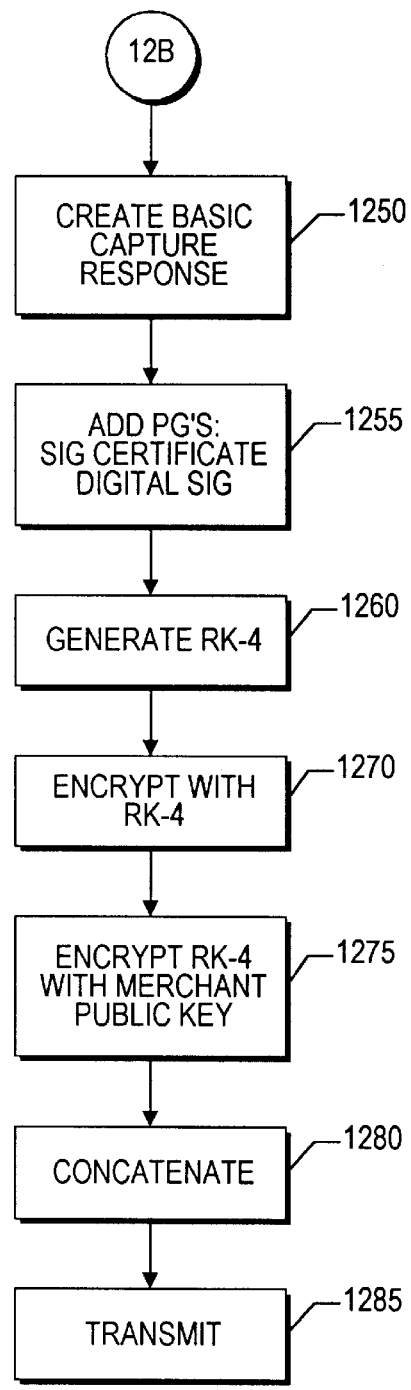
FIG.-12A
FIG.-12B

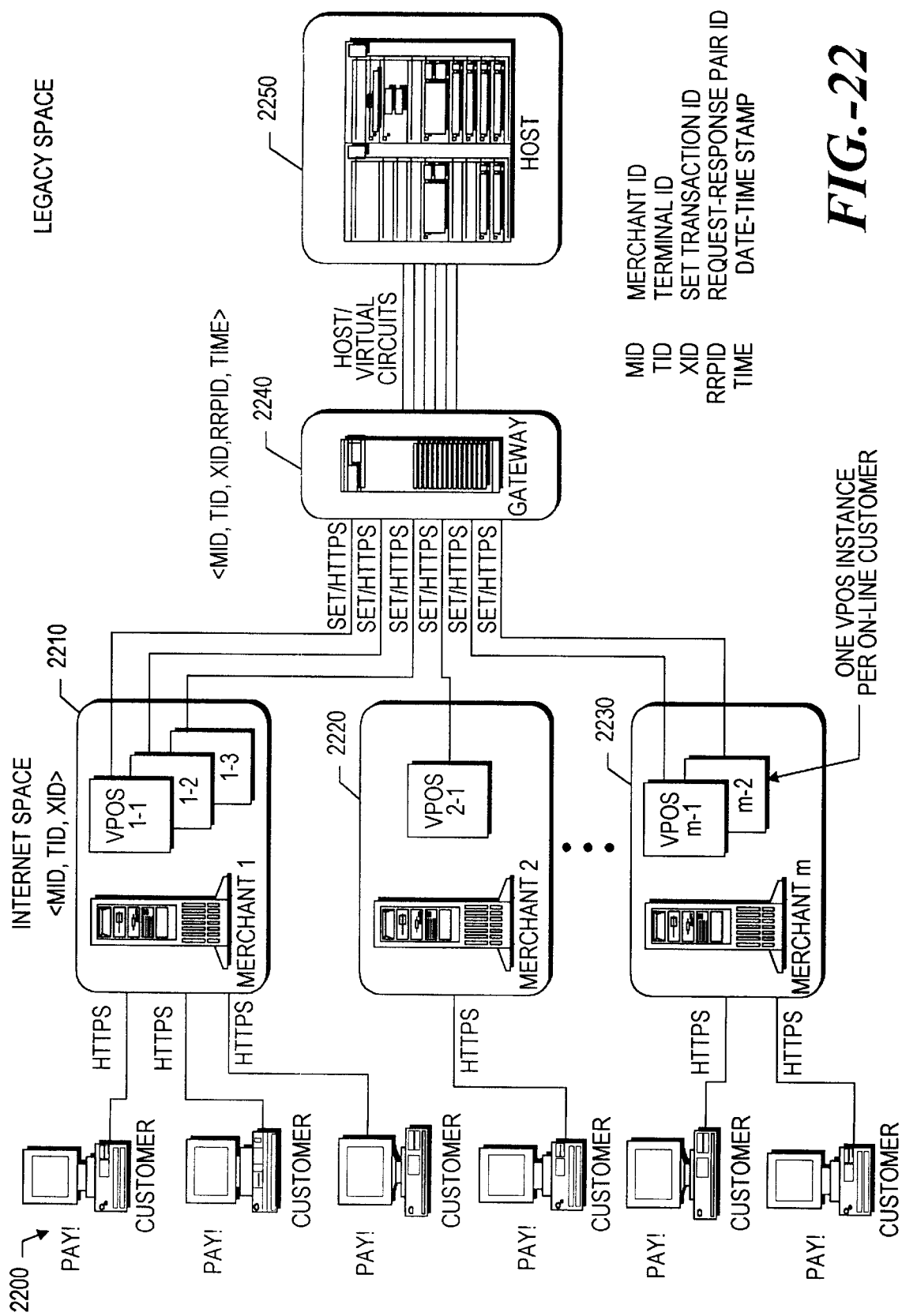

vPOS TERMINAL ARCHITECTURE

Certificate Issuance Form

Please enter information into all fields If a field does not apply to you, enter N/A

Card Information (2900)
- Card Number: 4417 2222 3333 9191
- Expiry Date (2902): 12/98

Personal Information (2904)
- First Name: John
- Middle: F.
- Last: Smith
- Home Phone #: 111 222-3333 (example: 555 555-5555) (2912)
- Social Security Number: 111-22-3333 (example: 999-99-9999) (2908)
- Date of Birth: 12/12/72 (month/day/year as 01/23/50) (2910)
- Mother's Maiden Name: Jones (for security purposes only)

Address (2906)
- Line 1: 141-22 Long Drive
- Line 2: Kensington
- Apt. #:
- City: Palo Alto  State: CA  Zip: 94025

VeriFone Wallet Information (2930)
- Icon Preference: Wallet (2932)
- Password: **** (2934)
- Confirm Password: ****

*FIG.-29* vPOS

Authorization Only Transaction

Purchase Order Number

Credit Card Number

Expiration Date (Month/Year) [01] / [1996]

Transaction Amount

[HOME] [Submit Authorization Only] [Reset]
[HELP] [OPERATOR]

*FIG.-38* vPOS

[TERMINAL TOTALS REPORT] [TERMINAL BATCH REPORT]
[HOST TOTALS REPORT] [TRANSACTION REPORT]
[MONITOR TRANSACTIONS] [RECONCILE]

[HOME]
[HELP] [OPERATOR]

*FIG.-39* vPOS

Terminal Totals Report

Note: The transaction is not currently implemented. The report below is a sample.

| Overall Terminal Totals | | |
|---|---|---|
| Sales | Trans. Count | 25 |
|  | Amount | $6161.70 |
| Credits | Trans. Count | 5 |
|  | Amount | ($11.70) |
| Net Sales | | $6150.70 |

| Visa Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

| MasterCard Totals | | |
|---|---|---|
| Sales | Trans. Count | 5 |
|  | Amount | $1232.34 |
| Credits | Trans. Count | 1 |
|  | Amount | ($2.34) |
| Net Sales | | $1230.00 |

| Discover Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

| American Express Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

*FIG.-40*

| JCB Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

ADMINISTRATOR

*FIG.-41* vPOS

Terminal Setup

Terminal Tables Configuration
Card(s) Definition Table     Review
Acquirer(s) Definition Table     Review
Merchant Configuration Table     Review Help

*FIG.-42* vPOS

Terminal Type    CDT List Update/Review
Cards acepted by the merchant

Visa

*FIG.-43* vPOS

Transaction Type  CDT Record Update/Review

Card            Visa
PANHi           4999
PANLo           4000
Acquirer        VFITest
BrandID         VeriFone Test
CardPicture     /vpos/icons/paypage/visa.jp
Maximum PAN Digits  16
Minimum PAN Digits  16

( Update )       ( Reset )

*FIG.-44* vPOS

Transaction Type ADT List Update/Review
Acquirer(s) for the merchant

VFITest

*FIG.-45* vPOS

| | |
|---|---|
| Transaction Type | ADT Record Update/Review |
| Aquirer | VFITest |
| MerchId | shouldbeserialnum |
| BatchNumber | |
| Host Name | Verifone Test Gateway |
| Transaction Ref Number | 0 |
| Response Time Out | 60 |
| Number of Retries | 1 |
| Aquirer Banner | /vos/icons/paypage/vfitest. |

( Update )   ( Reset )

*FIG.-46* vPOS

| | |
|---|---|
| Transaction Type | MCI Udate |
| Merchant Name | tstore |
| Merchant e-mail | webmaster |
| Merchant URL | http://localhost/ |
| Merchant Postal Address | ? |

( Update )   ( Reset )

*FIG.-47*

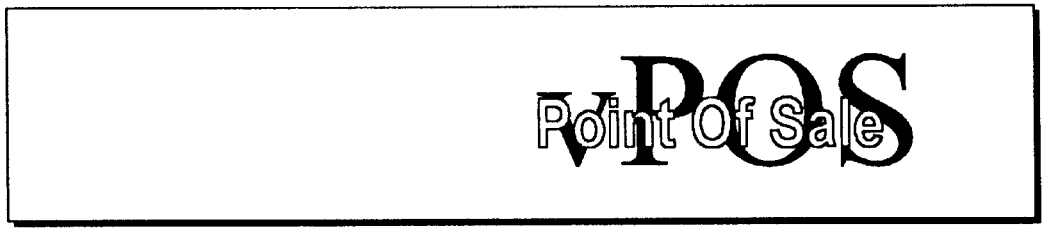
Order Number 834100050
Bill To
Account Number 
Name on Card        Good Through
Address Line 1
Address Line 2
City                State/Province
Country             Zip/Postal Code
Email               Phone
If you wish to have billing defaults set in your browser, check this box
Total=$59.99
By pressing the PAY button I agree to pay the above total amount according to the card issuer agreement
[RETURN TO SHOPPING]   [PAY]
FIG.-48

SYSTEM, METHOD AND ARTICLE OF MANUFACTURE FOR SECURE DIGITAL CERTIFICATION OF ELECTRONIC COMMERCE

FIELD OF THE INVENTION

The present invention relates to the secure, electronic payment in exchange for goods and services purchased over a communication network, and more specifically, to a system, method and article of manufacture for securely transmitting payment information from a customer to a merchant to a payment gateway and returning a certification, including a credit confidence factor to allow a merchant to determine whether to accept or reject payment information utilizing a flexible, extensible architecture.

The present invention relates to an electronic graphical representation of a monetary system for implementing electronic money payments as an alternative medium of economic exchange to cash, checks, credit and debit cards, and electronic funds transfer. The Electronic-Monetary System is a hybrid of currency, check, card payment systems, and electronic funds transfer systems, possessing many of the benefits of these systems with few of their limitations. The system utilizes electronic representations of money which are designed to be universally accepted and exchanged as economic value by subscribers of the monetary system.

BACKGROUND OF THE INVENTION

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House ("ACH") where a user can enter a pre-authorized code and download information with billing occurring later, and a Point Of Sale (POS) system where a transaction is processed by connecting with a central computer for authorization for the transaction granted or denied immediately are examples of EFT systems that are utilized by retail and commercial organizations. However, the payments made through these types of EFT systems are limited in that they cannot be performed without the banking system. Moreover, ACH transactions usually cannot be performed during off business hours.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface. Examples of EFT systems which provide non-ergonomic interfaces are disclosed in U.S. Pat. No. 5,476, 259; 5,459,304; 5,452,352; 5,448,045; 5,478,993; 5,455, 407; 5,453,601; 5,465,291; and 5,485,510.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the merchant to transmit information, including a subset of the information provided by the customer, over such a network to a payment gateway computer system that is authorized, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

One such attempt to provide such a secure transmission channel is a secure payment technology such as Secure Electronic Transaction (hereinafter "SET"), jointly developed by the Visa and MasterCard card associations, and described in Visa and MasterCard's Secure Electronic Transaction (SET) Specification, Feb. 23, 1996, hereby incorporated by reference. Other such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art readily comprehends that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), The SSL Protocol Version 3.0, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Theresa Systems, Shen, Kerberos, Photuris, Pretty Good Privacy ("PGP") and Ipv6 which meets the IPSEC criteria. One of ordinary skill in the art readily comprehends that any of the general-purpose secure communication protocols can be substituted for the SSL transmission protocol without undue experimentation.

Banks desire an internet payment solution that emulates existing Point of Sale (POS) applications that are currently installed on their host computers, and require minimal changes to their host systems. This is a critical requirement since any downtime for a bank's host computer system represents an enormous expense. Currently, Verifone supports over fourteen hundred different payment-related applications. The large number of applications is necessary to accommodate a wide variety of host message formats, diverse methods for communicating to a variety of hosts with different dial-up and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales/telephone sales require interfaces for different types of data to be entered, and provide different discount rates to merchants for complying with various data types. Moreover, a plethora of report generation mechanisms and formats are utilized by merchants that banking organizations work with.

Banks are unwilling to converge on "standards" since convergence would facilitate switching from one acquiring bank to another by merchants. In general, banks desire to increase the cost that a merchant incurs in switching from one acquiring bank to another acquiring bank. This is accomplished by supplying a merchant with a terminal that only communicates utilizing the bank's proprietary protocol, and by providing other value-added services that a merchant may not be able to obtain at another bank.

Internet-based payment solutions require additional security measures that are not found in conventional POS terminals. This additional requirement is necessitated because internet communication is done over publicly-accessible, unsecured communication line in stark contrast to the private, secure, dedicated phone or leased line service utilized between a traditional merchant and an acquiring bank. Thus, it is critical that any solution utilizing the internet for a communication backbone, employ some form of cryptography.

As discussed above, the current state-of-the-art in internet based payment processing is a protocol referred to as SET. Since the SET messages are uniform across all implementations, banks cannot differentiate themselves in any reasonable way. Also, since SET is not a proper superset of all protocols utilized today, there are bank protocols which cannot be mapped or translated into SET because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

SUMMARY OF THE INVENTION

According to a broad aspect of a preferred embodiment of the invention, secure transmission of data is provided between a plurality of computer systems over a public communication system, such as the Internet. Secure transmission of data is provided from a party in communication with a first application resident on a first computer which is in communication with a second computer with a certification authority application resident thereon. The second computer is in communication with a third computer utilizing an administrative function resident thereon. The first, second and third computers are connected by a network, such as the Internet. A name-value pair for certification processing is created on said first computer and transmitted to an administrative function on the third computer. Then, the name-value pair is routed to the appropriate certification authority on the second computer. The administrative function also transmits other certification information from said administrative function to said certification authority on the second computer. Until, finally, a certificate is created comprising the name-value pair and the other certification information on the second computer.

DESCRIPTION OF THE DRAWINGS

The foregoing and other objects, aspects and advantages are better understood from the following detailed description of a preferred embodiment of the invention with reference to the drawings, in which:

FIGS. 12A and 12B depict the detailed steps of processing a payment capture request and generating and transmitting a payment capture request response in accordance with a preferred embodiment;

FIG. 22 is a flow diagram in accordance with a preferred embodiment.

FIG. 29 is an illustration of a certificate issuance form in accordance with a preferred embodiment;

FIGS. 36–48 are screen displays in accordance with a preferred embodiment.

DETAILED DESCRIPTION

Figure 1A:
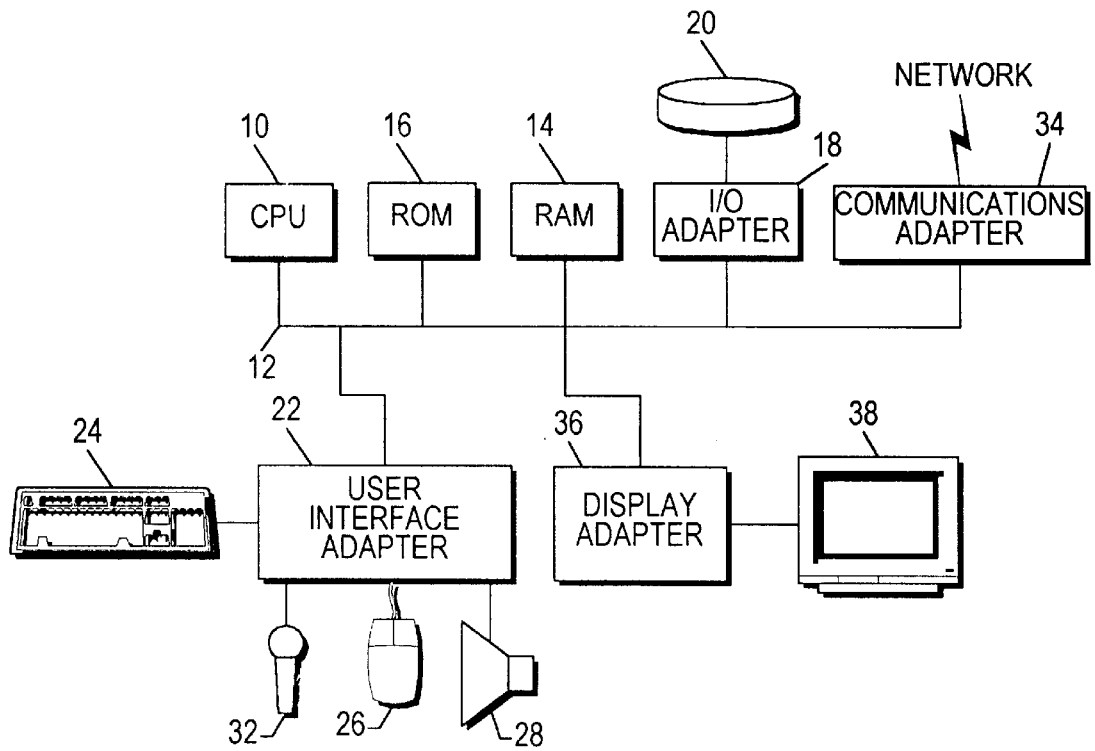
FIG. 1A is a block diagram of a representative hardware environment in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1A, which illustrates a typical hardware configuration of a workstation in accordance with a preferred embodiment having a central processing unit 10, such as a microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows Operating System (OS), the IBM OS/2 operating system, the MAC OS, or UNIX operating system. Those skilled in the art appreciates that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times. There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 1B:
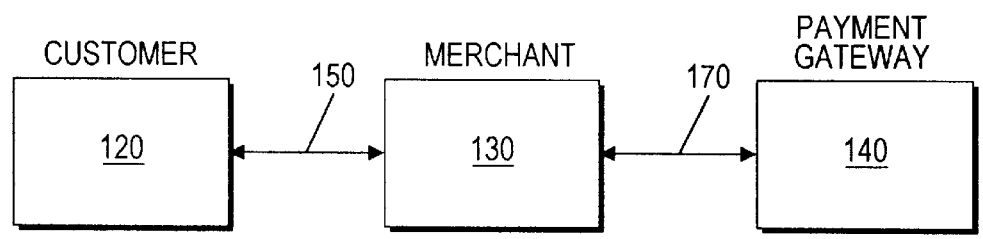
FIG. 1B depicts an overview in accordance with a preferred embodiment.

FIG. 1B depicts an overview of the present invention. Customer computer system 120 is in communication with merchant computer system 130. The customer-merchant session 150 operates under a general-purpose secure communication protocol such as the SSL protocol. Merchant computer system 130 is additionally in communication with payment gateway computer system 140. A payment gateway is a system that provides electronic commerce services in support of a bank or other financial institution, and that interfaces to the financial institution to support the authorization and capture of transactions. The customer-institution session 170 operates under a variant of a secure payment technology such as the SET protocol, as described herein, referred to as Merchant-Originated Secure Electronic Transactions ("MOSET"), as is more fully described herein.

Customer-to-Merchant Communication

Figure 2:
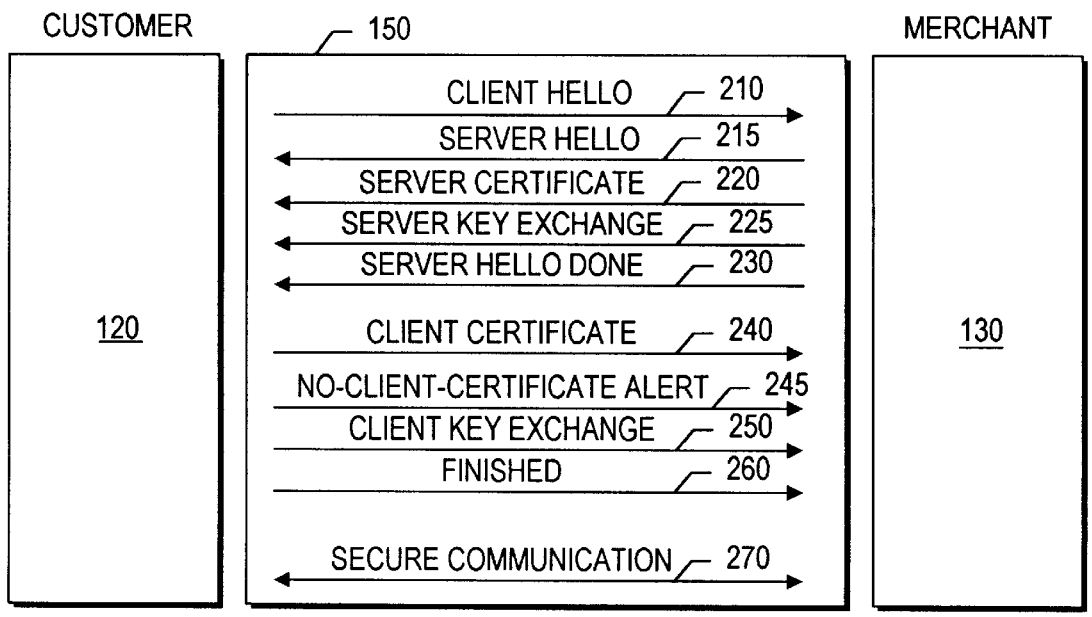
FIG. 2 depicts a more detailed view of a customer computer system in communication with merchant system under the Secure Sockets Layer protocol in accordance with a preferred embodiment.

FIG. 2 depicts a more detailed view of customer computer system 120 in communication with merchant system 130 using customer-merchant session 150 operating under the SSL protocol as documented in Freier and incorporated by reference.

Customer computer system 120 initiates communication with merchant computer system 130 using any well-known access protocol, e.g., Transmission Control Protocol/Internet Protocol ("TCP/IP"). A description of TCP/IP is provided in Information Sciences Institute, "Transmission Control Protocol DARPA Internet Program Protocol Specification (RFC 793)" (September, 1981), and Information Sciences Institute, "Internet Protocol DARPA Internet Program Protocol Specification (RFC 791)" (September, 1981). In this implementation, customer computer system 120 acts as a client and merchant computer system 130 acts as a server.

Customer computer system 120 initiates communication by sending "client hello" message 210 to the merchant computer system 130. When a client first connects to a server it is required to send the client hello message 210 as its first message. The client can also send a client hello message 210 in response to a hello request on its own initiative in order to renegotiate the security parameters in an existing connection. The client hello message 210 includes a random structure, which is used later in the protocol. Specifically, the random structure includes the current time and date in standard UNIX 32-bit format according to the sender's internal clock and twenty-eight bytes of data generated by a secure random number generator. The client hello message 210 further includes a variable length session identifier. If not empty, the session identifier value identifies a session between the same client and server whose security parameters the client wishes to reuse. The session identifier may be from an earlier connection, the current connection, or another currently active connection. It is useful to specify the current connection if the client only wishes to update the random structures and derived values of a connection. It is useful to specify another currently active connection if the client wishes to establish several simultaneous independent secure connections to the same server without repeating the full handshake protocol. Client hello message 210 further includes an indicator of the cryptographic algorithms supported by the client in order of the client's preference, ordered according to client preference.

In response to client hello message 210, if merchant computer system 130 wishes to correspond with customer computer system 120, it responds with server hello message 215. If merchant computer system 130 does not wish to communicate with customer computer system 120, it responds with a message, not shown, indicating refusal to communicate.

Server hello message 215 includes a random structure, which is used later in the protocol. The random structure in server hello message 215 is in the same format as, but has contents independent of, the random structure in client hello message 210. Specifically, the random structure includes the current time and date in standard UNIX 32-bit format according to the sender's internal clock and twenty-eight bytes of data generated by a secure random number generator. Server hello message 215 further includes a variable length session identifier. The session identifier value identifies a new or existing session between the same client and server. Server hello message 215 further includes an indicator of the cryptographic algorithms selected from among the algorithms specified by client hello message 210, which is utilized in further encrypted communications.

Optionally, Merchant computer system 130 transmits a server certificate 220. If transmitted, server certificate 220 enables customer computer system 120 to authenticate the identity of merchant computer system 130. If merchant computer system 130 does not transmit a server certificate 220, or if server certificate 220 is suitable only for authentication, it may optionally transmit a server key exchange message 225. Server key exchange message 225 identifies a key that may be used by custom computer system 120 to decrypt further messages sent by merchant computer system 130.

After transmitting server hello message 215, and optionally transmitting server certificate 220 or server key exchange message 225, merchant computer system 130 transmits a server hello done message 230 and waits for a further response from customer computer system 120.

Customer computer system 120 optionally transmits client certificate 240 to merchant computer system 130. If transmitted, client certificate 240 enables merchant computer system 130 to authenticate the identity of customer computer system 120. Alternatively, customer computer system 120 may transmit a no-client-certificate alert 245, to indicate that the customer has not registered with any certification authority.

If customer computer system 120 does not transmit a client certificate 240, or if client certificate 240 is suitable only for authentication, customer computer system 120 may optionally transmit a client key exchange message 250. Client key exchange message 250 identifies a key that may be used by merchant computer system 130 to decrypt further messages sent by customer computer system 120.

After optionally transmitting client certificate 240, no-client-certificate alert 245, and/or client key exchange message 250, customer computer system 120 transmits a finished message 260.

At this point, customer computer system 120 and merchant computer system 130 have:

1) negotiated an encryption scheme that may be commonly employed in further communications, and
2) have communicated to each other a set of encryption keys that may be used to decrypt further communications between the two computer systems.

Customer computer system 120 and merchant computer system 130 may thereafter engage in secure communications 270 with less risk of interception by third parties.

Among the messages communicated by customer computer system 120 to merchant computer system 130 may be messages that specify goods or services to be ordered and payment information, such as a credit card number and related information, collectively referred to as "payment information," that may be used to pay for the goods and/or services ordered. In order to obtain payment, the merchant must supply this information to the bank or other payment gateway responsible for the proffered payment method. This enables the merchant to perform payment authorization and payment capture. Payment authorization is the process by which permission is granted by a payment gateway operating on behalf of a financial institution to authorize payment on behalf of the financial institution. This is a process that assesses transaction risk, confirms that a given transaction does not raise the account holder's debt above the account's credit limit, and reserves the specified amount of credit. Payment capture is the process that triggers the movement of funds from the financial institution to the merchant's account.

Payment Authorization

Merchants utilize point-of-sale products for credit and debit transactions on a daily basis. An embodiment in accordance with the subject invention allows an acquirer processor to accept transactions from internet storefronts without altering a current host environment.

The system easily converts payment protocol messages and simultaneously manages transactions from a number of internet merchant servers. As the number of transactions grows, the payment gateway can be scaled to handle the increased business, and it can be configured to work with specific business processes used by the acquirer/processor. Thus, the payment gateway supports internet processing utilizing payment processing operations.

The payment gateway provides support for configuring and installing the internet payment capability utilizing existing host point-of-sale technology. The payment gateway also provides an intuitive Graphical User Interface (GUI) with support built in to accommodate future payment instruments such as debit cards, electronic checks, electronic cash and micropayments. The payment gateway implements secure transactions using RSA public-key cryptography and the MasterCard/Visa Secure Electronic Transaction (SET) protocol. The gateway also provides full functionality for merchant payment processing including authorization, capture, settlement and reconciliation while providing monitor activity with reporting and tracking of transactions sent over the internet. Finally, the payment gateway also implements internet payment procedures that match current processor business models to ensure consistency for merchants. Handling internet transactions is destined to become a necessary function for every payment processing system. Today, merchants oftent transmit data inefficiently. Some fax the information or waste time keying data into a non-internet system.

Figure 3:
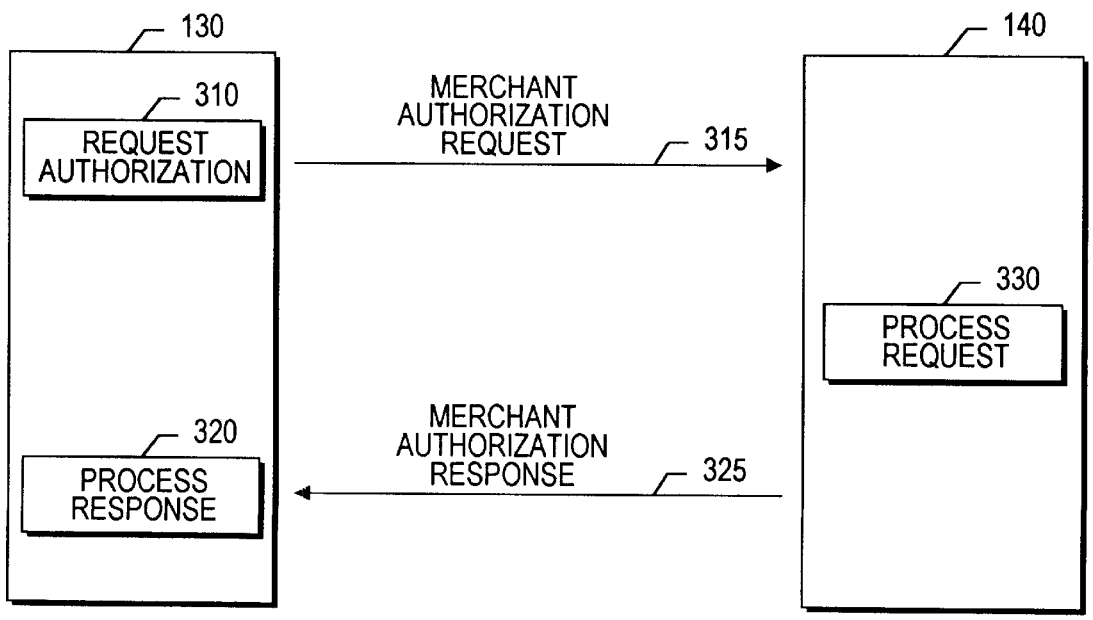
FIG. 3 depicts an overview of the method of securely supplying payment information to a payment gateway in order to obtain payment authorization in accordance with a preferred embodiment.

FIG. 3 depicts an overview of the method of securely supplying payment information to a payment gateway in order to obtain payment authorization. In function block 310, merchant computer system 130 generates a payment authorization request 315 and transmits it to payment gateway computer system 140. In function block 330, payment gateway system 140 processes the payment authorization request, generates a payment authorization response 325 and transmits it to merchant computer system 130. In function block 320, merchant computer system 130 processes payment authorization response 325 and determines whether payment for the goods or services sought to be obtained by the customer has been authorized.

Payment Authorization Request Generation

Figure 4:
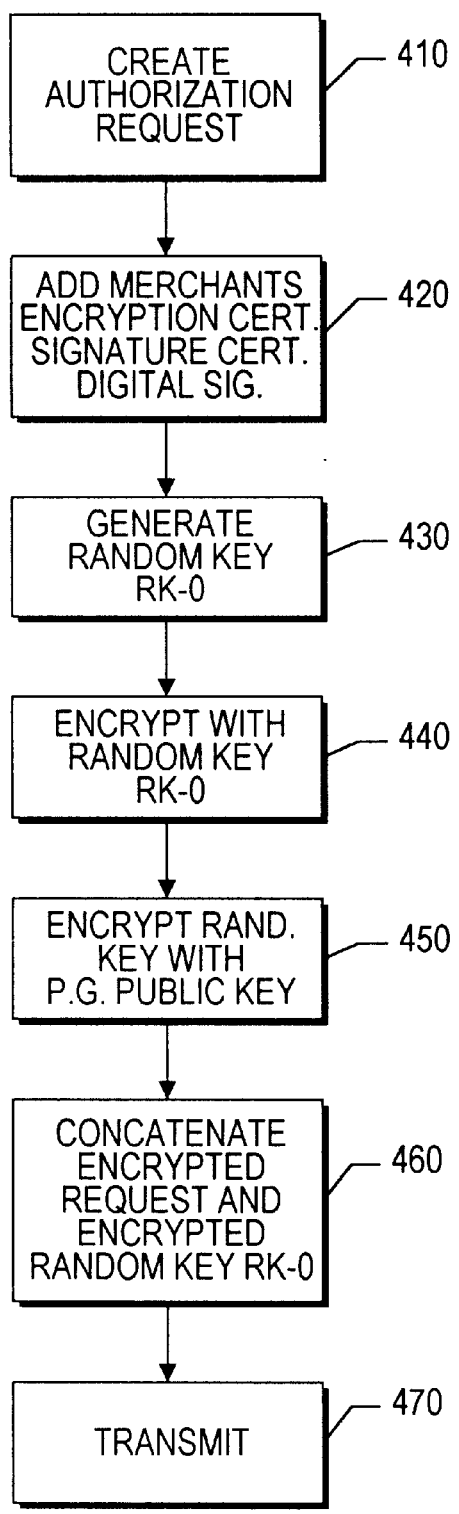
FIG. 4 depicts the detailed steps of generating and transmitting a payment authorization request in accordance with a preferred embodiment.
Figure 5A:
FIGS. 5A through 5F depict views of the payment authorization request and its component parts in accordance with a preferred embodiment.

FIG. 4 depicts the detailed steps of generating and transmitting a payment authorization request. FIGS. 5A through 5F depict views of the payment authorization request and its component parts. In function block 410, merchant computer system 130 creates a basic authorization request 510. The basic authorization request is a data area that includes all the information for determining whether a request should be granted or denied. Specifically, it includes such information as the party who is being charged, the amount to be charged, the account number of the account to be charged, and any additional data, such as passwords, needed to validate the charge. This information is either calculated based upon prior customer merchandise selection, or provided by the customer over the secure link 270 established in the customer-merchant general-purpose secure communication protocol session. FIG. 5A depicts a basic authorization request 510.

In function block 420, merchant computer system 130 combines basic authorization request 510, a copy of its encryption public key certificate 515 and a copy of its signature public key certificate 520. Merchant computer system 130 calculates a digital signature 525 for the combined contents of the combined block 530 comprising basic authorization request 510, the encryption public key certificate 515 and the signature public key certificate 520, and appends it to the combination of the combined basic authorization request 510, the encryption public key certificate 515 and the signature public key certificate 520. The merchant computer system calculates digital signature 525 by first calculating a "message digest" based upon the contents of the combined basic authorization request 510, the encryption public key certificate 515 and the signature public key certificate 520. A message digest is the fixed-length result that is generated when a variable length message is fed into a one-way hashing function. Message digests help verify that a message has not been altered because altering the message would change the digest. The message digest is then encrypted using the merchant computer system's 130 digital signature private key, thus forming a digital signature.

Figure 5B:
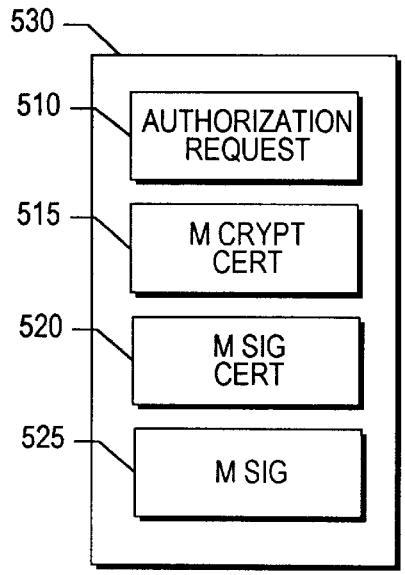

FIG. 5B depicts the combined block 530 formed by function block 420 and containing basic authorization request 510, the encryption public key certificate 515, the signature public key certificate 520, and digital signature 525.

Figure 5C:
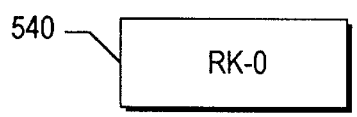

In function block 430, merchant computer system 130 generates a random encryption key RK-0 540, denoted as RK-0. Random encryption key RK-0 540 is a symmetric encryption key. A symmetric encryption key is a key characterized by the property that a message encrypted with a symmetric key can be decrypted with that same key. This is contrasted with an asymmetric key pair, such as a public-key/private-key key pair, where a message encrypted with one key of the key pair may only be decrypted with the other key of the same key pair. FIG. 5C depicts random encryption key RK-0 540.

Figure 5D:
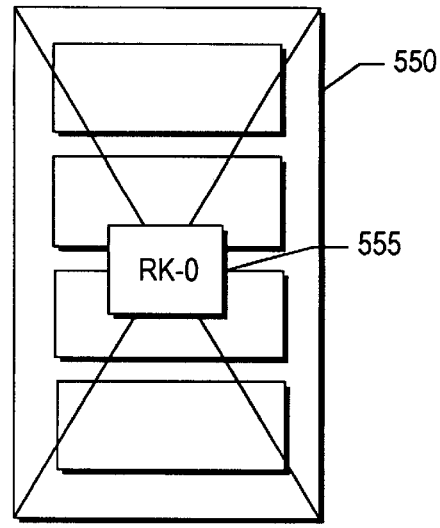

In function block 440, merchant computer system 130 encrypts combined block 530 using random encryption key RK-0 540 to form encrypted combined block 550. FIG. 5D depicts encrypted combined block 550. The encryption state of encrypted combined block 550 is graphically shown by random key lock 555, which indicates that encrypted combined block 550 is encrypted using random key RK-0 540.

Figure 5E:
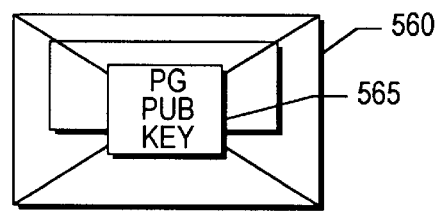

In function block 450, merchant computer system 130 encrypts random encryption key RK-0 540 using the public key of payment gateway system 140 to form encrypted random key 560. FIG. 5E depicts encrypted random key 560. The encryption state of encrypted random key 560 is graphically shown by payment gateway public key lock 565, which indicates that encrypted random key 560 is encrypted using the payment gateway public key.

In function block 460, merchant computer system 130 concatenates encrypted combined block 550 and encrypted random key 560 to form payment authorization request 315.

Figure 5F:
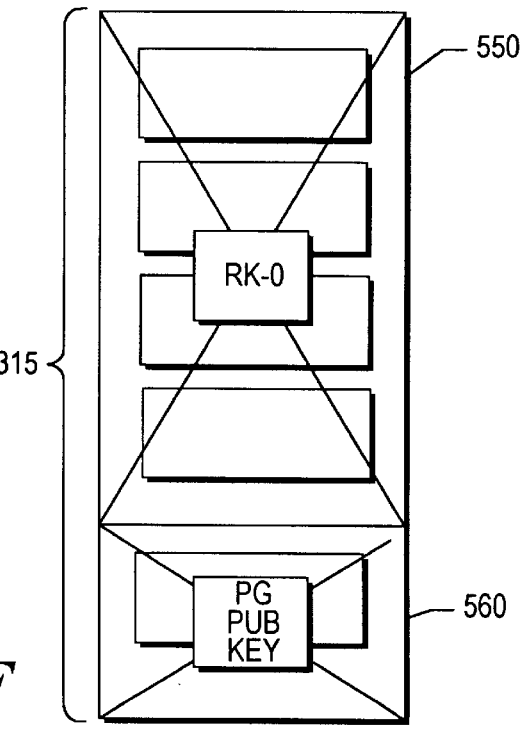

FIG. 5F depicts merchant authorization request 315 comprising encrypted combined block 550 and encrypted random key 560. In function block 470, merchant computer system 130 transmits payment authorization request 315 to payment gateway system 140.

Payment Authorization Request Processing

Figure 6A:
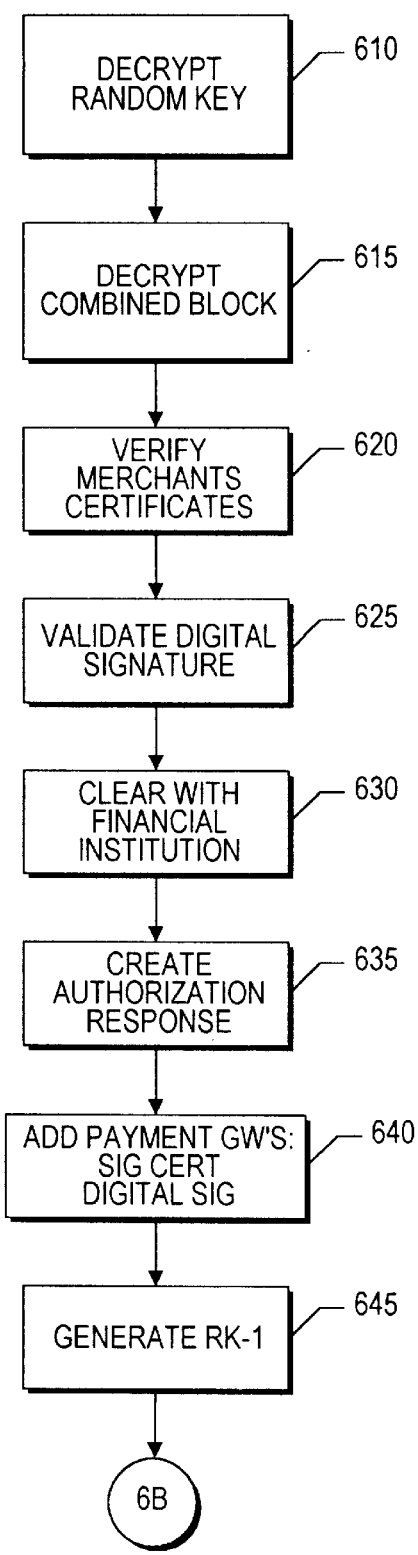
FIGS. 6A and 6B depict the detailed steps of processing a payment authorization request and generating and transmitting a payment authorization request response in accordance with a preferred embodiment.
Figure 6B:
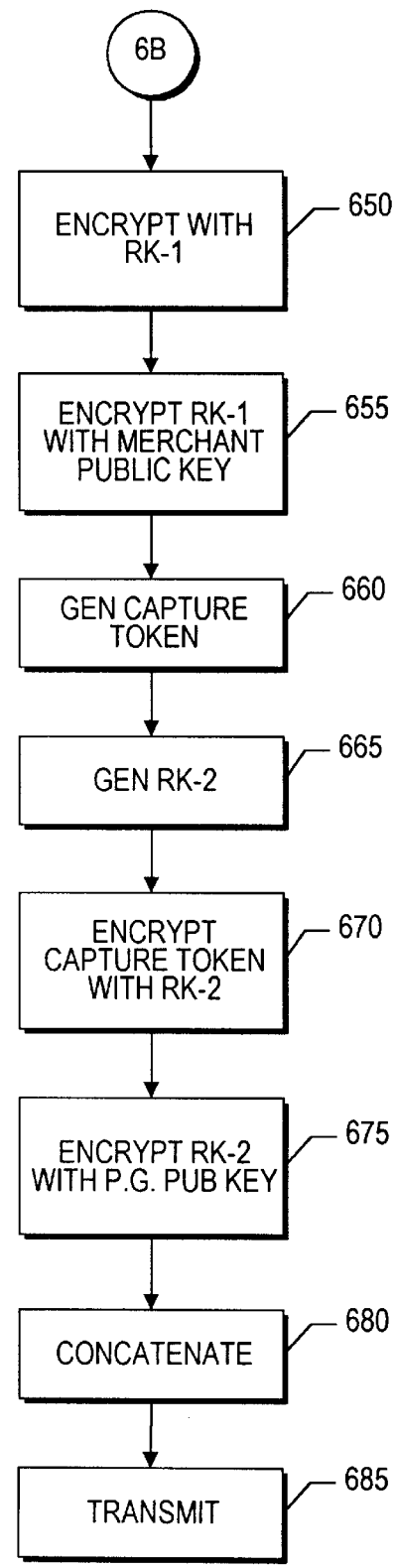

FIG. 6 depicts the detailed steps of processing a payment authorization request and generating and transmitting a payment authorization request response. Function blocks 610 through 630 depict the steps of processing a payment authorization request, while function blocks 635 through 685 depict the steps of generating and transmitting a payment authorization request response.

In function block 610, payment gateway computer system 140 applies its private key to encrypted random key 560 contained within received payment authorization request 315, thereby decrypting it and obtaining a cleartext version of random key RK-0 540. In function block 615, payment gateway computer system 140 applies random key RK-0 540 to encrypted combined block 550, thereby decrypting it and obtaining a cleartext version of combined block 530. Combined block 530 comprises basic authorization request 510, a copy of merchant computer system's 130 encryption public key certificate 515 and a copy of merchant computer system's 130 signature public key certificate 520, as well as merchant digital signature 525.

In function block 620, payment gateway computer system 140 verifies merchant computer system's 130 encryption public key certificate 515 and merchant computer system's 130 signature public key certificate 520. Payment gateway computer system 140 performs this verification by making a call to the certification authorities associated with each certificate. If verification of either certificate fails, payment gateway computer system 140 rejects the authorization request.

In function block 625, payment gateway computer system 140 validates merchant digital signature 525. Payment gateway computer system 140 performs this validation by calculating a message digest over the contents of the combined basic authorization request 510, the encryption public key certificate 515 and the signature public key certificate 520. Payment gateway computer system 140 then decrypts digital signature 525 to obtain a copy of the equivalent message digest calculated by merchant computer system 130 in function block 420. If the two message digests are equal, the digital signature 525 is validated. If validation fails, payment gateway computer system 140 rejects the authorization request.

In function block 630, payment gateway computer system 140 determines the financial institution for which authorization is required by inspection of basic authorization request 510. Payment gateway computer system 140 contacts the appropriate financial institution using a secure means, e.g, a direct-dial modem-to-modem connection, or a proprietary internal network that is not accessible to third parties, and using prior art means, obtains a response indicating whether the requested payment is authorized.

Payment Authorization Response Generation

Function blocks 635 through 685 depict the steps of generating and transmitting a payment authorization request response. FIGS. 7A through 7J depict views of the payment authorization response and its component parts.

Figure 7A:
FIGS. 7A through 7J depict views of the payment authorization response and its component parts in accordance with a preferred embodiment.

In function block 635, payment gateway computer system 140 creates a basic authorization response 710. The basic authorization request is a data area that includes all the information to determine whether a request was granted or denied. FIG. 7A depicts basic authorization response 710.

In function block 640, payment gateway computer system 140 combines basic authorization response 710, and a copy of its signature public key certificate 720. Payment computer system 140 calculates a digital signature 725 for the combined contents of the combined block 730 comprising basic authorization response 710 and the signature public key certificate 720, and appends the signature to the combination of the combined basic authorization response 710 and the signature public key certificate 720. The payment gateway computer system calculates digital signature 725 by first calculating a message digest based on the contents of the combined basic authorization response 710 and signature public key certificate 720. The message digest is then encrypted using the merchant computer system's 140 digital signature private key, thus forming a digital signature.

Figure 7B:
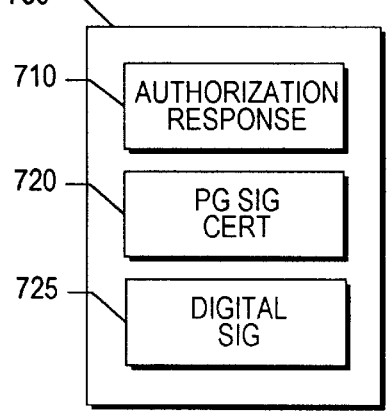

FIG. 7B depicts the combined block 730 formed in function block 640 and containing basic authorization response 710, the signature public key certificate 720, and digital signature 725.

Figure 7C:

In function block 645, payment gateway computer system 150 generates a first symmetric random encryption key 740, denoted as RK-1. FIG. 7C depicts first random encryption key RK-1 740.

Figure 7D:
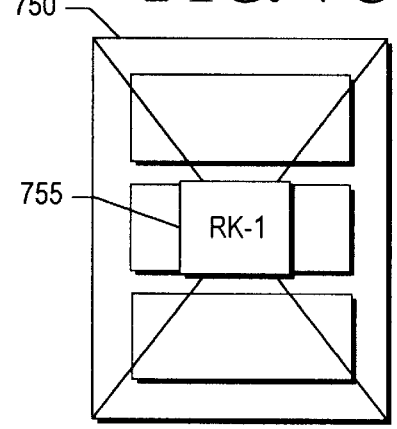

In function block 650, payment gateway computer system 140 encrypts combined block 730 using random encryption key RK-1 740 to form encrypted combined block 750. FIG. 7D depicts encrypted combined block 750. The encryption state of encrypted combined block 750 is graphically shown by random key lock 755, which indicates that encrypted combined block 750 is encrypted using random key RK-1 740.

Figure 7E:
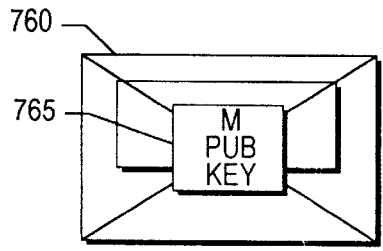

In function block 655, payment gateway computer system 140 encrypts random encryption key RK-1 740 using the public key of merchant computer system 130 to form encrypted random key RK 760. FIG. 7E depicts encrypted random key RK-1 760. The encryption state of encrypted random key 760 is graphically shown by merchant public key lock 765, which indicates that encrypted random key 760 is encrypted using the merchant public key.

Figure 7F:

In function block 660, payment gateway computer system 140 generates a random capture token 770. Random capture token 770 is utilized in subsequent payment capture processing to associate the payment capture request with the payment authorization request being processed. FIG. 7F depicts capture token 775.

Figure 7G:

In function block 665, payment gateway computer system 140 generates a second symmetric random encryption key 775, denoted as RK-2. FIG. 7G depicts second random encryption key RK-2 775.

Figure 7H:
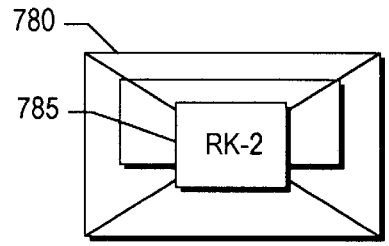

In function block 670, payment gateway computer system 140 encrypts capture token 770 using random encryption key RK-2 770 to form encrypted capture token 780. FIG. 7H depicts encrypted capture token 780. The encryption state of encrypted capture token 780 is graphically shown by random key lock 785, which indicates that encrypted capture token 780 is encrypted using random key RK-2 770.

Figure 7I:
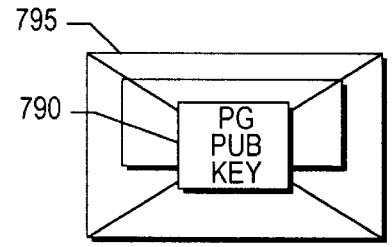

In function block 675, payment gateway computer system 140 encrypts second random encryption key RK-2 775 using its own public key to form encrypted random key RK-2 790. FIG. 7I depicts encrypted random key RK-2 790. The encryption state of encrypted random key 790 is graphically shown by payment gateway public key lock 795, which indicates that encrypted random key 790 is encrypted using the payment gateway public key.

Figure 7J:
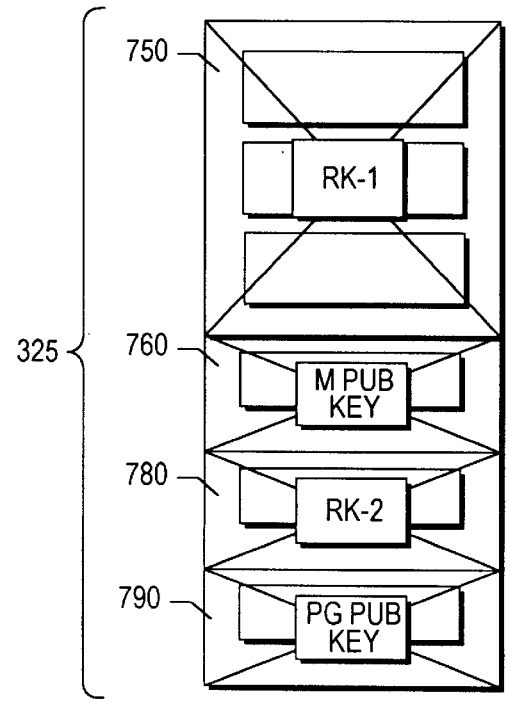

In function block 680, payment gateway computer system 140 concatenates encrypted combined block 750, encrypted random key RK-1 760, encrypted capture token 780 and encrypted random key RK-2 790 to form merchant authorization response 325. FIG. 7J depicts payment authorization response 325 comprising encrypted combined block 750, encrypted random key RK-1 760, encrypted capture token 780 and encrypted random key RK-2 790. In function block 685, payment gateway computer system 140 transmits payment authorization response 325 to merchant computer system 130.

Payment Authorization Response Processing

Figure 8:
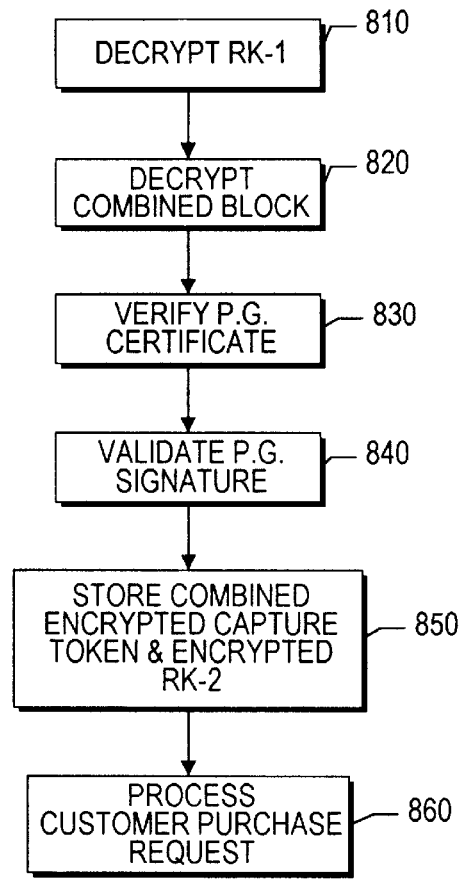
FIG. 8 depicts the detailed steps of processing a payment authorization response in accordance with a preferred embodiment.

FIG. 8 depicts the detailed steps of processing a payment authorization response. In function block 810, merchant computer system 130 applies its private key to encrypted random key RK-1 760 contained within received payment authorization response 325, thereby decrypting it and obtaining a cleartext version of random key RK-1 740. In function block 820, merchant computer system 130 applies random key RK-1 740 to encrypted combined block 750, thereby decrypting it and obtaining a cleartext version of combined block 730. Combined block 730 comprises basic authorization response 710, a copy of payment gateway computer system's 140 signature public key certificate 720, as well as payment gateway digital signature 725. In function block 830, merchant computer system 130 verifies payment gateway computer system's 140 signature public key certificate 720. Merchant computer system 130 performs this verification by making a call to the certification authority associated with the certificate. If verification of the certificate fails, merchant computer system 130 concludes that the basic authorization response 710 is counterfeit and treats it though the authorization request had been rejected.

In function block 840, merchant computer system 130 validates payment gateway digital signature 725. Merchant computer system 130 performs this validation by calculating a message digest over the contents of the combined basic authorization response 710 and the signature public key certificate 720. Merchant computer system 130 then decrypts digital signature 725 to obtain a copy of the equivalent message digest calculated by payment gateway computer system 140 in function block 640. If the two message digests are equal, the digital signature 725 is validated. If validation fails, the merchant computer system 130 concludes that the basic authorization response 710 is counterfeit and treats it though the authorization request had been rejected.

In function block 850, merchant computer system 130 stores encrypted capture token 780 and encrypted random key RK-2 790 for later use in payment capture. In function block 860, merchant computer system 130 processes the customer purchase request in accordance with the basic authorization response 710. If the authorization response indicates that payment is authorized, merchant computer system 130 fills the requested order. If the authorization response 710 indicates that payment is not authorized, or if merchant computer system 130 determined in function block 830 or 840 that the basic authorization response 710 is counterfeit, merchant computer system 130 indicates to the customer that the order cannot be filled.

Payment Capture

Figure 9:
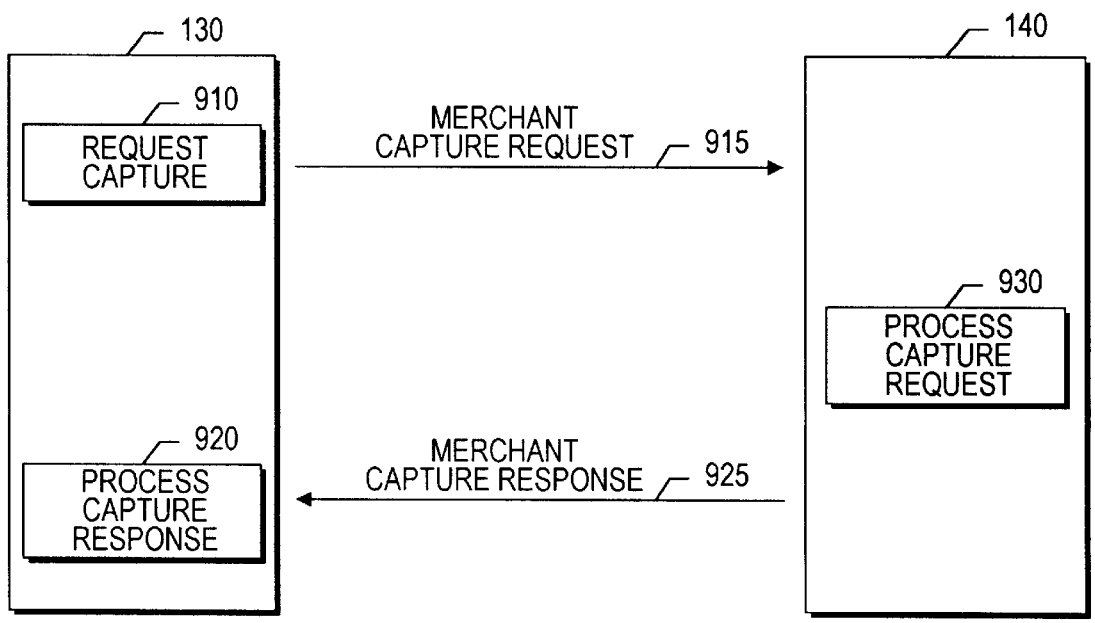
FIG. 9 depicts an overview of the method of securely supplying payment capture information to a payment gateway in accordance with a preferred embodiment.

FIG. 9 depicts an overview of the method of securely supplying payment capture information to payment gateway 140 in order to obtain payment capture. In function block 910, merchant computer system 130 generates a merchant payment capture request 915 and transmits it to payment gateway computer system 140. In function block 930, payment gateway system 140 processes the payment capture request 915, generates a payment capture response 925 and transmits it to merchant computer system 130. In function block 920, merchant computer system 130 processes payment capture response 925 and verifies that payment for the goods or services sought to be obtained by the customer have been captured.

Payment Capture Request Generation

Figure 10:
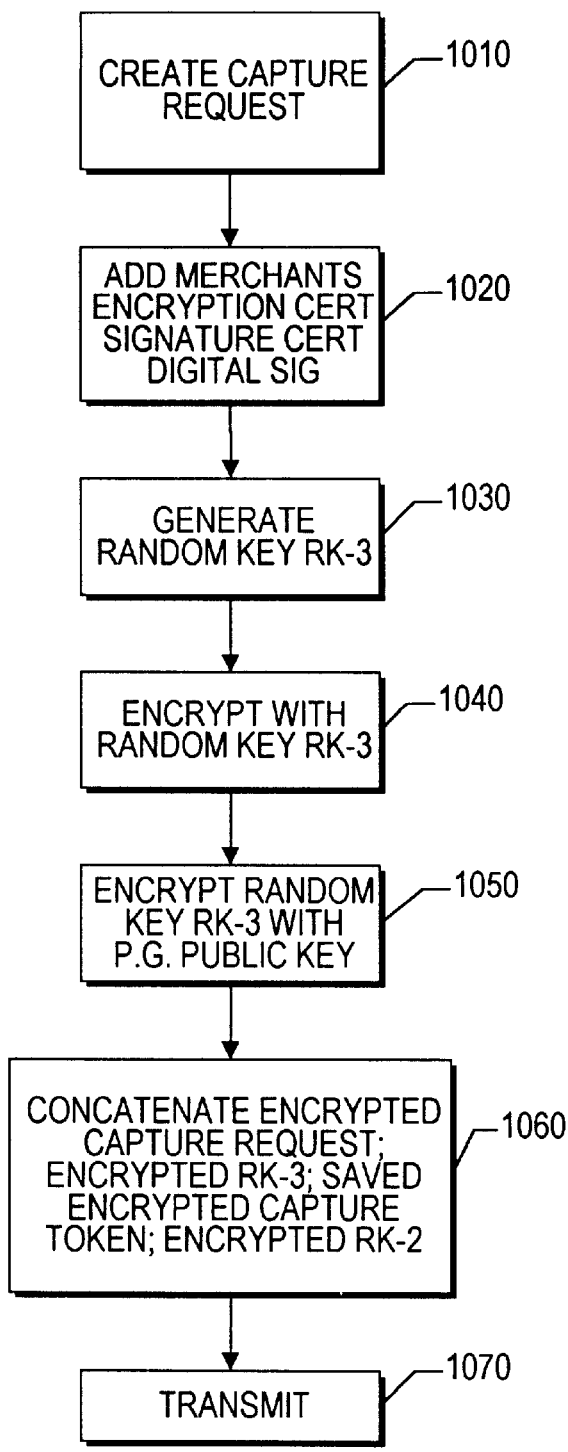
FIG. 10 depicts the detailed steps of generating and transmitting a payment capture request in accordance with a preferred embodiment.

FIG. 10 depicts the detailed steps of generating and transmitting a payment capture request. FIGS. 11A through 11F depict views of the payment capture request and its component parts. In function block 1010, merchant computer system 130 creates a basic capture request 1110. The a basic capture request 1110 is a data area that includes all the information needed by payment gateway computer system 140 to trigger a transfer of funds to the merchant operating merchant computer system 130.

Figure 11A:
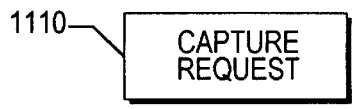
FIGS. 11A through 11F depict views of the payment capture request and its component parts in accordance with a preferred embodiment.

Specifically, a basic capture request 1110 includes a capture request amount, a capture token, a date, summary information of the purchased items and a Merchant ID (MID) for the particular merchant. FIG. 11A depicts basic capture request 1110.

In function block 1020, merchant computer system 130 combines basic capture request 1110, a copy of its encryption public key certificate 1115 and a copy of its signature public key certificate 1120. Merchant computer system 130 calculates a digital signature 1125 for the combined contents of the combined block 1130 comprising basic capture request 1110, the encryption public key certificate 1115 and the signature public key certificate 1120, and appends it to the combination of the combined basic capture request 1110, the encryption public key certificate 1115 and the signature public key certificate 1120. The merchant computer system calculates digital signature 1125 by first calculating a message digest over the contents of the combined basic capture request 1110, the encryption public key certificate 1115 and the signature public key certificate 1120. The message digest is then encrypted using the merchant computer system's 130 digital signature private key, thus forming a digital signature.

Figure 11B:
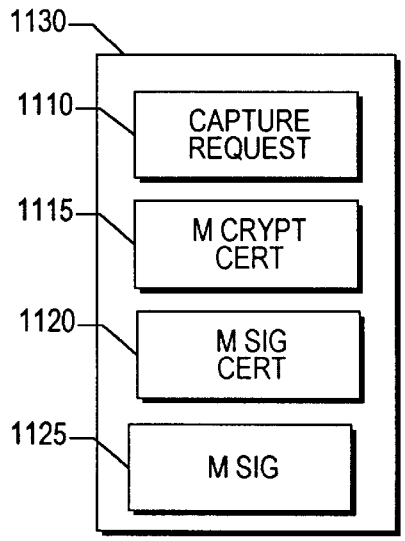
Figure 11C:
Figure 11D:
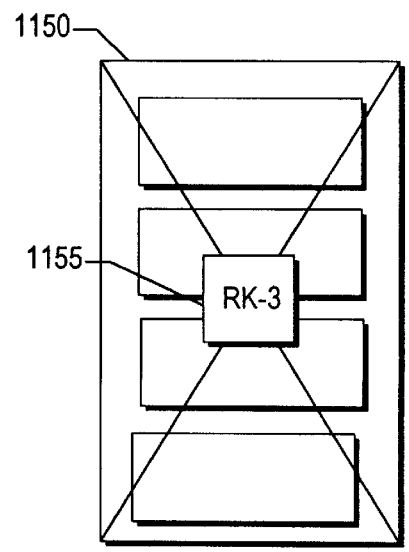
Figure 11E:
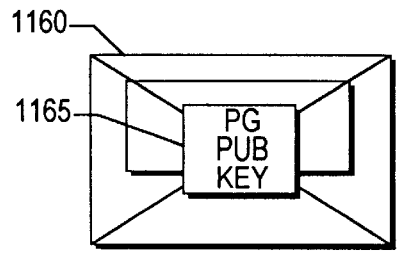

FIG. 11B depicts the combined block 1130 formed by function block 1020 and containing basic capture request 1110, the encryption public key certificate 1115, the signature public key certificate 1120, and digital signature 1125. In function block 1030, merchant computer system 130 generates a random encryption key 1140, denoted as RK-3. Random encryption key RK-3 1140 is a symmetric encryption key. FIG. 11C depicts random encryption key RK-3 1140. In function block 1040, merchant computer system 130 encrypts combined block 1130 using random encryption key RK-3 1140 to form encrypted combined block 1150. FIG. 11D depicts encrypted combined block 1150. The encryption state of encrypted combined block 1150 is graphically shown by random key lock 1155, which indicates that encrypted combined block 1150 is encrypted using random key RK-3 1140. In function block 1050, merchant computer system 130 encrypts random encryption key RK-3 1140 using the public key of payment gateway system 140 to form encrypted random key 1160. FIG. 11E depicts encrypted random key 1160. The encryption state of encrypted random key 1160 is graphically shown by payment gateway public key lock 1165, which indicates that encrypted random key RK-3 1160 is encrypted using the payment gateway public key.

Figure 11F:
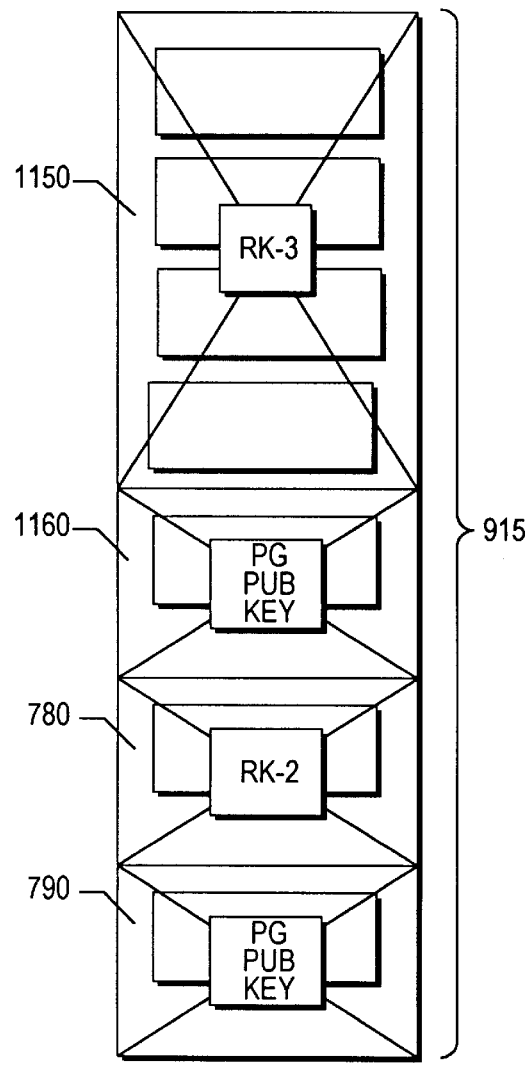

In function block 1060, merchant computer system 130 concatenates encrypted combined block 1150, encrypted random key 1160, and the encrypted capture token 780 and encrypted random key RK-2 790 that were stored in function block 850 to form merchant capture request 915. FIG. 11F depicts merchant capture request 915, comprising encrypted combined block 1150, encrypted random key 1160, encrypted capture token 780 and encrypted random key RK-2 790. In function block 1070, merchant computer system 130 transmits merchant capture request 915 to payment gateway system 140.

Payment Capture Request Processing

FIG. 12 depicts the detailed steps of processing a payment capture request and generating and transmitting a payment capture request response. Function blocks 1210 through 1245 depict the steps of processing a payment capture request, while function blocks 1250 through 1285 depict the steps of generating and transmitting a payment capture request response. In function block 1210, payment gateway computer system 140 applies its private key to encrypted random key 1160 contained within received merchant capture request 915, thereby decrypting it and obtaining a cleartext version of random key RK-3 1140. In function block 1215, payment gateway computer system 140 applies random key RK-3 1140 to encrypted combined block 1150, thereby decrypting it and obtaining a cleartext version of combined block 1130. Combined block 1130 comprises basic capture request 1110, a copy of merchant computer system's 130 encryption public key certificate 1115 and a copy of merchant computer system's 130 signature public key certificate 1120, as well as merchant digital signature 1125. In function block 1220, payment gateway computer system 140 verifies merchant computer system's 130 encryption public key certificate 1115 and merchant computer system's 130 signature public key certificate 1120. Payment gateway computer system 140 performs this verification by making a call to the certification authorities associated with each certificate. If verification of either certificate fails, payment gateway computer system 140 rejects the capture request.

In function block 1225, payment gateway computer system 140 validates merchant digital signature 1125. Payment gateway computer system 140 performs this validation by calculating a message digest over the contents of the combined basic capture request 1110, the encryption public key certificate 1115 and the signature public key certificate 1120. Payment gateway computer system 140 then decrypts digital signature 1125 to obtain a copy of the equivalent message digest calculated by merchant computer system 130 in function block 1020. If the two message digests are equal, the digital signature 1125 is validated. If validation fails, payment gateway computer system 140 rejects the capture request. In function block 1230, payment gateway computer system 140 applies its private key to encrypted random key RK-2 790 contained within received merchant capture request 915, thereby decrypting it and obtaining a cleartext version of random key RK-2 775. In function block 1235, payment gateway computer system 140 applies random key RK-2 775 to encrypted capture token 780, thereby decrypting it and obtaining a cleartext version of capture token 770.

In function block 1240, payment gateway computer system 140 verifies that a proper transaction is being transmitted between capture token 780 and capture request 1110. A capture token contains data that the gateway generates at the time of authorization. When the authorization is approved, the encrypted capture token is given to the merchant for storage. At the time of capture, the merchant returns the capture token to the gateway along with other information required for capture. Upon receipt of the capture token, the gateway compares a message made of the capture request data and the capture token data and transmits this information over a traditional credit/debit network. If an improperly formatted transaction is detected, payment gateway computer system 140 rejects the capture request. In function block 1245, payment gateway computer system 140 determines the financial institution for which capture is requested by inspection of basic capture request 1110. Payment gateway computer system 140 contacts the appropriate financial institution using a secure means, e.g., a direct-dial modem-to-modem connection, or a proprietary internal network that is not accessible to third parties, and using prior art means, instructs a computer at the financial institution to perform the requested funds transfer.

Payment Capture Response Generation

Function blocks 1250 through 1285 depict the steps of generating and transmitting a payment capture response. FIGS. 13A through 13F depict views of the payment capture response and its component parts.

Figure 13A:
FIGS. 13A through 13F depict views of the payment capture response and its component parts in accordance with a preferred embodiment.

In function block 1250, payment gateway computer system 140 creates a basic capture response 1310. The basic capture response 1310 is a data area that includes all the information to indicate whether a capture request was granted or denied. FIG. 13A depicts basic capture response request 1310.

In function block 1255, payment gateway computer system 140 combines basic capture response 1310, and a copy of its signature public key certificate 1320. Payment computer system 140 calculates a digital signature 1325 for the combined contents of the combined block 1330 comprising basic capture response 1310 and the signature public key certificate 1320, and appends the signature to the combination of the combined basic capture request 1310 and the signature public key certificate 1320. The payment gateway computer system calculates digital signature 1325 by first calculating a message digest over the contents of the combined basic capture response 1310 and signature public key certificate 720. The message digest is then encrypted using the merchant computer system's 140 digital signature private key, thus forming a digital signature.

Figure 13B:
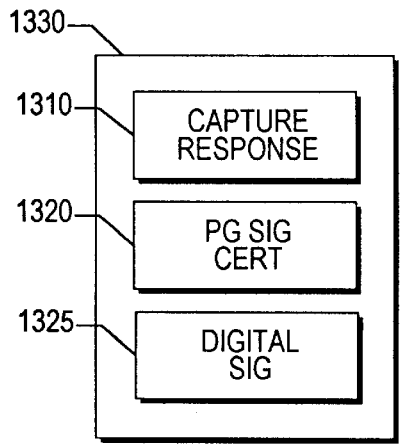
Figure 13C:
Figure 13D:
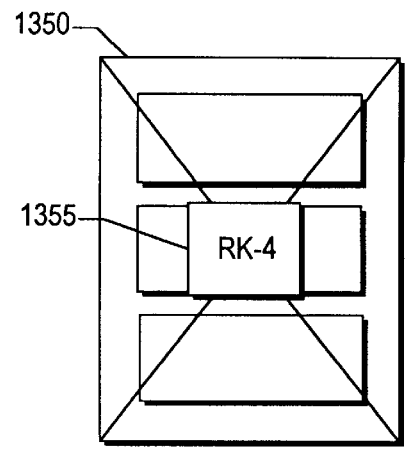
Figure 13E:
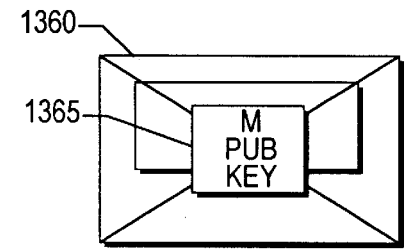
Figure 13F:
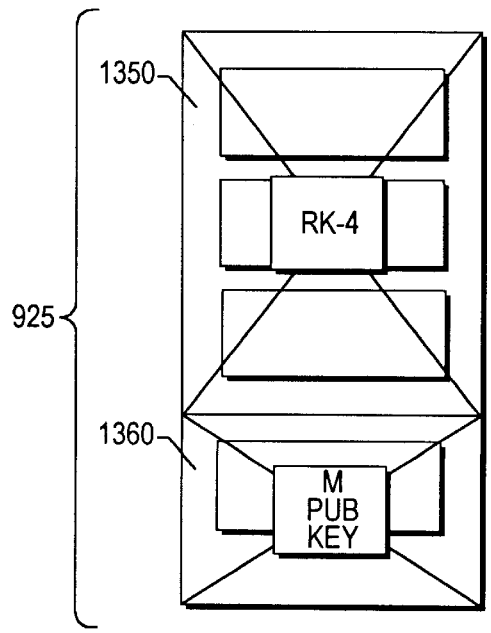

FIG. 13B depicts the combined block 1330 formed by function block 1255 and containing basic capture request 1310, the signature public key certificate 1320, and digital signature 1325. In function block 1260, payment gateway computer system 140 generates a symmetric random encryption key 1340, denoted as RK-4. FIG. 13C depicts random encryption key RK-4 1340. In function block 1275, payment gateway computer system 140 encrypts combined block 1330 using random encryption key RK-4 1340 to form encrypted combined block 1350. FIG. 13D depicts encrypted combined block 1350. The encryption state of encrypted combined block 1350 is graphically shown by random key lock 1355, which indicates that encrypted combined block 1350 is encrypted using random key RK-4 1340. In function block 1275, payment gateway computer system 140 encrypts random encryption key RK-4 1340 using the public key of merchant computer system 130 to form encrypted random key RK-4 1360. FIG. 13E depicts encrypted random key RK-4 1360. The encryption state of encrypted random key 1360 is graphically shown by merchant public key lock 1365, which indicates that encrypted random key 1360 is encrypted using the merchant public key. In function block 1280, payment gateway computer system 140 concatenates encrypted combined block 1350 and encrypted random key RK-4 1360 to form merchant capture response 925. FIG. 13F depicts merchant capture response 925 comprising encrypted combined block 1350 and encrypted random key RK-4 1360. In function block 1285, payment gateway computer system 140 transmits merchant capture response 925 to merchant system 130.

Payment Capture Response Processing

Figure 14:
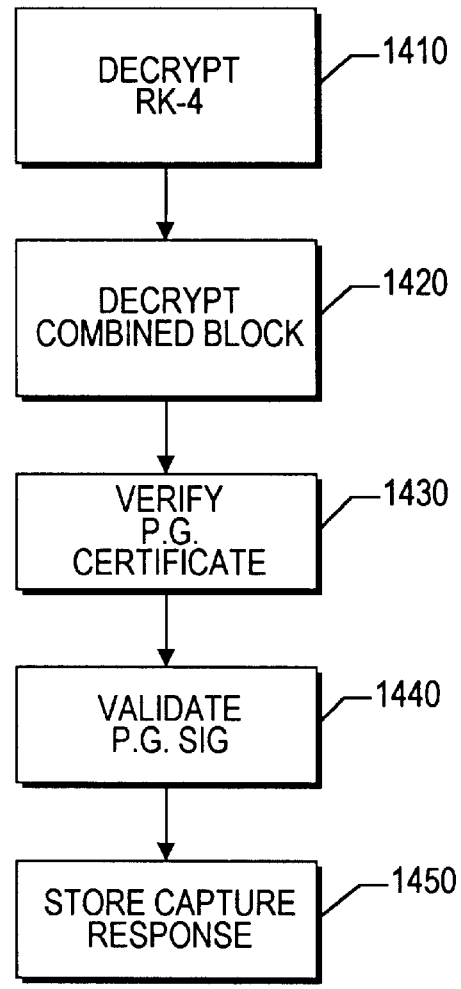
FIG. 14 depicts the detailed steps of processing a payment capture response in accordance with a preferred embodiment.

FIG. 14 depicts the detailed steps of processing a payment capture response. In function block 1410, merchant computer system 130 applies its private key to encrypted random key RK-4 1360 contained within received merchant capture response 925, thereby decrypting it and obtaining a cleartext version of random key RK-4 1340. In function block 1420, merchant computer system 130 applies random key RK-4 1340 to encrypted combined block 1350, thereby decrypting it and obtaining a cleartext version of combined block 1330. Combined block 1330 comprises basic capture response 1310, a copy of payment gateway computer system's 140 signature public key certificate 1320, as well as payment gateway digital signature 1325. In function block 1430, merchant computer system 130 verifies payment gateway computer system's 140 signature public key certificate 1320. Merchant computer system 130 performs this verification by making a call to the certification authority associated with the certificate. If verification of the certificate fails, merchant computer system 130 concludes that the capture response is counterfeit and raises an error condition.

In function block 1440, merchant computer system 130 validates payment gateway digital signature 1325. Merchant computer system 130 performs this validation by calculating a message digest over the contents of the combined basic capture response 1310 and the signature public key certificate 1320. Merchant computer system 130 then decrypts digital signature 1325 to obtain a copy of the equivalent message digest calculated by payment gateway computer system 140 in function block 1255. If the two message digests are equal, the digital signature 1325 is validated. If validation fails, merchant computer system 130 concludes that the authorization response is counterfeit and raises an error condition. In function block 1450, merchant computer system 130 stores capture response for later use in by legacy system accounting programs, e.g. to perform reconciliation between the merchant operating merchant computer system 130 and the financial institution from whom payment was requested, thereby completing the transaction. The system of the present invention permits immediate deployment of a secure payment technology architecture such as the SET architecture without first establishing a public-key encryption infrastructure for use by consumers. It thereby permits immediate use of SET-compliant transaction processing without the need for consumers to migrate to SET-compliant application software.

Virtual Point of Sale (VPOS) Details

A Virtual Point of Sale (VPOS) Terminal Cartridge is described in accordance with a preferred embodiment. The VPoS Terminal Cartridge provides payment functionality similar to what a Verifone PoS terminal ("gray box") provides for a merchant today, allowing a merchant to process payments securely using the Internet. It provides full payment functionality for a variety of payment instruments.

Payment Functionality

Figure 15A:
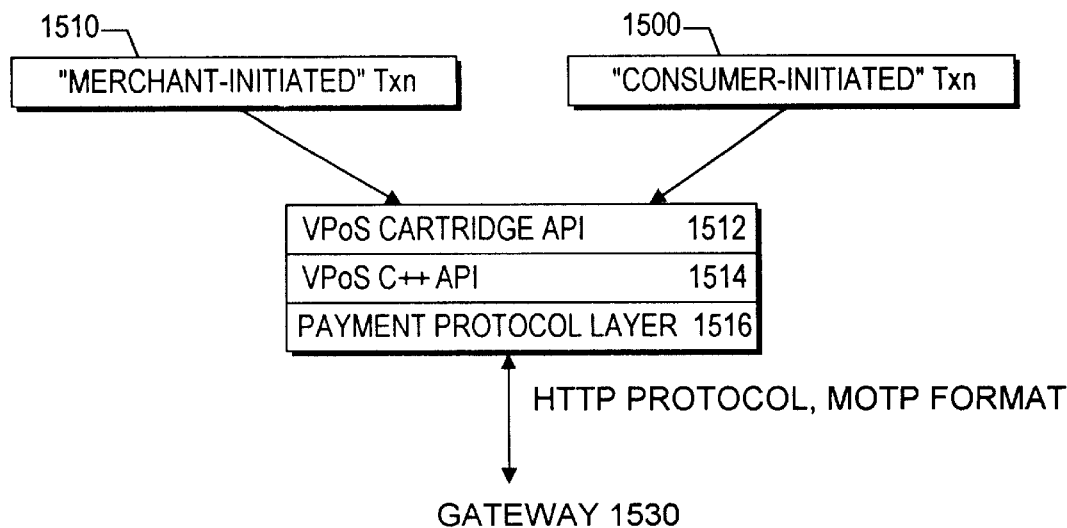
FIG. 15A & 15B depicts transaction processing of merchant and consumer transactions in accordance with a preferred embodiment.

FIG. 15A illustrates a payment processing flow in accordance with a preferred embodiment. The payment functionality provided by the VPoS terminal is divided into two main categories: "Merchant-Initiated" 1510 and "Consumer-Initiated" 1500. Some payment transactions require communication with the Acquirer Bank through the Gateway 1530. The normal flow of a transaction is via the VPoS Cartridge API 1512 to the VPoS C++ API 1514 into the payment protocol layer 1516 which is responsible for converting into legacy format for utilization with existing host payment authorization systems. The output from the payment protocol layer 1516 is transmitted to the authorization processing center via the gateway 1530. These transactions are referred to as "Online Transactions" or "Host Payments." The transactions that can be done locally by the merchant without having to communicate with the Acquirer Bank are referred to as "Local Functions and Transactions." To support different types of payment instruments, the VPoS Terminal payment functionality is categorized as set forth below.

Host Payment Functionality

These transactions require communication with the final host, either immediately or at a later stage. For example, an Online Authorization-Only transaction, when initiated, communicates with the host immediately. However, an Off-line Authorization-Only transaction is locally authorized by the VPoS terminal without having to communicate with the host, but at a later stage this off-line authorization transaction is sent to the host. Within the Host Payment Functionality some transactions have an associated Payment Instrument, while others do not. These two kinds of transactions are:

Host Financial Payment Functionality

These transactions have a Payment Instrument (Credit Card, Debit Card, E-Cash, E-Check, etc.) associated with them. For example, the "Return" transaction, which is initiated upon returning a merchandise to the merchant.

Host Administrative Payment Functionality

These transactions do not require a payment instrument, and provide either administrative or inquiry functionality. Examples of these transactions are "Reconcile" or the "Batch Close."

Local Functions and Transactions

These transactions do not require communication with the host at any stage, and provide essential VPoS terminal administrative functionality. An example of this is the VPoS terminal configuration function, which is required to set up the VPOS terminal. Another example is the "VPoS Batch Review" function, which is required to review the different transactions in the VPoS Batch or the Transaction Log.

Payment Instruments

A preferred embodiment of a VPoS terminal supports various Payment Instruments. A consumer chooses a payment based on personal preferences. Some of the Payment Instruments supported include:

Credit Cards
Debit Cards
Electronic Cash
Electronic Checks
Micro-Payments (electronic coin)
Smart Cards

URL Table

The table below enumerates the URLs corresponding to the transactions supported by the VPoS Terminal Cartridge.

Note that the GET method is allowed for all transactions; however, for transactions that either create or modify information on the merchant server, a GET request returns an HTML page from which the transaction is performed via a POST method.

| Transaction | URL | POST | Access Control |
|---|---|---|---|
| HOST FINANCIAL PAYMENT FUNCTIONALITY | | | |
| auth capture | /vpost/mi/authcapture/ | allowed | merchant login/password |
| auth capture | /vpost/ci/authcapture/ | allowed | no access control |
| auth only | /vpost/mi/authonly/ | allowed | merchant login/password |
| auth only | /vpost/ci/authonly/ | allowed | no access control |
| adjust | /vpost/mi/adjust/ | allowed | merchant login/password |
| forced post | /vpost/mi/forcedpost/ | allowed | merchant login/password |
| offline auth | /vpost/mi/offlineauth/ | allowed | merchant login/password |
| offline auth | /vpost/ci/offlineauth/ | allowed | no access control |
| pre auth | /vpost/mi/preauth/ | allowed | merchant login/password |
| pre auth comp | /vpost/mi/preauthcomp/ | allowed | merchant login/password |
| return | /vpost/mi/return | allowed | merchant login/password |
| return | /vpost/ci/return/ | allowed | no access control |
| void | /vpost/mi/void/ | allowed | merchant login/password |
| HOST ADMINISTRATIVE PAYMENT FUNCTIONALITY | | | |
| balance inquiry | /vpost/mi/bi/ | not allowed | merchant login/password |
| host logon | /vpost/mi/hostlogon/ | allowed | merchant login/password |
| parameter download | /vpost/mi/parametersdnld/ | not allowed | merchant login/password |
| reconcile | /vpost/mi/reconcile/ | allowed | merchant login/password |
| test host | /vpost/mi/testhost/ | not allowed | merchant login/password |
| LOCAL FUNCTIONS & TRANSACTIONS | | | |
| accum review | /vpost/mi/accum/review/ | not allowed | merchant login/password |
| batch review | /vpost/mi/batch/review/ | not allowed | merchant login/password |
| cdt review | /vpost/mi/cdt/review/ | not allowed | merchant login/password |
| cdt update | /vpost/mi/cdt/update/ | allowed | merchant login/password |
| cpt review | /vpost/mi/cpt/review | not allowed | merchant login/password |
| cpt update | /vpost/mi/cpt/update/ | allowed | merchant login/password |
| clear accum | /vpost/accum/clear/ | allowed | merchant login/password |
| clear batch | /vpost/mi/batch/clear/ | allowed | merchant login/password |
| hdt review | /vpost/mi/hdt/review/ | not allowed | merchant login/password |
| hdt update | /vpost/mi/hdt/update/ | allowed | merchant login/password |
| lock vpos | /vpost/mi/lock/ | allowed | merchant login/password |
| query txn | /vpost/ci/querytxn/ | not allowed | no access control |
| query txn | /vpost/mi/querytxn/ | not allowed | merchant login/password |
| tct review | /vpost/mi/tct/review/ | not allowed | merchant login/password |
| tct update | /vpost/mi/tct/update/ | allowed | merchant login/password |
| unlock vpos | /vpost/mi/unlock/ | allowed | merchant login/password |

URL Descriptions

This section describes the GET and POST arguments that are associated with each transaction URL. It also describes the results from the GET and POST methods. For URLs that produce any kind of results, the following fields are present in the HTML document that is returned by the VPoS Terminal Cartridge:

| | |
|---|---|
| txnDate | Date of the transaction (mm/dd/yy or dd/mm/yy) |
| txnTime | Time of the transaction (hh:mm:ss GMT or hh:mm:ss local time) |
| merchantId | Merchant ID of the merchant using the VPoS terminal |
| terminalId | VPoS Terminal Id |
| txnNum | Transaction number of the given transaction |
| txnType | Type of transaction |

For URLs that deal with financial transactions, the following fields are present in the HTML document that is returned by the VPoS terminal cartridge:

| | |
|---|---|
| txnAmount | Transaction amount that is being authorized, forced posted, voided, etc. |
| poNumber | Purchase order number |
| authIdentNum | Authorization ID number for the transaction |
| retRefNum | Retrieval reference number for the given transaction |
| piInfo | Payment instrument information. This varies for different payment instruments. For example, in the case of credit cards, the credit card number (piAcctNumber) and expiration date (piExpDate) are returned. |

Accumulate Review

URL Functionality: This is a local information inquiry function that retrieves the local (merchant's) transaction totals (accumulators).

GET Arguments: None.

GET Results: Retrieves the transaction totals for the merchant. Currently, the total is returned as an HTML document. The transaction totals currently returned are:

| | |
|---|---|
| creditAmt | Total Credit Amount since the last settlement logged in the VPoS terminal |
| creditCnt | Total Credit Count since the last settlement logged in the VPoS terminal |
| debitAmt | Total Debit Amount since the last settlement logged in the VPoS terminal |
| debitCnt | Total Debit Count since the last settlement logged in the VPoS terminal |

Note: Accum Review is a local function, as opposed to Balance Inquiry which is done over the Internet with the host.

Adjust

URL Functionality: Corrects the amount of a previously completed transaction.

GET Arguments: None

GET Results: Because the Adjust transaction modifies data on the merchant server, the POST method should be used. Using the GET method returns an HTML form that uses the POST method to perform the transaction.

POST Arguments:

| | |
|---|---|
| pvsTxnNum | Previous transaction number |
| txnAdjustedAmount | The adjusted transaction amount. Note that the original transaction amount is easily retrievable from the previous transaction number. |

POST Results: On success, pvsTxnNum and txnAdjustedAmount are presented in the HTML document, in addition to the transaction fields described above.

Auth Capture

URL Functionality: This transaction is a combination of Auth Only (Authorization without capture) and Forced Post transactions.

GET Arguments: None

GET Results: Because the Auth Capture transaction modifies data on the merchant server side, the POST method should be used. Using the GET method returns an HTML form that uses the POST method to perform the transaction.

POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields described above is returned. On failure, an HTML document that contains the reason for the failure of the transaction is returned. The transaction is logged into a VPoS Terminal transaction log for both instances.

Auth Only

URL Functionality: Validates the cardholder's account number for a Sale that is performed at a later stage. The transaction does not confirm the sale to the host, and there is no host data capture. The VPoS captures this transaction record and later forwards it to confirm the sale in the Forced Post transaction request.

GET Arguments: None.

GET Results: Because the Auth Only transaction modifies data on the merchant server side, the POST method should be used. Using the GET method returns an HTML form that uses the POST method to perform the transaction.

POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields is returned. On failure, an HTML document that contains the reason for the failure of the transaction is returned. The transaction is logged into VPoS Terminal transaction log for both instances.

NOTE: The /vpost/ci/authonly/ URL should be used for customer-initiated transactions. /vpost/mi/authonly/ should be used for merchant-initiated transactions.

Balance Inquiry

URL Functionality: Performs an on-line inquiry or the merchant's balance.

GET Arguments: None

GET Results:

| | |
|---|---|
| mrchtBlnceAmt | Merchant balance amount for a given merchant. The balance amount at any given time is the difference between the credit and debit amount since the last settlement between the merchant and the acquirer. |

Batch Review

URL Functionality: Retrieves all records from the transaction log or the batch.

GET Arguments: None

GET Results: The GET method retrieves the transactions that have been batched in the VPoS terminal for future reconciliation. The batch can be cleared from the VPoS terminal after a manual reconciliation between the acquirer and the VPoS. The batch data is retrieved as a set of records and is formatted as a table in the HTML document. The following fields are present in a typical record:

| | |
|---|---|
| nTransType | Transaction type |
| nPurchOrderNo | Purchase order number |
| szAcctNum | Customer's payment instrument account number |
| szExpDate | Customer's payment instrument expiration date |
| szTransAmt | Transaction amount |
| szTransDate | Transaction date |
| szTransTime | Transaction time |
| szRetrievalRefNum | Transaction's retrieval reference number |
| szAuthId | Authorization ID for the transaction |
| szOrigAmt | Original transaction amount |
| szBatchNum | Batch number for the given transaction |
| nCurrencyType | Currency in which the transaction was done |
| lnTransNum | Transaction number |

CDT Review

URL Functionality: Displays the VPoS terminal configuration data corresponding to the Card Definition Table (CDT).

GET Arguments: None

GET Results: The GET method returns a default HTML form that contains the current configuration values. The form can be modified and posted using the /vpost/mi/cdt/update/ URL to update the card definition table. Not all fields in the card definition table are editable. The following fields are returned in a form to the user:

| | |
|---|---|
| nHostIndex | Index into the Host Definition Table or the Acquirer that maps to this card issuer. |
| szPANLo | Low end of the PAN (Primary Account Number) range |
| szPANHi | High end of the PAN range |
| nMaxPANDigit | Maximum number of digits in the PAN for this acquirer. |
| NMinPANDigit | Minimum number of dits in the PAN for the acquirer |
| szCardLabel | Card Issuer's name |
| Transactions Available bit vector | Specifies if a particular transaction is allowed for a given card range. |

(Some of these fields are not editable by a merchant, and still need to be determined.)

CDT Update

URL Functionality: Updates the VPoS terminal configuration data corresponding to the Card Definition Table (CDT).

GET Arguments: None

GET Results: The GET method returns a default HTML form that contains the current configuration values. The form can be filled out and posted using the /vpost/mi/cdt/update URL to update the card definition table.

POST Arguments: (Editable CDT fields need to be decided.)

POST Results: (Depends on editable CDT fields, and therefore needs to be decided.)

Clear Accumulator

URL Functionality: Zeroes out the accumulator totals currently resident in the VPoS terminal.

GET Arguments: None.

GET Results: Presents a form that uses the POST method to zero the accumulators.

POST Arguments: None.

POST Results: Zeroes the accumulators/transaction totals in the VPoS terminal.

Clear Batch

URL Functionality: Zeroes out the transaction logs currently batched in the VPoS terminal.

GET Arguments: None.

GET Results: Presents a form that uses the POST method to clear the batch.

POST Arguments: None.

POST Results: Zeroes the transactions that comprise the batch in the VPoS terminal.

Forced Post

URL Functionality: Confirms to the host the completion of a sale, and requests for data capture of the transaction. This is used as a follow-up transaction after doing an Authorization (Online or Off-line) transaction.

GET Arguments: None.

GET Results: Returns the HTML form for performing the Forced Post transaction.

POST Arguments:

| | |
|---|---|
| pvsTxnNum | the previous transaction number from an auth only transaction |

POST Results: On success, pvsTxnNum is presented in the HTML document. On failure, an HTML document is returned that contains the reason for the failure of the transaction.

HDT Review

URL Functionality: Displays the VPoS terminal configuration data corresponding to the Host Definition Table (HDT).

GET Arguments: None

GET Results: The GET method returns a default HTML form that contains the current configuration values. The form can be modified and posted using the /vpost/mi/hdt/update URL to update the hosts definition table. Not all fields in the host definition table are editable. The following fields are returned in a form to the user:

| | |
|---|---|
| szTermId | Terminal ID for this VPoS terminal |
| szMerchId | Merchant ID for this VPoS terminal |
| szCurrBatchNum | Current batch number existing on the VpoS |
| szTransNum | Reference number for the next transaction in the VPoS transaction log/batch. This is generated by VPoS and is not editable by the merchant. |
| szTPDU | Transport Protocol Data Unit Required for building the ISO 8583 packet. |
| InSTAN | System trace number; message number of the next transaction to be transmitted to this acquirer. |
| szNII | Network International Number. Required for building the ISO 8583 packet. |
| szHostName | Name for identifying the host. |
| nHostType | Host type |
| nNumAdv | Number of off-line transactions that can be piggy-backed at the end of an on-line transaction. |
| Data Capture Required Bit vector: | Specifies for which transactions data capture is required. |

(Some of these fields are not editable by a merchant and need to be determined.)

HDT Update

URL Functionality: Updates the VPoS terminal configuration data corresponding to the Host Definition Table (HDT).

GET Arguments: None

GET Results: The GET method returns a default HTML form that contains the current configuration values. The form can be filled out and posted to the merchant server using the /vpost/mi/hdt/update URL to update the host definition table

Unlock VPOS

URL Functionality: Local function that starts the VPOS at the start of the day.

GET Arguments: None.

GET Results: Returns an HTML form that uses the POST method to perform this transaction.

POST Arguments: None.

POST Results: Resets a Boolean flag on the merchant server that enables transactions to be accepted by the VPoS terminal.

Offline Auth

URL Functionality: This transaction is same as the "Authorization Only" transaction, except that the transaction is locally captured by the VPoS terminal without having to communicate with the host. A Forced Post operation is done as a follow-up operation of this transaction.

GET Arguments: None.

GET Results: Because the Offline Auth transaction modifies data on the merchant server side, the POST method should be used. Using the GET method returns an HTML form for using the POST method to perform the transaction.

POST Arguments:

| piAcctNumber | Payment Instrument account number, e.g., Visa credit card number |
| piExpDate | Expiration date |
| txnAmt | Transaction amount |

POST Results: On success, an HTML document that contains the transaction fields described in Section 4.1 is returned. On failure, an HTML document that contains the reason for the failure of the transaction is returned. The transaction is logged into VPoS terminal transaction log for both instances.

Parameter Download

URL Functionality: Downloads the VPoS configuration information from the host and sets up the VPOS in the event of the configuration data being changed.

GET Arguments: None

GET Results: Retrieves an HTML form that uses the POST method for the parameter download transaction.

POSPOST Result: None.

POST Results: Downloads the following parameters from the host and uploads them into the VPoS terminal configuration table.

card/issuer definition table (CDT)
host/acquirer definition table (HDT)
communications parameter table (CPT)
terminal configuration table (TCT)

The various configuration parameters can be reviewed and modified using the URLs for the desired functionality.

Pre Auth

URL Functionality: Used in lodging and hotel establishments to pre-authorize a charge that is completed some time in future.

GET Arguments: None

GET Results: Retrieves the HTML form for posting the pre-authorizaton transaction.

POST Arguments:

| piAcctNumber | Payment Instrument account number, e.g., Visa credit card number |
| piExpDate | Expiration date |

Pre Auth Comp

URL Functionality: Completes a pre-authorization transaction.

GET Arguments: None

GET Results: Retrieves the HTML form for posting the pre-authorization completion transaction.

POST Arguments:

| pvsTxnNum | Previous transaction number from an auth only transaction |

POST Results: On success, pvsTxnNum is presented in the HTML document. On failure, an HTML document is returned that contains the reason for the failure of the transaction.

Reconcile

URL Functionality: This transaction is done at the end of the day to confirm to the host to start the settlement process for the transactions captured by the host for that particular VPoS batch.

GET Arguments: None

GET Results: Retrieves the HTML form for posting the Reconcile transaction.

POST Arguments: None.

POST Results: On success, the reconcile function prints any discrepancies in the merchant's batch of transactions and totals vis-a-vis the host's batch of transactions in totals. The output format is a combination of the output of the Batch Review and Accum Review transactions.

Return

URL Functionality: Credits the return amount electronically to the consumer's account when previously purchased merchandise is returned. The VPoS terminal captures the transaction record for this transaction.

GET Arguments: None

GET Results: Retrieves the HTML form for posting the Return transaction.

POST Arguments:

| prevTxnNum | Reference to the previous transaction number |

The previous transaction has access to the following fields:

| txnAmount | Transaction amount |
| piAccountNum | Payment instrument account number |
| piExpDate | Payment instrument expiration date |

POST Results: On success, pvsTxnNum is presented in the HTML document, in addition to

Test Host

URL Functionality: Checks the presence of the host and also the integrity of the link from the VPoS to the host.

GET Arguments: None.

GET Results: On success, an HTML document is returned that reports success in connecting to the host. On failure, an HTML document is returned that reports the error encountered in testing the host.

Lock VPOS

URL Functionality: This local function locks or stops the VPoS terminal from accepting any transactions.

GET Arguments: None.

GET Results: Returns an HTML form that posts the locking of the VPoS terminal.

POST Arguments: None.

POST Results: On success, an HTML document is returned that contains the status that VPoS terminal was successfully. On failure, an HTML document is returned that reports the cause of failure of the operation, e.g., access denied, the VPoS terminal is already locked or is presently processing a transaction, etc.

Void

URL Functionality: Cancels a previously completed draft capture transaction.

GET Arguments: None.

GET Results: Retrieves an HTML form for posting the Void transaction.

POST Arguments:

| pvsTxnNum | Transaction number from a previous Auth Only transaction. |

Host Logon

URL Functionality: Administrative transaction used to sign-on the VPoS with the host at the start of the day, and also to download encryption keys for debit transactions.

GET Arguments: None

GET Results: Retrieves an HTML form for posting the Host Logon transaction.

POST Arguments: None.

POST Results: Currently, debit card based transactions are not supported. The result is an HTML document indicating the success or failure of the host logon operation.

CPT Review

URL Functionality: Returns the VPoS terminal configuration data corresponding to the Communications Parameter Table (CPT).

GET Arguments: None

GET Results: The GET method returns a default HTML form that contains the current configuration values corresponding to the VPoS terminal's communication parameters. The form can be filled out and posted to the merchant server using the /vpost/mi/cpt/update URL to update the communications parameter table. The following fields are returned in a form to the user:

| szAcqPriAddress | Primary Host address |
| szAcqSecAddress | Secondary Host address |
| szActTerAddress | Tertiary Host address |
| nRespTimeOut | Time-out value (in seconds) before which the VPoS should receive a response from the host |

CPT Update

URL Functionality: Updates the VPoS terminal configuration data corresponding to the Communications Parameter Table (CPT).

GET Arguments: None

GET Results: The GET method returns a default HTML form that contains the current configuration values. The form can be modified and posted to update the communication parameter table.

POST Arguments:

| szAcqPriAddress | Primary Host address |
| szAcqSecAddress | Secondary Host address |
| szActTerAddress | Tertiary Host address |
| nRespTimeOut | Time-out value (in seconds) before which the VPoS should receive a response from the host |

POST Results: On success, the HTML document returned by the VPoS contains the values set by the merchant. On failure, the HTML document contains the reason for the failure of the invocation of the URL.

TCT Review

URL Functionality: Returns the VPoS terminal configuration data corresponding to the Terminal Configuration Table (TCT).

GET Arguments: None.

GET Results: The GET method returns a default HTML form that contains the current configuration values. The form can be filled out and posted using the /vpost/mi/tct/update URL to update the terminal configuration table. The following fields are returned in a form to the user:

| szMerchName | Merchant name |
| szSupervisorPwd | Supervisor password |
| fvPOSLock | 1 = VPoS locked, 0 = VPoS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

TCT Update

URL Functionality: Updates the VPoS terminal configuration data corresponding to the Terminal Configuration Table (TCT).

GET Arguments: None

GET Results: The GET method returns a default HTML form that contains the current configuration values. The form can be filled out and posted using the /vpost/mi/tct/update URL to update the terminal configuration table.

POST Arguments: All arguments in TCT Review functionality are the returned values from the /vpost/mi/tct/update the URL.

| | |
|---|---|
| szMerchName | Merchant name |
| szSupervisorPwd | Supervisor password |
| fvPOSLock | 1 = VPoS locked, 0 = VPoS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

POST Results: On success, the POST modifies values of the terminal configuration table parameters. On failure, the HTML document contains the reason for the failure of the transaction.

Query Transactions

URL Functionality: Permits the merchant and customer to query a given transaction corresponding to a transaction number.

GET Arguments:

| | |
|---|---|
| txnNum | Transaction number |

GET Results: For a given transaction, the URL returns an HTML document. If a transaction refers to an older transaction, the transaction's entire history is made available.

URL results

Depending upon the method (GET/POST) as well as the success or failure of the HTTP request, different documents are returned to the user. The VPoS terminal provides a framework whereby different documents are returned based upon a number of preferences. Currently the language and content-type are supported as preferences.

A simple framework is proposed here. Each of the transaction has a set of documents associated with it: form for the payment transaction, GET success, GET failure, POST success, and POST failure.

In the directory structure defined below, documents are stored corresponding to the preferences. The top level of the directory structure is the content-type, the next level is language (for NLS support). For example, to create text/html content in US English & French, the directory structure given below would contain the HTML documents for each of the transactions. The VPoS terminal cartridge has a configuration file that allows the user to specify the content-type as well as the language to be used for a cartridge. The first release of the VPoS terminal cartridge supports one content-type and language for each server.

Data Structures & Functions

Functions

A brief description of the Virtual Point of Sale Terminal cartridge functions are provided below. VPosTInit(), VPosTExec() and VPosTShut() are the entry points required for each cartridge in accordance with a preferred embodiment. The other functions implement some of the key VPoST cartridge functionality.

VPosTInit()

```
/* VPosT cartridge Initialization here */
WRBReturnCode
VPosTInit( void **clientCtx){
    vPosTCtx *vPosTCxp ;
    /* Allocate memory for the client context */
    if (!(vPosTCxp = (vPosTCtx *)malloc(sizeof(vPosTCtx))))
        return WRB_ERROR;
    *clientCtx = (void *)vPosTCxp ;
    return (WRB_DONE) ;}
```

VPosTShut()

```
WRBReturnCode
VPosTShut( void *WRBCtx, void *clientCtx){
    *WRBCtx; /* not used */
    assert( clientCtx) ;
    /* Free the client context allocated in VPosTInit() routine
        free( clientCtx ) ;
    return (WRB_DONE) ;}
```

VPosTExec()

```
/* The driver cartridge routine */
WRBReturnCode
VPosTExec( void *WRBCtx, void *clientCtx )
{
    vPoSTCtx    *vPosTCxp ;
    char    *uri ;
    char    *txnMethod ;    /*HTTP method */
    enum eVPoSTTxn *tn ; /* VPosT transaction */
    char    *txnOutFile ; /* Output file from transaction */
    char    **txnEnv ; /* environment variables values for transaction */
    char    *txnContent ; /* transaction's POST data content */
    WRBEntry    *WRBEntries ;
    int    numEntries;
    vPosTCxp = (vPosTCtx *) clientCtx ;
    /* WRBGetURL gets the URL for the current request */
    if (!(uri = WRBGetURL( WRBCtx )))
        return (WRB_ERROR) ;
    /* WRBGetContent() gets the QueryString/POST data content */
    if (!(txnContent = WRBGetContent( WRBCtx ))) {
        return WRB_ERROR ;
    }
    /* WRBGetParserContent() gets the parsed content */
    if (WRB_ERROR == WRBGEtParsedContent( WRBCtx,
        &WRBEntries, &numEntries)) {
        return WRB_ERROR ;
    }
    /* WRBGetEnvironment() gets the HTTP Server Environment */
    if (!(txnEnv = WRBGetEnvironment( WRBCtx))){
        return WRB_ERROR ;
    }
    /* VPosTGetMethod() gets the method for the current request */
    if (!(method = VPosTGetMethod( txnEnv))){
        return (WRB_ERROR) ;
    }
    /* VPosTGetTxn() gets the VPosT transaction for the request */
    txn = VPosTGetTxn( uri );
    if (eTxnError == txn) {
        return (WRB_ERROR) ;
    }
    /* VPosTExecuteTransaction() executes the VPosT transaction */
    txnOutFile = VPosTExecuteTransaction( WRBCtx, txn, txnMethod,
        txnEnv, txnContent );
```

-continued

```
    if (!(txnOutFile)){
        return (WRB_ERROR);
    }
    /* Write out the file */
    VPosTWriteFile( txnOutFile ) ;
    return (WRB_DONE) ;
}
                        VPosTGetTxn()

enum eVPosTTxn
VPosTGetTxn( char *uri)
{
    /*
    *The function scans the uri and extracts the string
    *corresponding to the transaction and returns it to the
    *caller.
    */
}
```

Transaction Log format

This section describes the format of a record for the transaction log for the VPosT cartridge.

| Field Name | Field Description |
| --- | --- |
| nTransType | Transaction Type |
| nPurchOrderNo | Purchase Order Number |
| szAcctNum | Payment Instrument Account number |
| szExpDate | Payment instrument expiration date |
| szTransAmt | Transaction amount |
| szTransDate | Date of transaction (configurable to be mm/dd/yy or dd/mm/yy) |
| szTransTime | Time of transaction (configurable to be GMT or local time) |
| szRetrievalRefNum | Retrieval reference number |
| szAuthId | Authorization ID |
| szOrigAmt | Original transaction amount |
| szBatchNum | Batch number to which this particular transaction belongs in the VPoST batch |
| nCurrencyType | Currency |
| lnTransNum | Transaction number |

Figure 15B:
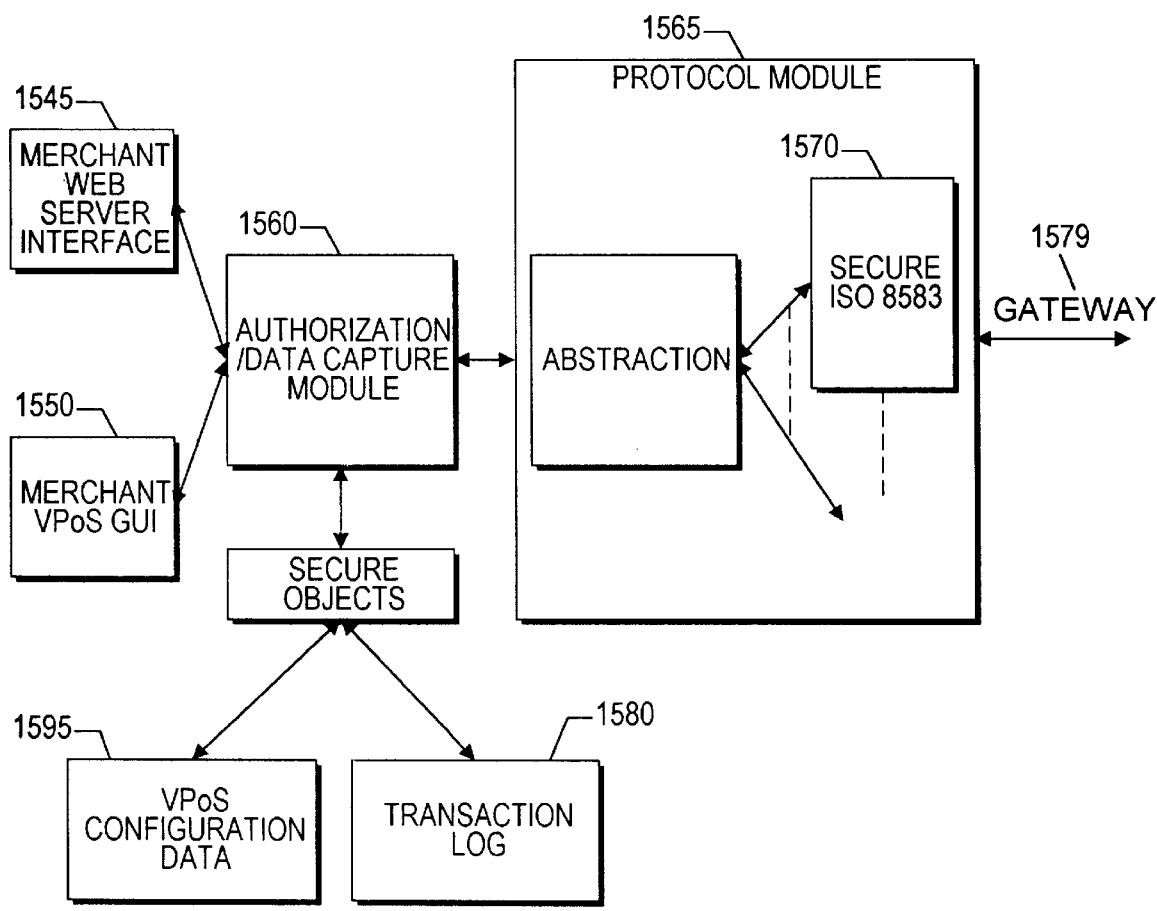

In the block diagram shown in FIG. 15B, the VPOS provides an interface for transactions which are initiated both by the consumer and the merchant. The merchant initiates a transaction from a Graphical User Interface (GUI) 1550 and all the transactions that are initiated by the consumer are routed by the Merchant WEB Server 1545.

The Authorization/Data Capture Module 1560 processes the requests originated by the merchant or the consumer and routes them to the Protocol Module 1565. The Protocol Module is responsible for building the payment protocol request packet (e.g., an SSL-encapsulated ISO 8583 packet) 1570 before sending the request to the Gateway 1579. Then, the Gateway 1579 awaits a response from the Protocol Module 1565, and upon receiving the response, the Gateway 1579 parses the data and provides unwrapped data to the Authorization/Data-Capture Module 1560. The Authorization/Data-Capture Module 1560 analyzes the response and updates the Transaction Log 1580. The Transaction Log 1580 contains information concerning any successfully completed transactions and the accumulators or the transaction totals. The VPOS terminal creates and maintains the Transaction Log 1580, and the VPOS Configuration Data 1585 contains information which is used to configure the behavior of the VPOS.

The entire VPOS functionality is thread-safe and hence using the VPOS in a multi-threaded environment does not require any additional interfacing requirements.

Payment Functionality

As discussed above, the different Payment Functionality provided by the VPOS terminal can be divided into two main categories as "Merchant Initiated" and "Consumer Initiated." Some of these transactions require communication with the Gateway and these transactions are referred to as "Online Transactions." The transactions which can be done locally to the merchant without having to communicate are referred to as "Local Functions/Transactions." In order to provide support for many different types of Payment Instruments, the VPOS Payment Functionality have been categorized.

Host payment functionality and transactions require communication with the host either immediately or at a later stage. Each of the host financial payment transactions come to this category and require a Payment Instrument. These transactions can be initiated with different types of Payment Instruments which the VPOS terminal supports.

An authorization without capture transaction is used to validate the card holder's account number for a sale that needs to be performed at a later stage. The transaction does not confirm a sale's completion to the host, and there is no host data capture in this event. The VPOS captures this transaction record and later forwards it to the host to confirm the sale in a forced post transaction request. An authorization without capture transaction can be initiated both by the consumer and the merchant.

A forced post transaction confirms to a host computer that a completion of a sale has been accomplished and requests data capture of the transaction. The forced post transaction is used as a follow-up transaction after doing an authorization (Online or Off-line) transaction. The transaction can be initiated only by the merchant.

The authorization with post transaction is a combination of authorization without capture and forced post transactions. This transaction can be initiated both by the consumer and the merchant.

The offline post transaction is identical to the "authorization without capture" transaction, except that the transaction is locally captured by the VPOS without initiating communication with a host. A forced post operation is done as a follow-up operation of this transaction. This transaction can be initiated by both the consumer and the merchant.

The return transaction is used to credit the return amount electronically to the consumer's account when a purchased merchandise is returned. The VPOS captures the return transaction record when the merchandise is returned, and this transaction can be initiated only by the merchant.

The void transaction cancels a previously completed draft capture transaction. The VPOS GUI provides an interface for retrieving a transaction record required to be voided from the batch and passes it to the Authorization/Data-Capture module after confirmation. The batch record is updated to reflect the voided transaction after getting an approval from the gateway. This transaction can be initiated only by the merchant.

The pre-authorization transaction is identical to the authorization without capture transaction, but the consumers' "open-to-buy" amount is reduced by the pre-authorization amount. An example of this type of transaction is the "check-in" transaction in a hotel environment. A check-in transaction sends a pre-authorization request to the host, so that an amount required for the customers' stay in the hotel is reserved. The pre-authorization transaction is followed by a pre-authorization complete transaction. This transaction can be initiated both by the consumer and the merchant.

The pre-authorization complete transaction is done as a follow-up to the pre-authorization transaction. This transaction informs the host of the actual transaction amount. The pre-authorization complete transaction amount could be more or less than the pre-authorization amount. An example is the "check-out" transaction in a hotel environment. The check-out amount can be less than or more than the check-in amount. This transaction can only be initiated by a merchant.

The adjust transaction is initiated to make a correction to the amount of a previously completed transaction. The adjust transaction can be initiated only by the merchant. The host administrative transactions do not require any payment instrument. The balance inquiry transaction is used for on-line inquiry into the balance of the merchant's account. The batch data or the configuration data is not affected by this transaction.

The reconciliation or close transaction is processed at the end of the day to start the settlement process for the transactions captured by the host for that particular VPOS.

The host log-on transaction is an administrative transaction which is used to synchronize the VPOS with the host at the start of the day and also initiate a fresh batch at the VPOS terminal.

The parameters download transaction is used to download the VPOS configuration information from the host and set-up the VPOS in the event of any change in the configuration data. A test transaction is used to detect the presence of a host and the status of a link from the VPOS to the host.

Local transactions or functions are initiated by a merchant and do not require communication with the gateway. These transactions can only be initiated by a merchant. The totals or accumulators review is a local information inquiry function and is used to retrieve the local (merchant's) totals. The detail transaction or the batch review function is used to retrieve all the records from the transaction log or the batch. The clear batch function is used to start a fresh batch. This transaction is utilized to electronically reconcile the VPOS with the host and to manually reconcile the VPOS with the host. After completing the manual reconciliation processing, the merchant can initiate this transaction to start a fresh batch.

The clear accumulator function is similar to the clear batch functionality and resets all VPOS terminal accumulators to zero. This function is required when the merchant is not able to reconcile the VPOS with the host electronically.

The VPOS unlock or start transaction is a local function used to start the VPOS at the start of the day. The VPOS lock or stop function is used to Lock or stop the VPOS from accepting any transactions. The VPOS configuration setup function is used to setup the VPOS configuration data. The VPOS configuration data is divided into different tables, for example, the Card/Issuer Definition Table (CDT), the Host/Acquirer Definition Table (HDT), the Communications Parameters Table (CPT) and the Terminal Configuration Table (TCT). The following sections explain each of these configuration tables in detail.

Host Definition Table (HDT)

The table contains information specific to the acquirer.

| Field | Attributes / Bytes | Field Description/Comments |
| --- | --- | --- |
| Terminal Identifier | ANS(20) | Terminal ID for this acquirer/host |
| Merchant Identifier | ANS(20) | Merchant ID for this acquirer/host |
| Current Batch Number | N(6) | Batch Number for the batch currently existing on the VPOS |
| Transaction Number | I(2) | Reference Number for next transaction in the VPOS transaction log/batch |
| TPDU | AN(10) | Transport Protocol Data Unit - Required for building the ISO 8583 packet. |
| STAN | L(4) | Systems Trace Number - Message Number of the transaction to be transmitted next for this acquirer. |
| NII | N(3) | Network International Identifier - Required for building the ISO 8583 packet. |
| Host Name or Label | ANS(20) | Name for identifying the host, e.g., "AMEX-SIN". This is only a text string and is used for the purpose of identifying the host. |
| No. of advice messages | I(2) | No. of off-line transactions (advice messages) that can be piggy-backed at the end of an on-line transaction. If set to zero then piggy-backing is disabled. |

The following fields specify whether Data Capture Required for a particular transaction for this acquirer.

| Field | Attributes / Bytes | Field Description/Comments |
| --- | --- | --- |
| Host Protocol Type | I(2) | Host Protocol type, e.g., ISO 8583, SET, etc., |
| Host Protocol Sub-Type | I(2) | Sub protocol type, e.g., AMEX-ISO8583, MOSET, etc., |
| Auth Only DC Flag | Bit(1 bit) | 1 = REQUIRED, 0 = NOT REQUIRED |
| Auth Capture DC Flag | Bit(1 bit) | 1 = REQUIRED, 0 = NOT REQUIRED |
| Adjust DC Flag | Bit(1 bit) | 1 = REQUIRED, 0 = NOT REQUIRED |
| Refund DC Flag | Bit(1 bit) | 1 = REQUIRED, 0 = NOT REQUIRED |
| Cash Advance DC Flag | Bit(1 bit) | 1 = REQUIRED, 0 = NOT REQUIRED |
| Cash Back DC Flag | Bit(1 bit) | 1 = REQUIRED, 0 = NOT REQUIRED |
| Off-line Auth DC Flag | Bit(1 bit) | 1 = REQUIRED, 0 = NOT REQUIRED |
| Void DC Flag | Bit(1 bit) | 1 = REQUIRED, 0 = NOT REQUIRED |
| Pre-Auth DC Flag | Bit(1 bit) | 1 = REQUIRED, 0 = NOT REQUIRED |
| Pre-Auth Complete DC Flag | Bit(1 bit) | 1 = REQUIRED, 0 = NOT REQUIRED |

Card Definition Table (CDT)

This table contains information which are specific to the card issuer.

| Field | Attributes / Bytes | Field Description/Comments |
| --- | --- | --- |
| Host Index | I(2) | Index into the HDT or the acquirer which maps to this card issuer. |

-continued

| Field | Attributes / Bytes | Field Description/Comments |
|---|---|---|
| PAN Low Range | N(19) | Low end of the PAN range. |
| PAN High Range | N(19) | High end of the PAN range. |
| Minimum PAN digits | I(2) | The minimum number of digits in the PAN for this acquirer. |
| Maximum PAN digits | I(2) | The maximum number of digits in the PAN for this acquirer. |
| Card Label | ANS(20) | Card Issuer Name for identification, e.g., VISA |

The following fields specify whether a particular transaction is allowed for a card range.

| Field | Attributes / Bytes | Field Description/Comments |
|---|---|---|
| Auth Only Allowed | Bit(1 bit) | 1 = ALLOWED, 0 = NOT ALLOWED |
| Auth Capture Allowed | Bit(1 bit) | 1 = ALLOWED, 0 = NOT ALLOWED |
| Adjust Allowed | Bit(1 bit) | 1 = ALLOWED, 0 = NOT ALLOWED |
| Refund Allowed | Bit(1 bit) | 1 = ALLOWED, 0 = NOT ALLOWED |
| Cash Advance Allowed | Bit(1 bit) | 1 = ALLOWED, 0 = NOT ALLOWED |
| Cash Back Allowed | Bit(1 bit) | 1 = ALLOWED, 0 = NOT ALLOWED |
| Off-line Auth Allowed | Bit(1 bit) | 1 = ALLOWED, 0 = NOT ALLOWED |
| Void Allowed | Bit(1 bit) | 1 = ALLOWED, 0 = NOT ALLOWED |
| Pre-Auth Allowed | Bit(1 bit) | 1 = ALLOWED, 0 = NOT ALLOWED |
| Pre-Auth Complete Allowed | Bit(1 bit) | 1 = ALLOWED, 0 = NOT ALLOWED |

Communications Parameter Table (CPT)

This table contains communications parameters information specific to an acquirer. The HDT and this table have a one-to-one mapping between them.

| Field | Attributes / Bytes | Field Description/Comments |
|---|---|---|
| Primary Address | AN(100) | Primary Host Address (Telephone number, IP address, etc.) |
| Secondary Address | AN(100) | Secondary Host Address to be used if the Primary Address is busy or not available. |
| Tertiary Address | AN(100) | Tertiary Host Address. |
| Response Time-out | I(2) | Time-out value (in seconds) before which the VPOS should receive a response from the host. |

Terminal Configuration Table (TCT)

This table contains information specific to a particular VPOS terminal.

| Field | Attributes / Bytes | Field Description/Comments |
|---|---|---|
| Merchant Name | ANS(100) | Name of the merchant having the VPOS terminal. |
| VPOS Lock Flag | Bit (1 bit) | 1 = VPOS Locked, 0 = VPOS Unlocked |

Payment Instruments

As discussed above, the VPOS terminal supports different Payment Instruments and each of the Payment Functions described above can be initiated by these different Payment Instruments. The consumer making a purchase from a merchant provides a choice of payment methods depending upon their personal preference. The Payment Instrument Class Hierarchy which is used by the different VPOS terminal Payment Functions is described below.

Message Sequence Diagram

Figure 17:
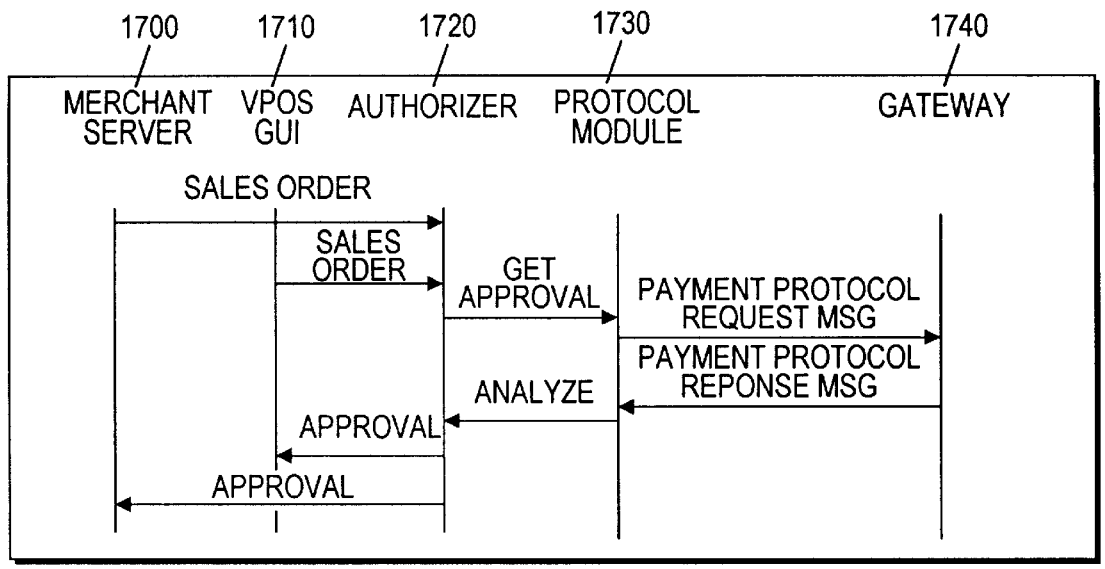
FIG. 17 shows a typical message flow between the consumer, merchant, VPOS terminal and the Gateway in accordance with a preferred embodiment.

FIG. 17 shows a typical message flow between the consumer, merchant, VPOS terminal and the Gateway. This section describes the different classes listed in the previous section, their data and members, and defines the type of the transaction that is to be performed. Processing commences at 1700 when a merchant server receives a sales order and passes it via the VPoS Graphical User Interfece (GUI) 1710 to an authorizer 1720 for approval and subsequent protocol processing 1730 and ultimately transmission via the gateway 1740 to the network.

Class Name:
CVPCLTransaction
Data:
Transaction Type (int)
Transaction Date and Time (CPCLDateTime)
Card Definition Table (CVPCL_CDT)
Host Definition Table (CVPCL_HDT)
Communications Parameters Table (CVPCL_CPT)
Terminal Configuration Parameters (CVPCL_TCT)
Batch Record (CVPCLBatch)
Accumulator Record (CVPCLAccum)
Member Functions:
CVPCLTransaction();
EStatus GetTransType();
EStatus GetTransDateTime(CPCLDateTime&);
EStatus SetTransType(const int);
virtual EStatus InitializeTrans(TVPosParamsBlk *)=0;
virtual EStatus ExecuteTrans(TVPosResultsBlk *)=0;
virtual EStatus ShutDowno()=0;

Host Transaction Class Definitions

This section contains all the host transaction class definitions.

Host Transaction Class (CVPCLHostTrans)

This is an abstract base class derived from the CVPCLTransaction class and is used for deriving transaction classes which need to communicate with the host either immediately or at a later stage.

Class Name:
CVPCLHostTrans
Data:
Member Functions:
CVPCLHostTrans();

Financial Transaction Class (CVPCLFinancialTrans)

This is an abstract base class derived from the CVPCLHostTrans. This class is used to derive transaction classes which require a payment instrument (e.g., a Credit Card) associated with them to perform the transaction.
Class Name:
CVPCLFinancialTrans
Data:
Transaction Amount (CVPCLAmt)
Purchase Order Number (char[]])
Transaction Number (char[])
Authorization Identification Number (char[])
Retrieval Reference Number (char[])
Batch (CVPCLBatch)
Accumulators (CVPCLAccumulators)
Member Functions:
CVPCLFinancialTrans();
EStatus GetTransAmt(CVPCLAmt&);
EStatus GetPurchOrderNum(char *);
EStatus GetTransRefNum(char *);
EStatus GetRetRefNum(char *);
EStatus GetAuthId(char *);
EStatus GetCurrencyType(EPCLCurrency *);
EStatus SetPurchOrderNum(const char *);
EStatus SetTransRefNum(const char *);
EStatus SetRetRefNum(const char *);
EStatus SetAuthId(const char *);
EStatus SetCurrencyType (const char *)

Financial Credit Card Transaction Class (CVPCLFinCCTrans)

This is the base abstract class for the financial host transaction which require a Credit Card payment instrument. This class is derived from the CVPCLFinancialTrans.
Class Name:
CVPCLFinCCTrans
Data:
Credit Card Payment Instrument (CPCLCreditCard)
Member Functions:
CVPCLFinCCTrans();

Credit Card Authorization Only Transaction Class (CVPCL__CCAuthOnly)

This is the class derived from the CVPCLFinCCTrans class and implements the Authorization Only Transaction.
Class Name:
CVPCL__CCAuthOnly
Data:
Member Functions:
CVPCL__CCAuthOnly();
EStatus InitializeTrans(TVPosParamsBlk *);
EStatus ExecuteTrans(TVPosResultsBlk *);
EStatus ShutDownTrans();
EStatus FormBatchRec();

Credit Card Authorization with Capture Transaction Class (CVPCL__CCAuthCapt)

This is the class derived from the CVPCLFinCCTrans class and implements the Authorization with Data Capture Transaction.
Class Name:
CVPCL__CCAuthCapt
Data:
Member Functions:
CVPCL__CCAuthCapt();
EStatus InitializeTrans(TVPosParamsBlk *);
EStatus ExecuteTrans(TVPosResultsBlk *);
EStatus ShutDownTrans();
EStatus FormBatchRec();

Credit Card Return Transaction Class (CVPCL__CCReturn)

This is the class derived from the CVPCLFinCCTrans class and implements the Return Transaction.
Class Name:
CVPCL__CCReturn
Data:
Member Functions:
CVPCL__CCReturn();
EStatus InitializeTrans(TVPosParamsBlk *);
EStatus ExecuteTrans(TVPosResultsBlk *);
EStatus ShutDownTrans();
EStatus FormBatchRec();

Credit Card Pre-Authorization Transaction Class (CVPCL__CCPreAuth)

This is the class derived from the CVPCLFinCCTrans class and implements the Pre-Authorization Transaction.
Class Name:
CVPCL__CCPreAuth
Data:
Member Functions:
CVPCL__CCPreAuth();
EStatus InitializeTrans(TVPosParamsBlk *);
EStatus ExecuteTrans(TVPosResultsBlk *);
EStatus ShutDownTrans();
EStatus FormBatchRec();

Credit Card Off-line Authorization Only Transaction Class (CVPCL__CCOfflineAuth)

This is the class derived from the CVPCLFinCCTrans class and implements the Offline Authorization Class Transaction.
Class Name:
CVPCL__CCOfflineAuth
Data:
Member Functions:
CVPCL__CCOfflineAuth();
EStatus InitializeTrans(TVPosParamsBlk *);
EStatus ExecuteTrans(TVPosResultsBlk *);
EStatus ShutDownTrans();
EStatus FormBatchRec();

Credit Card Adjust Transaction Class (CVPCL__CCAdjust)

This is the class derived from the CVPCLFinCCTrans class and implements the Adjust Transaction.

Class Name:
CVPCL_CCAdjust
Data:
Member Functions:
CVPCL_CCAdjust();
EStatus InitializeTrans(TVPosParamsBlk *);
EStatus ExecuteTrans(TVPosResultsBlk *);
EStatus ShutDownTrans();
EStatus FormBatchRec();

Credit Card Void Transaction Class (CVPCL_CCVoid)

This is the class derived from the CVPCLFinCCTrans class and implements the Void Transaction.
Class Name:
CVPCL_CCVoid
Data:
Member Functions:
CVPCL_CCVoid();
EStatus InitializeTrans(TVPosParamsBlk *);
EStatus ExecuteTrans(TVPosResultsBlk *);
EStatus ShutDownTrans();
EStatus FormBatchRec();

Credit Card Forced Post Transaction Class (CVPCL_CCForcedPost)

This is the class derived from the CVPCLFinCCTrans class and implements the Forced Post Transaction.
Class Name:
CVPCL_CCForcedPost
Data:
Member Functions:
CVPCL_CCForcedPost();
EStatus InitializeTrans(TVPosParamsBlk *);
EStatus ExecuteTrans(TVPosResultsBlk *);
EStatus ShutDownTrans();
EStatus FormBatchRec();

Pre-Authorization Complete Transaction Class (CVPCL_CCPreAuthComp)

This is the class derived from the CVPCLFinCCTrans class and implements the Pre-Authorization Completion Transaction.
Class Name:
CVPCL_CCPreAuthComp
Data:
Member Functions:
CVPCL_CCPreAuthComp();
EStatus InitializeTrans(TVPosParamsBlk *);
EStatus ExecuteTrans(TVPosResultsBlk *);
EStatus ShutDownTrans();
EStatus FormBatchRec();

Credit Card Balance Inquiry Class (CVPCL_CCBalanceInq)

This class is derived from the CVPCLFinCCTrans class and is used to perform the Merchant Balance Inquiry function.
Class Name:
CVPCL_CCBalanceInq
Data:
Member Functions:
CVPCL_CCBalanceInq();
EStatus InitializeTrans(TVPosParamsBlk *);
EStatus ExecuteTrans(TVPosResultsBlk *);
EStatus ShutDownTrans();

Administrative Host Transaction Class (CVPCLAdminHostTrans)

This is an abstract base class derived from the CVPCLHostTrans class and is used to derive the administrative host transaction classes.
Class Name:
CVPCLAdminHostTrans
Data:
Member Functions:
CVPCLAdminHostTrans();
int GetHostIndex();
EStatus SetHostIndex (const int);

Reconcile Transaction Class (CVPCLReconcile)

This is the class derived from the CVPCLAdminHostTrans class and implements the Reconcile or Close functionality.
Class Name:
CVPCLReconcile
Data:
Member Functions:
CVPCLReconcile();
EStatus InitializeTrans(TVPosParamsBlk *);
EStatus ExecuteTrans(TVPosResultsBlk *);
EStatus ShutDownTrans();

Host Log-on Transaction Class (CVPCLHostLogon)

This is the class derived from the CVPCLAdminHostTrans class and implements the Host Log-on Transaction.
Class Name:
CVPCLHostLogon
Data:
Member Functions:
CVPCLHostLogon();
EStatus InitializeTrans(TVPosParamsBlk *);
EStatus ExecuteTrans(TVPosResultsBlk *);
EStatus ShutDownTrans();

Parameters Download Transaction Class (CVPCLParamsDwnld)

This is the class derived from the CVPCLAdminHostTrans class and implements the Parameters Download (VPOS configuration information from the host) functionality.
Class Name:
CVPCLParamsDwnld
Data:
Member Functions:
CVPCLParamsDwnld();
EStatus InitializeTrans(TVPosParamsBlk *);
EStatus ExecuteTrans(TVPosResultsBlk *);
EStatus ShutDownTrans();

Test Transaction Class (CVPCLTestHost)

This is the class derived from the CVPCLAdminHostTrans class and implements the Test functionality which is used to test the host and the link.
Class Name:
CVPCLTestHost
Data:
Member Functions:
CVPCLTestHost();
EStatus InitializeTrans(TVPosParamsBlk *);
EStatus ExecuteTrans(TVPosResultsBlk *);
EStatus ShutDownTrans();

Local Transaction Class Definitions (CVPCLLocalTrans)

This is the abstract base class for all the transactions that are performed locally to the VPOS.
Class Name:
CVPCLLocalTrans
Data:
Record Number (int)
Host Index (int)
Member Functions:
CVPCLocalTrans();
int GetRecNum();
int GetHostIndex()
EStatus SetRecNum(const int);
EStatus SetHostIndex(const int);

Virtual POS Lock/Stop Class (CVPCLVPosLock)

This class implements the VPOS Lock or the Stop Local functionality. Under the locked state the VPOS does not accept any transaction requests. The class is derived from the CVPCLLocalTrans base class.
Class Name:
CVPCLVPosLock
Data:
Member Functions:
CVPCLVPosLock();
EStatus InitializeTrans(TVPosParamsBlk *);
EStatus ExecuteTrans(TVPosResultsBlk *);
EStatus ShutDownTrans();

Virtual POS UnLock/Start Class (CVPCLVPosUnlock)

This class implements the VPOS UnLock or the Start Local functionality. The class is derived from the CVPCLLocalTrans base class.
Class Name:
CVPCLVPosUnLock
Data:
Member Functions:
CVPCLVPosUnlock();
EStatus InitializeTrans(TVPosParamsBlk *);
EStatus ExecuteTrans(TVPosResultsBlk *);
EStatus ShutDownTrans();

Transaction Data Administration Class (CVPCLTransDataAdmin)

This is an abstract base class used to derive the classes which are required to review/manage the transaction data which includes the batch data and the accumulator data. The class is derived from the CVPCLLocalTrans base class.
Class Name:
CVPCLTransDataAdmin
Data:
Member Functions:
CVPCLTransDataAdmin();

Batch Review Class (CVPCLBatchReview)

This class is derived from the CVPCLTransDataAdmin base class and implements the batch review functionality
Class Name:
CVPCLBatchReview
Data:
Member Functions:
CVPCLBatchReview();
EStatus InitializeTrans(TVPosParamsBlk *);
EStatus ExecuteTrans(TVPosResultsBlk *);
EStatus ShutDownTrans();

Clear Batch Class (CVPCLClearBatch)

This class is derived from the CVPCLTransDataAdmin base class and implements the clear batch functionality, which is used to clear the batch in the event of doing a manual reconciliation between the VPOS and the acquirer.
Class Name:
CVPCLClearBatch
Data:
Member Functions:
CVPCLClearBatch();
EStatus InitializeTrans(TVPosParamsBlk *);
EStatus ExecuteTrans(TVPosResultsBlk *);
EStatus ShutDownTrans();

Accumulators Review Class (CVPCLAccumReview)

This class is derived from the CVPCLTransDataAdmin base class and implements the Accumulators Review functionality.
Class Name:
CVPCLAccumReview
Data:
Member Functions:
CVPCLAccumReview();
EStatus InitializeTrans(TVPosParamsBlk *);
EStatus ExecuteTrans(TVPosResultsBlk *);
EStatus ShutDownTrans();

Clear Accumulators Class (CVPCLClearAccum)

This class is derived from the CVPCLTransDataAdmin base class and implements the Accumulators Clear functionality.
Class Name:
CVPCLClearAccum
Data:
Member Functions:
CVPCLClearAccum();
EStatus InitializeTrans(TVPosParamsBlk *);
EStatus ExecuteTrans(TVPosResultsBlk *);
EStatus ShutDownTrans();

VPOS Configuration Data Administration Class (CVPCLConfigDataAdmin)

This is an abstract base class and is used to derive classes which implement the functionality for managing the VPOS configuration data. The class is derived from the CVPCLLocalTrans base class.

Class Name:
CVPCLConfigDataAdmin
Data:
Member Functions:

Acquirer Data or the Host Definition Table Review Class (CVPCL_HDTReview)

This class is derived from the CVPCLConfigDataAdmin class and implements the Host Definition Table Review functionality.

Class Name:
CVPCL_HDTReview
Data:
Member Functions:
CVPCL_HDTReview();
EStatus InitializeTrans(TVPosParamsBlk *);
EStatus ExecuteTrans(TVPosResultsBlk *);
EStatus ShutDownTrans();

Issuer Data or the Card Definition Table Review Class (CVPCL_CDTReview)

This class is derived from the CVPCLConfigDataAdmin class and implements the Card Definition Table Review functionality.

Class Name:
CVPCL_CDTReview
Data:
Member Functions:
CVPCL_CDTReview();
EStatus InitializeTrans(TVPosParamsBlk *);
EStatus ExecuteTrans(TVPosResultsBlk *);
EStatus ShutDownTrans();

Communication Parameters Table Review Class (CVPCL_CPTReview)

This class is derived from the CVPCLConfigDataAdmin class and implements the Communications Parameters Table Review functionality.

Class Name:
CVPCL_CPTReview
Data:
Member Functions:
CVPCL_CPTReview();
EStatus InitializeTrans(TVPosParamsBlk *);
EStatus ExecuteTrans(TVPosResultsBlk *);
EStatus ShutDownTrans();

Terminal Configuration Table Review Class (CVPCL_TCTReview)

This class is derived from the CVPCLConfigDataAdmin class and implements the Terminal Configuration Table Review functionality.

Class Name:
CVPCL_TCTReview
Data:
Member Functions:
CVPCL_TCTReview();
EStatus InitializeTrans(TVPosParamsBlk *);
EStatus ExecuteTrans(TVPosResultsBlk *);
EStatus ShutDownTrans();

Acquirer Data or the Host Definition Table Update Class (CVPCL_HDTUpdate)

This class is derived from the CVPCLConfigDataAdmin class and implements the Host Definition Table Update functionality.

Class Name:
CVPCL_HDTUpdate
Data:
Member Functions:
CVPCL_HDTUpdate();
EStatus InitializeTrans(TVPosParamsBlk *);
EStatus ExecuteTrans(TVPosResultsBlk *);
EStatus ShutDownTrans();

Issuer Data or the Card Definition Table Update Class (CVPCL_CDTUpdate)

This class is derived from the CVPCLConfigDataAdmin class and implements the Card Definition Table Update functionality.

Class Name:
CVPCL_CDTUpdate
Data:
Member Functions:
CVPCL_CDTUpdate();
EStatus InitializeTrans(TVPosParamsBlk *);
EStatus ExecuteTrans(TVPosResultsBlk *);
EStatus ShutDownTrans();

Communications Parameters Table Update Class (CVPCL_CPTUpdate)

This class is derived from the CVPCLconfigDataAdmin class and implements the Communications Parameters Table Update functionality.

Class Name:
CVPCL_CPTUpdate
Data:
Member Functions:
CVPCL_CPTUpdate();
EStatus InitializeTrans(TVPosParamsBlk *);
EStatus ExecuteTrans(TVPosResultsBlk *);
EStatus ShutDownTrans();

Terminal Configuration Table Update Class (CVPCL_TCTUpdate)

This class is derived from the CVPCLConfigDataAdmin class and implements the Terminal Configuration Table Update functionality.

Class Name:
CVPCL_TCTUpdate
Data:
Member Functions:
CVPCL_TCTUpdate();
EStatus InitializeTrans(TVPosParamsBlk *);

EStatus ExecuteTrans(TVPosResultsBlk *);
EStatus ShutDownTrans();

Batch Class (CVPCLBatch)

This class defines the batch record and the operations which are performed on the batch.

Class Name:
CVPCLBatch

Data:

Batch Record Structure (TVPosBatchRec)
// Definition of the TVPosBatchRec is as below,
tpedef struct_VPosBatchRec
{
    char szTransAmt[];
    char szTransDate[];
    char szTransTime[];
    char szRetrievalRefNum[];    // Trans. Ref. No. sent by the host
    char szAuthId[];    // Approval Code sent by the host
    char szOrigAmt[];    // Original amount for-Adjust
    char szPurchOrderNum[];
    char szBatchNum[];
    EPCLTransType TransType;
    EPCLPmtInst PmtInst;
    EPCLCurrency CurrencyType;
    EPCLDecimals NumDecDigits;
    unsigned int nTransRefNum;    // Running Ref. Number gen. by the //VPOS for every approved txn.
    unsigned long lnSTAN;    // Sys. Trace Number incr. by VPOS
    // for every trans. that is trans. to host
    TPmtInstData PayInstData;
}TVPosBatchRec;

Member Functions:

CVPCLBatch();
    EStatus SetTransType(const EPCLTransType);
    EStatus SetRetRefNum(const char *);
    EStatus SetAuthId(const char *);
    EStatus SetPurchOrderNum(const char *);
    EStatus SetTransRefNum(const long);
    EStatus SetTransAmt(const char *);
    EStatus SetBatchNum(const char *);
    EStatus SetSTAN(const long);
    EStatus SetDateMMDDYYYY(const char *);
    EStatus SetTimeHHMMSS(const char *);
    EStatus SetPmtInst(const EPCLPmtInst);
    EStatus SetCCAcctNum(const char *);
    EStatus SetCCExpDate(const char *);
    EStatus SetOrigAmt(const char *);
    EStatus GetBatchRec(TVPosBatchRec *);
    EStatus InitBatch();
    EStatus OpenBatch(const char *, FILE**, const char *);
    EStatus CloseBatch(FILE*);
    EStatus AddBatchRec ();    // Adds a record to the batch
    EStatus GetBatchRec (const long);    // Gets a record from the batch
    EStatus UpdateBatchRec (const long);    //Update batch record with NR
    EStatus DeleteBatchRec (const long);    //Deletes the batch record

Accumulator Class (CVPCLAccum)

This class defines the Accumulator record and the operations on the accumulators.

Class Name:
CVPCLAccum
Data:
Credit Amount (char szCreditAmt[AMT_SZ+1])
Credit Count (int nCreditCnt)
Debit Amount (char szDebitAmt[AMT_SZ+1]
Debit Count (int nDebitCnt)
Member Functions:
int OpenAccum(int fHandle);
int GetAccum (int nAccumType, int *pnAccumCnt, char *pszAccumAmt);
int CloseAccum(int fHandle);
int CleanAccum();

Host Definition Table Class (CVPCL_HDT)

This class defines the Host Definition Table record and the operations on the table.

Class Name:
CVPCL_HDT

Data:

Host Definition Table Record Structure (TVPosHDTRec)
    The TVPosHDTRec structure contains the following fields,
typedef struct_VPosHDTRec
{
    EStatus SetTPDU(const char *);
    EStatus SetSTAN(const unsigned long);
    EStatus SetNII(const char *);
    EStatus SetHostName(const char *);
    EStatus SetHostProtType(const EPCLHostProtType);
    EStatus SetHostProtSubType(const EPCLHostProtSubType);
    EStatus SetNumAdv(const int);
    EStatus SetAuthOnlyDC(const VPosBool);
    EStatus SetAuthCaptDC(const VPosBool);
    EStatus SetAdjustDC(const VPosBool);
    EStatus SetReturnDC(const VPosBool);
    EStatus SetForcedPostDC(const VPosBool);
    EStatus SetOfflineAuthDC(const VPosBool);
    EStatus SetVoidDC(const VPosBool);
    EStatus SetPreAuthDC(const VPosBool);
    EStatus SetPreAuthCompDC(const VPosBool);

Member Functions:
CVPCL_HDT();
EStatus CleanHDT();
EStatus LoadHDTRec(const int);
EStatus SaveHDTRec(const int);
EStatus GetNumRecs(int *);
EStatus GetHDTRec(TVPosHDTRec *);
EStatus GetTermId(char *);
EStatus GetMerchId(char *);
EStatus GetBatchNum(char *);
EStatus GetTransRefNum(unsigned int *);
EStatus GetTPDU(char *);
EStatus GetNII(char *);
EStatus GetHostName(char *);
EStatus GetHostProtType(EPCLHostProtType *);
EStatus GetHostProtSubType(EPCLHostProtSubType *);
EStatus GetNumAdv(unsigned int *);
EStatus GetSTAN(unsigned long *);
EStatus GetAuthOnlyDC(VPosBool *);
EStatus GetAuthCaptDC(VPosBool *);
EStatus GetAdjustDC(VPosBool *);
EStatus GetReturnDC(VPosBool *);
EStatus GetForcedPostDC(VPosBool *);
EStatus GetOfflineAuthDC(VPosBool *);
EStatus GetVoidDC(VPosBool *);

```
EStatus GetPreAuthDC(VPosBool *);
EStatus GetPreAuthCompDC(VPosBool *);
EStatus SetHDTRec(TVPosHDTRec *);
EStatus SetTermId(const char *);
EStatus SetMerchId(const char *);
EStatus SetBatchNum(const char *);
EStatus SetTransRefNum(const unsigned int);
EStatus SetTPDU(const char *);
EStatus SetSTAN(const unsigned long);
EStatus SetNII(const char *);
EStatus SetHostName(const char *);
EStatus SetHostProtType(const EPCLHostProtType);
EStatus SetHostProtSubType(const EPCLHostProtSubType);
EStatus SetNumAdv(const int);
EStatus SetAuthOnlyDC(const VPosBool);
EStatus SetAuthCaptDC(const VPosBool);
EStatus SetAdjustDC(const VPosBool);
EStatus SetReturnDC(const VPosBool);
EStatus SetForcedPostDC(const VPosBool);
EStatus SetOfflineAuthDC(const VPosBool);
EStatus SetVoidDC(const VPosBool);
EStatus SetPreAuthDC(const VPosBool);
EStatus SetPreAuthCompDC(const VPosBool);
```

Card Definition Table Class (CVPCL_CDT)

This class defines the Card Definition Table record and the operations on the table.

Class Name:
CVPCL_CDT

Data:

Card Definition Table Record Structure (TVPosCDTRec)
The TVPosCDTRec structure contains the following fields,
```
typedef struc_VPosCDTRec
{
    char szPANLo[];
    char szPANHi[];
    char szCardLabel[];
    int nHostIndex;
    int nMinPANDigit;
    int nMaxPANDigit;
    //Transaction Allowed Flags
    VPosBool fAuthOnlyAllwd;
    VPosBool fAuthCaptAllwd;
    VPosBool fForcedPostAllwd;
    VPosBool fAdjustAllwd;
    VPosBool fReturnAllwd;
    VPosBool fOfflineAuthAllwd;
    VPosBool fVoidAllwd;
    VPosBool fPreAuthAllwd;
    VPosBool fPreAuthCompAllwd;
}TVPosCDTRec;
```
Member Functions:
```
CVPCL_CDT();
EStatus CleanCDT();
EStatus LoadCDTRec(const int);
EStatus SaveCDTRec(const int);
EStatus GetNumRecs(int *);
EStatus GetCDTRec(TVPosCDTRec *);
EStatus GetPANLo(char *);
EStatus GetPANHi(char *);
EStatus GetCardLabel(char *);
EStatus GetCDTHostIndex(int *);
EStatus GetMinPANDigit(int *);
EStatus GetMaxPANDigit(int *);
EStatus GetAuthOnlyAllwd(VPosBool *);
EStatus GetAuthCaptAllwd(VPosBool *);
EStatus GetAdjustAllwd(VPosBool *);
EStatus GetReturnAllwd(VPosBool *);
EStatus GetOfflineAuthAllwd(VPosBool *);
EStatus GetVoidAllwd(VPosBool *);
EStatus GetPreAuthAllwd(VPosBool *);
EStatus GetPreAuthCompAllwd(VPosBool *);
EStatus GetForcedPostAllwd(VPosBool *);
EStatus SetCDTRec(TVPosCDTRec *);
EStatus SetHostIndex(const int);
EStatus SetMinPANDigit)const int);
EStatus SetMaxPANDigit)const int);
EStatus SetPANLo(const char *);
EStatus SetPANHi(const char *);
EStatus SetCardLabel(const char *);
EStatus SetAuthOnlyAllwd(const VPosBool);
EStatus SetAuthCaptAllwd(const VPosBool);
EStatus SetAdjustAllwd(const VPosBool);
EStatus SetReturnAllwd(const VPosBool);
EStatus SetForcedPostAllwd(const VPosBool);
EStatus SetOfflineAuthAllwd(const VPosBool);
EStatus SetVoidAllwd(const VPosBool);
EStatus SetPreAuthAllwd(const VPosBool);
EStatus SetPreAuthCompAllwd(const VPosBool);
```

Communications Parameters Table Class (CVPCL_CPT)

This class defines the communications parameters table and the operations on the table.

Class Name:
CVPCL_CPT

Data:

Communications Parameters Table Record Structure (TVPos CPTRec)
The TVPosCPTRec structure contains the following fields,
```
typedefstruct_VPosCPTRec
{
    char szAcqPriAddress[];
    char szAcqSecAddress[];
    char szAcqTerAddress[];
    int nRespTimeOut;
}TVPosCPTRec
```

Member Functions:
```
CVPCL_CPT();
EStatus CleanCPT();
EStatus LoadCPTRec(const int);
EStatus SaveCPTRec(const int);
EStatus GetNumRecs(int *);
EStatus GetCPTRec(TVPosCPTRec *);
EStatus GetAcqPriAddress(char *);
EStatus GetAcqSecAddress(char *);
EStatus GetAcqTerAddress(char *);
EStatus GetRespTimeOut(int *);
EStatus SetCPTRec(TVPosCPTRec *);
EStatus SetAcqPriAddress(const char *);
EStatus SetAcqSecAddress(const char *);
EStatus SetAcqTerAddress(const char *);
EStatus SetRespTimeOut(const int);
```

Terminal Configuration Table Class (CVPCL_TCT)

This class defines the VPOS terminal configuration parameters table and the operations on the table.

Class Name:

CVPCL_TCT

Data:

Terminal Configuration Table Record Structure (TVPosTCTRec)
The TVPosTCTRec structure contains the following fields,
typedef struct_VPosTCTRec
{
    char szMerchName[];
    VPosBool fVPosLock;        // VPOS Lock/Unlock Toggle Flag
}TVPosTCTRec;

Member Functions:
CVPCL_TCT();
EStatus LoadTCTRec();
EStatus SaveTCTRec();
EStatus CleanTCT();
EStatus GetTCTRec(TVPosTCTRec *);
EStatus GetMerchName(char *);
EStatus GetVPOSLock(VPosBool *);
EStatus SetMerchName(const char *);
EStatus SetVPOSLock(const VPosBool);

Amount Class (CVPCLAmount)

This class defines the amount data items and the operations on them.

Class Name:

CVPCLAmount
Data:
Amount (char[])
Currency Type (EPCLCurrency)

Figure 16:
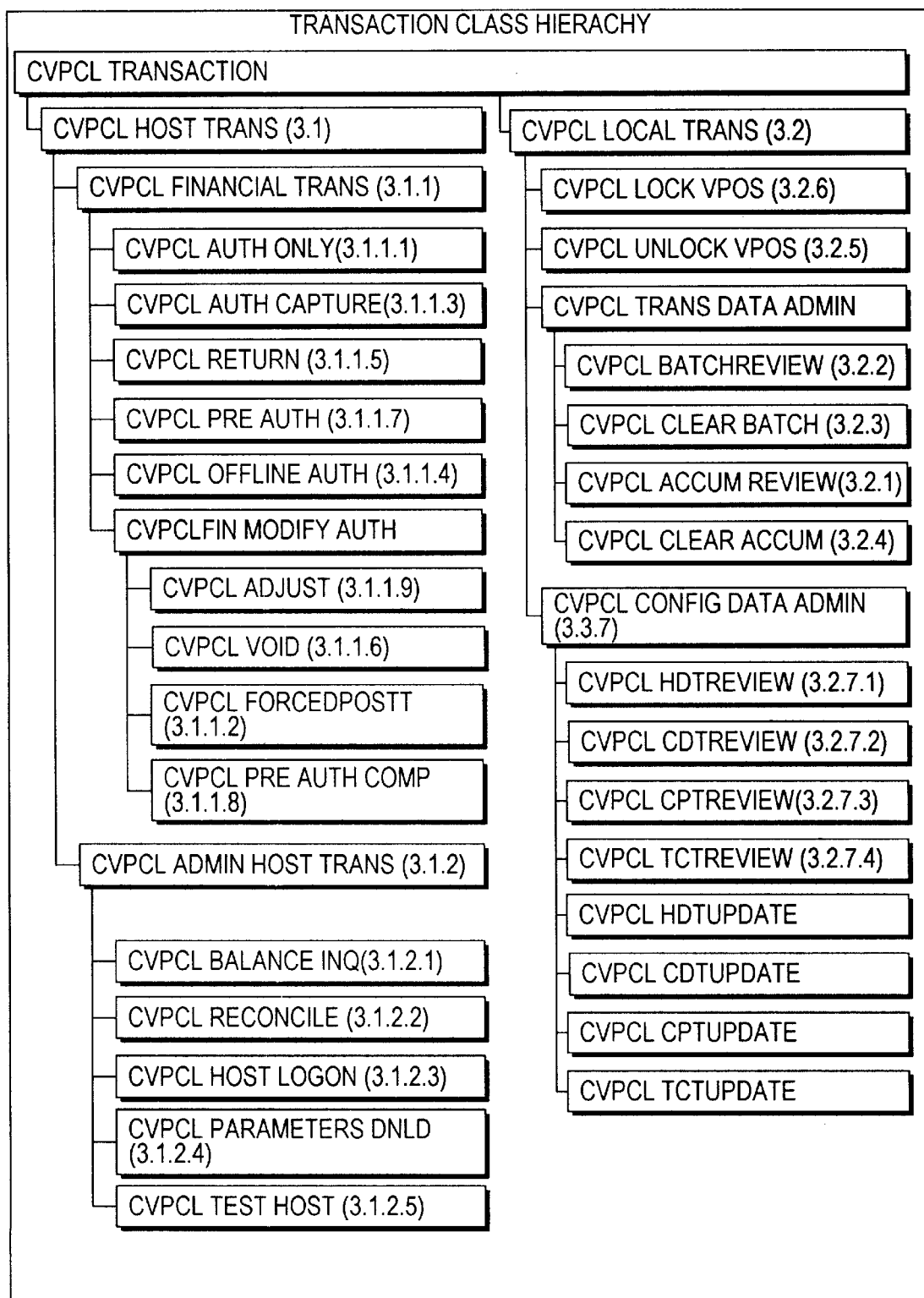
FIG. 16 illustrates a transaction class hierarchy block diagram in accordance with a preferred embodiment.

Member Functions:

CVPCLAmount():
EStatus Initialize(const CPCLAmount&);
EStatus Initialize(const char *);
EStatus Initialize(const long);
void operator = (const char *);
void operator = (const long);
EStatus GetAmount(char *);
    operator const char * () const;
    operator const long ();

Payment Instruments Class (CPCLPmtInst)
This section defines the Payment Instrument Class hierarchy. FIG. 16 illustrates a transaction class hierarchy in accordance with a preferred embodiment.
Class Name:
CPCLPmtInst
Data:
Payment Instrument Type (EPCLPmtInst)
Member Functions:
CPCLPmtInst();
EStatus GetPmtInstType(EPCLPmtInst *);

Bank Cards Class (CPCLBankCard)

This class is derived from the CPCLPmtInst class and implements the bank cards class.
Class Name:
CPCLBankCard Data:

Account Number (char[])
Expiration Date (CPCLDateTime)
Index into the CDT table (int)

Member Functions:
CPCLBankCard();
EStatus Initialize();
EStatus SetAcctNum(const char *);
EStatus SetExpDate(const char *);
EStatus GetAcctNum(char *);
EStatus GetExpDate(char *);
EStatus ValidateCard();
int GetCDTIndex();
VPosBool DoLuhnCheck();
VPosBool DoCardRanging();
EStatus DoValidateExpDate();

Credit Cards Class (CPCLCreditCard)

This class is derived from the CPCLBankCard class and has the same data and the methods as the CPCLBankCard class.
Class Name:
CPCLCreditCard
Data:
Member Functions:
CPCLCreditCard();

Debit Cards Class (CPCLDebitCard)

This class is derived from the CVPCLBankCard class and implements the debit card class.
Class Name:
CPCLDebitCard
Data:
Card Holder Encrypted PIN (char[])
Member Functions:
CPCLDebitCard();
EStatus GetEncryptedPIN(char *);
EStatus SetEncryptedPIN(char *);

VPOS Class Library Interface and API Definition

This section explains the classes which provide the interface to the VPOS class library.

Data Structures required for the VPOS Interface Class

Transaction Parameters Structure (TVPosParamsBlk)—This structure is a subset of all the transaction parameters required for the different transactions.

typedef struct_VPosParamsBlk
{
    char szTransAmt[];        // Without decimal point.

-continued

```
                    // Left most two digits implied to be decimal
digits
    char szPurchOrderNum[ ];
            char szRetRefNum[ ];
    char szBatchNum[ ];
            char szNewBatchNum[ ];
            char szOrigAmt[ ];
            char szCPSData[ ];
            char szAuthId[ ];        // Auth Id for offline auth-only
transaction
            int HostIndex;
            unsigned intnTransRefNum;
            VPosBool fVPosLock;
            ECPSDataType eCPSType ;
            EPCLTransType TransType;
            EStatus TransResult;
            EPCLPmtInst PmtInst;
            EPCLCurrency CurrencyType;
            EPCLDecimals NumDecDigits;
            EVPCLAccumType AccumType;
            TPmtInstData PayInstData;
            union__VPosConfigData
            {
                TVPosHDTRec srHDTRec;
                TVPosCDTRec srCDTRec;
                TVPosCPTRec srCPTRec;
                TVPosTCTRec srTCTRec;
            }VPosConfigData;
            void *Context;           // Context from the calling
            interface
            EStatus (*VPosCallBack)(TVPosResultsBlk*, void *);
}TVPosParamsBlk;
```

Transaction Results Structure (TVPosResultsBlk)—This structure contains all the fields returned from the host and other fields which are required for doing terminal data capture.

```
        typedef struct__VPosResultsBlk
        {
                char szNewBatchNum[ ];
                int nHostIndex;
                EStatus TransResult;
                TVPosBatchRec srBatchRec;
                TVPosAccumRec srAccumRec;
                char szCardLabel[ ];
                TVPosHDTRec srHDTRec;
                TVPosCDTRec srCDTRec;
                TVPosCPTRec srCPTRec;
                TVPosTCTRec srTCTRec;
        } TVPosResultsBlk;
```

The various status codes for the enumeration EStatus are detailed below.

VPOS Interface Class (CVPosInterface)

This class provides the interface to the VPOS Transaction Class Library.
Class Name:
CVPosInterface
Data:
Member Functions:
CVPosInterface();
// Creates the Transaction Object, takes care
// of other initialization and executes the transaction.
CVPCLTransaction *pclTransFactory(TVPosParamsBlk *);
EStatus DestroyTrans(CVPCLTransaction *);

VPOS API Definition

This section explains in the VPOS API which are required for interfacing with the VPOS Class Library. All the different VPOS transactions can be initiated using the API defined in this section.

VPosInitialize—Initialize VPOS

This API is used to start and initialize the VPOS. The API definition is disclosed below.
API Definition:
VPosBool VPosInitialize(void);
Parameters:
None
Returns:
TRUE or FALSE indicating whether the function call was a success.

VPosExecute—Execute a VPOS Transaction

This API is used to execute a particular VPOS transaction.
API Definition:
VPosBool VPosExecute(TVPosParamsBlk *, TVPosResultsBlk *)
Parameters:
Pointer to the Parameters Structure (TVPosParamsBlk)
Pointer to the Results Structure (TVPosResultsBlk)
Returns:
TRUE or FALSE indicating whether the function call was a success.

VPosShutDown—Shutdown the VPOS

This is used to shutdown the VPOS.
API Definition:
VPosBool VPosShutDown(void);
Parameters:
None
Returns:
TRUE or FALSE indicating whether the function call was a success.

VPOS Status Codes

This section details the different status codes (listed under the enumeration EStatus) which the VPOS returns for the different operations performed.

```
enum EStatus
{
    eSuccess = 0,         //Function call or operation successful
    eFailure,             //General failure
    eVPosLocked,          //Vpos locked, transaction not allowed
                          //Transaction related error codes
    ePmtInstNotSupported,      //Payment Instrumente not supported
    eTransNotSupported,   //Transaction type not supported
    eTransInitErr,        //Transaction Initialization Failed
    eAdjustNotAllwd,      //Adjust not allowed on this
transaction
    eVoidNotAllwd,        //Void not allowed on this transaction
    eForcedPostNotAllwd,  //Forced Post not allowed on this
transaction
    ePreAuthCompNotAllwd,     //Pre-Auth. not allowed on this
transaction
    eAmtErr,          //Error in the amount passed
    eHDTLoadErr,          //Error during loading the HDT table
    eCDTLoadErr,          //Error during loading the CDT table
    eCPTLoadErr,          //Error during loading the CPT
table
    eTCTLoadErr,          //Error during loading the TCT
table
    eHDTWriteErr,         //Error during writing to the HDT
table
    eCDTWriteErr,     //Error during writing to the CDT
table
    eCPTWriteErr,     //Error during writing to the
```

-continued

| CPT table | |
|---|---|
| eTCTWriteErr, | //Error during writing to the TCT table |
| eTCTFieldErr, | //Error handling a TCT table field |
| eLuhnErr, | //Luhn check failed on the account |
| eRangingErr, | //Card range not found |
| ePANLenErr, | //PAN length error |
| eExpiredCard, | //Card expired |
| eInvalidMonth, | //Invalid month in the expiration date |
| eFileOpenErr, | //General file open error |
| eFileCloseErr, | //General file close error |

VPOS Terminal Architecture

Figure 25:
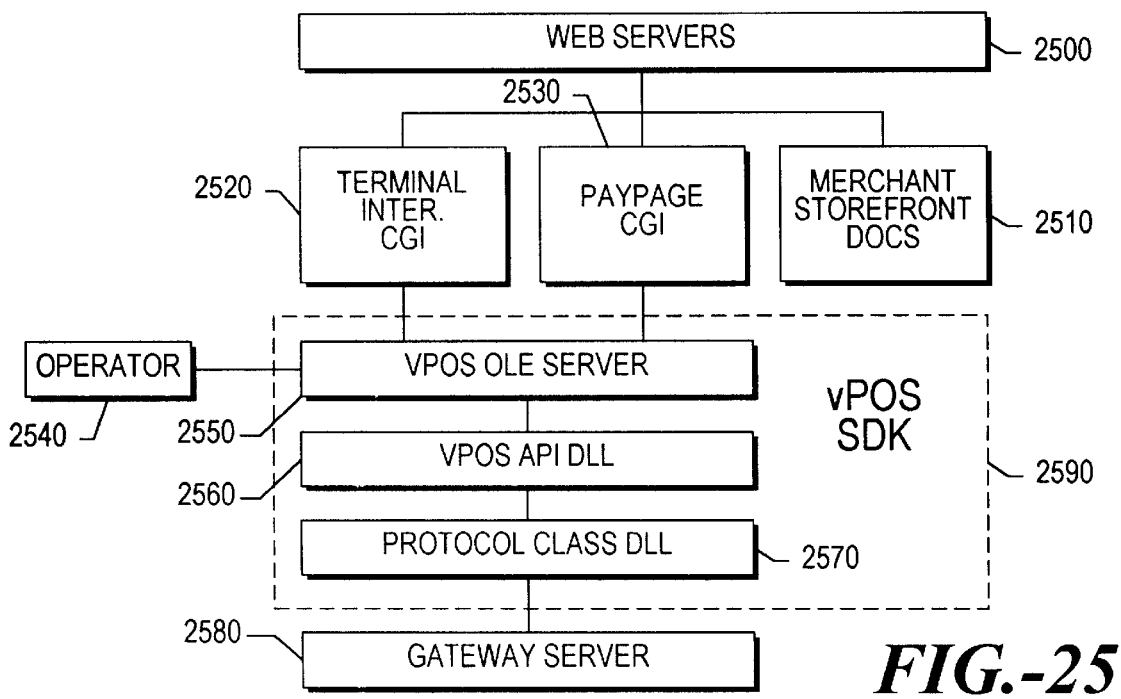
FIG. 25 is a block diagram of the vPOS Terminal Architecture in accordance with a preferred embodiment.

FIG. 25 is a block diagram of the vPOS Terminal Architecture in accordance with a preferred embodiment. The Internet 2500 provides the communication processing necessary to enable the VPOS Terminal architecture. The terminal interface CGI 2520 communicates via the internet to provide information to the VPOS OLE Server 2550 which formats information in accordance with the VPOS API DLL 2560 which uses the protocol class DLL 2570 to flesh out the message for delivery to the Gateway Server 2580. The collection of the VPOS OLE Server 2550, VPOS API DLL 2560 and the Protocol Class DLL 2570 make up the VPOS Software Development ToolKit (SDK) which are used to enable VPOS applications for interfacing with an Operator 2540.

VPOS/VGATE Architecture

The architecture of the Virtual Point of Sale (VPOS) and Virtual Gateway (VGATE) architecture maintains SET compliance while providing support for additional message types that are not enabled in SET. The architecture includes isolation of cryptographic details in a single module to facilitate single version government approval while maximizing the flexibility of the system for customization and facilitating transfer of updated versions on an acquirer specific basis. FIG. 18A is a block diagram of the extended SET architecture in accordance with a preferred embodiment. Processing commences at function block 1800 for a consumer-originated transaction via the World Wide Web (WWW) or 1810 for a merchant-originated transaction on the internet. In either case control passes immediately to the WWW server 1820 for the transaction to be appropriately formatted and the appropriate interface page presented, whether the transaction is a store front 1822, shopping cart 1824, pay page 1826, standard terminal administration 1828–1830 transaction, or an extended terminal transaction 1834. If processing requires authentication of the transaction, then control passes through the Virtual Point of Sale (VPOS) Application Programming Interface (API) library 1840 for SET compliant transactions and through the VPOS API extensions library for extensions to the SET protocol. Then, at function block 1842, if the transaction is SET compliant, and function block 1864 if the transaction is not SET compliant, a library of protocol stack information is used to conform the message before it is transmitted to a Gateway site for ultimate delivery to a bank host 1874 for authorization.

Extended SET messages are processed at the Gateway site on a two track basis with the division criteria being SET compliance (which will change over time as more functionality is put into SET) or SET extensions. Set compliant messages are processed via the protocol statck library 1862, while SET extensions are processed via the protocol stack entension library 1864. Then, at function block 1870 the gateway engine processes SET and Host specific code including gateway administration extensions 1872 that bypass the normal processing and flow directly from the merchant and consumer server 1820 to the gateway administration extensions 1872 to the Gateway Engine 1870.

As described above, there are three channels by which messages are exchanged between VPOS 1846 and VGATE 1856.

1. Standard SET messages

The standard SET messages are originated by the merchant software either via a pay page 1826 directly controlled by the consumer, or via an operator interface consisting of a set of HTML pages and associated executables launched by the pages (e.g. pay page 1826 and standard terminal administration 1828–1830.)

Each SET message type (e.g., authorization v. capture) transmits a different set of data and each requires a different Protocol Data Unit (PDU) to describe its encoding. Examples of how Standard SET messages are encoded are given in the SET documentation previously incorporated by reference.

2. Extended SET messages

The Extended SET messages are utilized as an "escape mechanism" to implement acquirer-specific messages such as settlement/reconciliation, employee logon/logoff, and parameter download. The messages are developed as a set of name-value pairs encapsulated in a PKCS-7 wrapper and wrapped in Multipurpose Internet Mail Extensions (MIME), described in a book by N. Borenstein & N. Freed, "RFC 1521: MIME (Multipurpose Internet Mail Extensions) Part One: Mechanisms for Specifying and Describing the Format of Internet Message Bodies" (Sep. 1993). The name-value pairs can have arbitrary (8-bit) data, so arbitrary items can be passed through the extended SET channel, including executable programs and Dynamic Load Libraries (DLL)s.

Figure 18B:
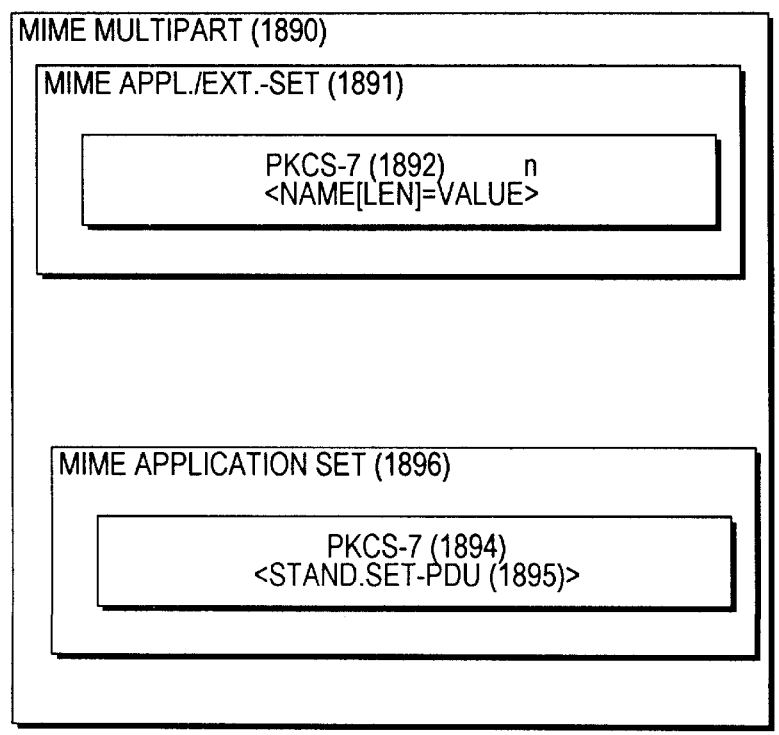
FIGS. 18A–E are block diagrams of the extended SET architecture in accordance with a preferred embodiment.
Figure 18A:
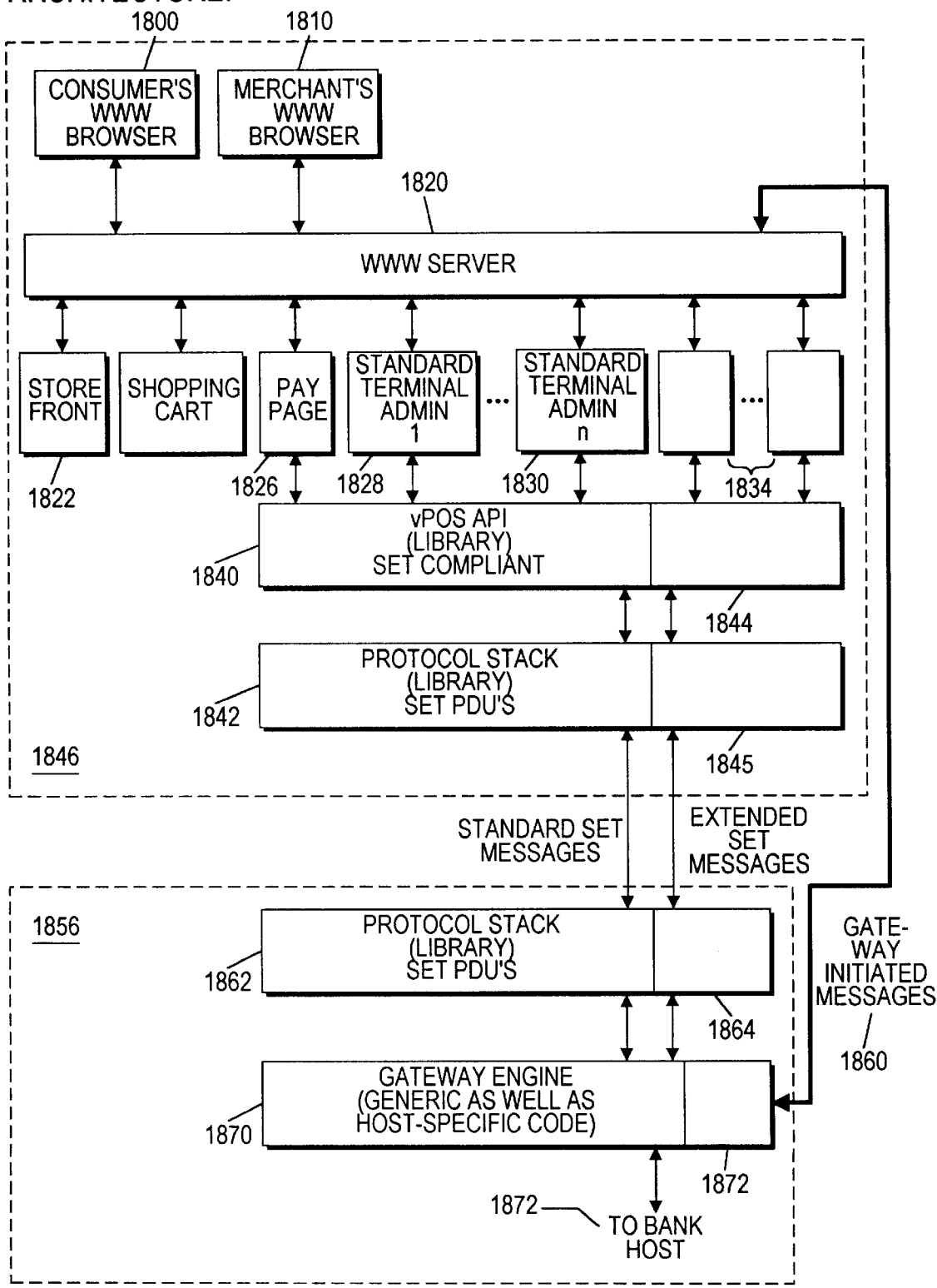

FIG. 18B illustrates a multipart MIME message with one Extended SET message and one Standard SET authorizing message. MIME is utilized as an outer wrapper 1890 to allow an Extended SET message 1891 to be transmitted as a compon of messages embedded in one MIME multipart message. In this manner, a standard SET message can be sent with an Extended SET message in one VPOS/VGATE communication transaction.

Embedding the Extended SET messages in a PKCS-7 wrapper enables the same message authentication to occur as in standard SET messages. Thus, for SET-compliant and non-SET-compliant messages, the same mechanism may be used to restrict which entities the vPOS or vGATE will trust in any communications. An important concept in Extended SET is that all messages, of any type, are sent in a uniform name/value pair format, thus allowing a single Protocol Data Unit to suffice for any type of message sent through the Extended SET channel. Since arbitrary data may be sent this way, a mechanism must be provided to preclude the use of the Extended SET channel by parties other than approved financial institutions. If this is not ensured, then the NSA and the US Department of Commerce will not approve the software for export.

SET itself to some degree ensures that this Extended SET channel is used only by financial institutions. The protocol stack extension library only processes messages that have been signed by a financial institution SET certificate that is in turn signed by a payment instrument brand certificate (such as Visa or MasterCard). Stronger control over the Extended SET channel can be achieved by further restricting processing of messages to those signed (either instead of or in addtion to the financial institution SET certificate) by a second certificate belonging to a third-party agency, either governmental or private (e.g., VeriFone, as manufacturer of the software).

In this way, a particular set of Extended SET messages can be implemented by Bank X, and a different set of messages by Bank Y. If a vPOS has an extended terminal transaction interface as shown in FIG. 18A at block 1834 for Bank X, and has been configured to only accept messages from a vGate with Bank X's certificate, then it will be able to communicate those messages to a vGate that has the certificate for Bank X, and accepts messages of the types in Bank X's message set. The vPOS will not be able to connect to the Bank Y gateway, or to any other system that purports to communicate via Extended SET. This restriction is further secured by utilizing a public key certificate that is "hard wired" into vPOS, and which is distributed only to gateways that use the Extended SET mechanism and which have been approved for export by the US Commerce Department.

Figure 18C:
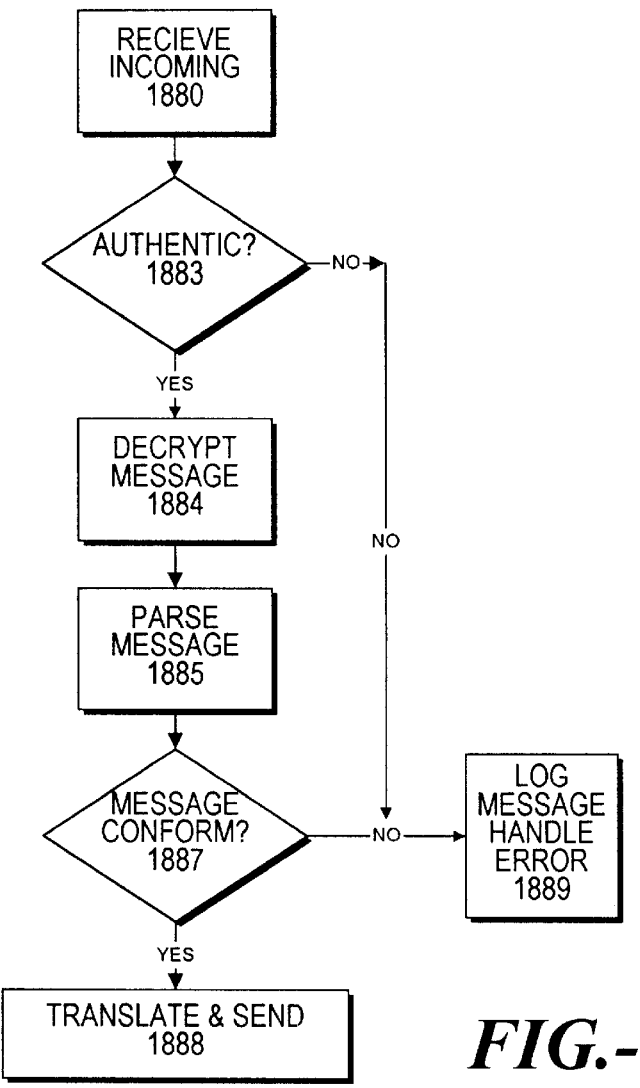

FIG. 18C is an example flowchart of message processing in accordance with a preferred embodiment. Processing commences at function block 1880 when a message is received by an HTTPS server or other listener and passed to decision block 1883 to determine if the sending VPOS has transmitted an authentic message and if the VPOS is authorized to communicate with this gateway. If the message is not authentic, then the message is logged as an error and the error is handled as shown in function block 1889. If the message is authentic, then the message is decrypted at function block 1884 and the PDU parses the message into name/value pairs. Then, based on the message type and the extended SET version information, the remaining message is parsed at function block 1885 and the message is checked for conformance to the appropriate specification as shown at decision block 1887. If the message does not conform, then it is logged and the error handled at function block 1889. If the message conforms to the proper specification in decision block 1887 then the message is translated into the appropriate host format and sent to the host as shown in function block 1888. Thus, when a gateway receives an incoming message from a vPOS and parses the Extended SET portion of the message, a single MIME message can transmit a SET message and/or an Extended Set Message.

An export license for the encrption can be obtained on a case-by-case basis, and since there will be potentially millions of VPOS's, it is desireable to obtain a commodities jurisdiction for the vPOS, to enable a single version of the VPOS (rather than one version for each bank) to be supported by the VPOS architecture. The architecture described here ensures that the single version of VPOS, no matter how it is configured with extended terminal transaction interfaces, cannot be used to communicate any data other than that contained in the extended SET messages that have been approved for export by the US government to be used exclusively for a specific bank.

Figure 18D:
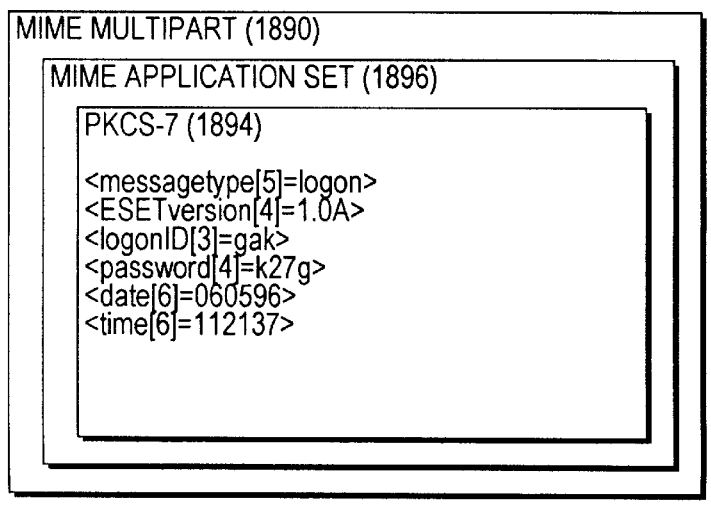

FIG. 18D is an example of a simple message between vPOS and vGate using the Extended SET channel enabling an employee to sign on, or "logon" to a given terminal in accordance with the subject invention. The message must contain the employee's logon ID, a password to be verified by the bank host computer, and the date and time as shown at 1894.

While the contents of the message are shown without encryption in FIG. 18D, it should be noted that the information (including the logon password) are SET encrypted inside the PKCS-7 wrapper 1894. Certain fields may be designated as mandatory for an Extended SET message, to allow the vGate or vPOS to decide how to handle the message. For the sake of clarity, in this message 1894, only two fields, "messagetype" and "ESETversion", are mandatory. These fields inform the vGate that this message is of type "logon," and that the vPOS is using version "1.0A" of the ESET message formats defined for the vGate. In this embodiment, the length indicator "[5]" is used to distinguish the length (in bytes) of the field of type "messagetype" in the message. In this way, there are no special end-of-data characters, and therefore arbitrary data need not have any "escaped" characters.

It should be noted that using escaped characters will work equally well. Total message integrity is assured by the digital signatures in the PKCS-7 wrapper. This does not, however, preclude the use of other checksumming schemes for additional pinpointing of transmission or encoding errors. The messagetype and ESETversion name/value pairs facilitate vGate look up of what name/value pairs are expected in the "logon" message. Some name/value pairs may be mandatory, and others may be optional.

Figure 18E:
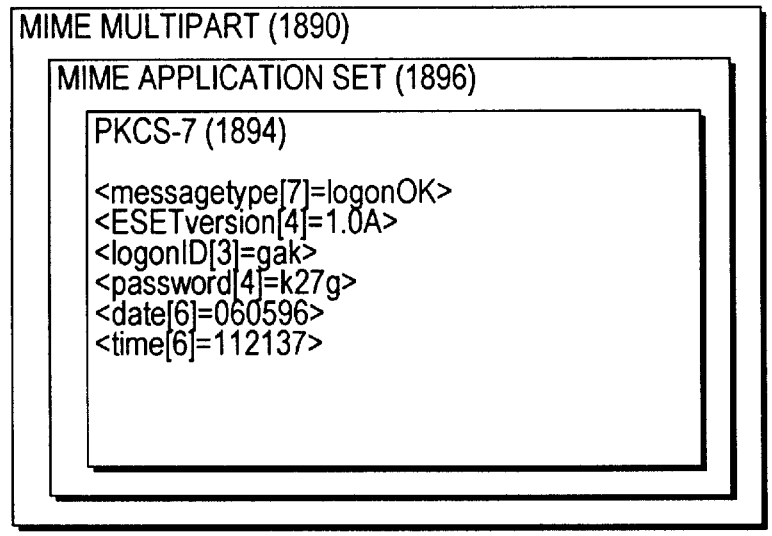

FIG. 18E is an example of a simple message between vPOS and vGate using the Extended SET channel enabling an employee to sign on, or "logon" to a given terminal in accordance with the subject invention. In response to the logon request message from a vPOS, the vGate may respond with a "logon accepted" message 1894, as depicted in FIG. 18E, which vPOS, upon receipt and authentication, then uses to unlock the terminal for that user.

3. Gateway-intitiated messages

Since all SET messages between a merchant and an acquirer are currently merchant-initiated, there must be a separate mechanism for initiating a message from a gateway, for example to request the upload of MIB data, or to download new parameters. This is accomplished by requiring the gateway to send a message to the merchant via a MIME-encapsulated PKCS-7 message containing name-value pairs to the merchant server directly, rather than to the SET module. This channel is shown in FIG. 18A at block 1860.

The message is verified for origination from the acquirer, and is utilized to either initialize a merchant action, such as to update the merchant's administration page (for example by blinking a message saying, "PLEASE RE-INITIALIZE YOUR TERMINAL"), or by initiating a request/response message pair originating from the merchant (for example, "HERE ARE THE CONTENTS OF MY MIB"). This is achieved by calling one of the extended terminal transaction interfaces (FIG. 18A at 1834), which in turn indicates a SET transaction.

Gateway Customization via the Extended SET Channel

Gateway customization in extended SET is extremely powerful and a novel concept for VPOS processing. Each VPOS contains a "serial number" which is unique to each copy of the software. Once a merchant has selected an acquirer and obtained the appropriate certificates, the VPOS can be customized utilizing the communication link and messages containing customization applications.

Let us consider an example in which a Wells Fargo Bank (WFB) distributes VPOS via different sales channels. The first is direct from WFB to an existing merchant with whom WFB already has an existing relationship. In this case, a version of VPOS customized for WFB is sent to the merchant. The customizations may involve modification or replacement of, for example, a store front 1822, shopping cart 1824, pay page 1826, standard terminal administration transaction interface 1828–1830 or an extended terminal transaction interface 1834.

Using the built-in "serial number" certificate and the Test Gateway public key, it is possible to securely download customization applications to a specific VPOS application. Once the VPOS is appropriately configured, the last stage of customization download is to configure the VPOS so that it only responds to a public key certificate of the merchant's acquirer.

Thread Safe VPOS—TID Allocation

Physical terminals process a single transaction at a time since clerks are usually only able to process one transaction at a time. Web Servers can process many transactions at a time, so payment requests can often occur simultaneously. Thus, the VPOS Software must have support for multi-tasking and provide support for multiple threads to be active at the same time in the same system as well as the same process. This requirement is relatively straight forward. However, the authorizing banks require that all transaction requests include a Terminal ID (TID), and, for many banks, no single TID may be active in any two transaction requests that overlap in time. Thus, the VPOS requires dynamic allocation of TIDs to requesting threads.

To provide for this requirement, the VPOS provides a TID pool in tabular form in a database management system (DBMS). This table has two colums: TID NAME & Allocation date/time. If the TID date is null, then the TID is not in use and may be assigned. A date/time field is utilized to allow TID allocations to expire. TID requests are made utilizing a SQL query on the TID Pool to find the first null or expired date/time, which is replaced with the current date/time and the TID name returned.

REMOTE VPOS

The unique archtitecture of the Cardholder 120, Merchant 130 and Gateway 140, as shown in FIG. 1B, provides communication capability between the modules utilizing the internet to support linkages 150 and 170. Since the internet is so pervasive, and access is available from virtually any computer, utilizing the internet as the communication back-bone for connecting the cardholder, merchant and access to the authorizing bank through a gateway allows the merchant VPOS software to be remotely located from the merchant's premises. For example, the cardholder could pay for goods from any computer system attached to the Internet at any location in the world. Similarly, the merchant VPOS system could be located at a central host site where merchant VPOS systems for various merchants all resided on a single host with their separate access points to the Internet. The merchant could utilize any other computer attached to the Internet utilizing a SSL or SET protocol to query the remote VPOS system and obtain capture information, payment administration information, inventory control information, audit information and process customer satisfaction information. Thus, without having to incur the overhead of maintaining sufficient computer processing power to support the VPOS software, a merchant can obtain the information necessary to run a business smoothly and avoid hiring IS personnel to maintain the VPOS system.

VPOS Multi-Merchant Processing

Multiple merchant processing refers to the ability of a plurality of merchants to process their individual VPOS transactions securely on a single computer. The archtecture relies on each payment page obtaining the merchant name in a hidden field on the payment page. The VPOS engine receives the merchant name with a particular transaction and synchronizes the processing utilizing a Set Merchant method. This command causes the VPOS API to look up a unique registry tree based on the merchant name. This process causes the VPOS engine to engage the appropriate configuration to process the transaction at hand utilizing a Microsoft Registry Tree. A registry tree contains Card Definition Tables (CDT)s, Acquirer Definition Tables (ADT)s, Merchant Definition Tables (MDT)s, Protocol Configuration Tables (PCT)s, etc. The CDTs point to specific ADTs since each supported card can be supplied by a distinct acquirer. This is one form of split connection. Each of the ADTs in turn point to PCTs, and some acquirers can support multiple parallel gateways. A merchant's name refers to a unique database in the database management system which contains for example, TIDs.

So, for example, to fully qualify a particular merchant in a multi-merchant system, the Acquirer Definition Table is queried to ascertain the particular Gateway (VFITest), then if Bank of America requires verification of network communication information, the particular CardDT is accessed with for example VISA. The particular merchant will service VISA transactions utilizing a particular acquirer. The particular piece of merchandise will also be detailed in a data base. Finally, the merchant Configurations will also be stored in the database to facilitate E-mail and name lookup.

VPOS CLIENT

The interaction between the VPOS and a client commences when a pay page solicits parameters of a transaction. Then, the parameters are validated to be sure the payment instrument, for example, cardnumber is not null. Then, a transaction object is created, eg. AUTHONLY, and the object is initialized and stuffed with parameters of the transaction, eg. ao.setpan(accnum), and the object is executed. This execution invokes the VPOS engine. The VPOS engine further validates the parameters based on the particular merchant's configuration. For example, some merchans do not accept American Express Cards, but will take Visa, and all merchants check the expiration date of the card. Assuming a valid and acceptable card has been tendered, then a TID is assigned (expiring, existing TIDs) or block a new TID from the TID Pool. This generates a STAN, XID, RRPID unique tag and creates an initial record in the transaction database which is flagged as before gateway processing in case the transaction crashes and must be baked out. Then the protocol parameters are identified in the registry based on card type, and a particular acquirer identified. Then, a protocol object is created and executed to extract results from the protocol object and the before gateway "bit" is flipped to again flag the location of the transaction in the process as it is submitted to the Gateway.

The results received back from the Gateway are placed into a transaction object with is reported back to the pay page and ultimatey back to the pay page user.

VPOS Merchant Pay Customization

A novel feature of the VPOS software provides payment page customization based on a merchant's preferences. This feature automatically lists cards that are accepted by a particular merchant based on the active terminal configuration. Each approved card for a particular merchant is linked to the display via an URL that provides a pointer to the credit card information supported by the merchant. Each card has an entry in a data structure referred to as the Credit Definition Table (CDT).

Figure 19:
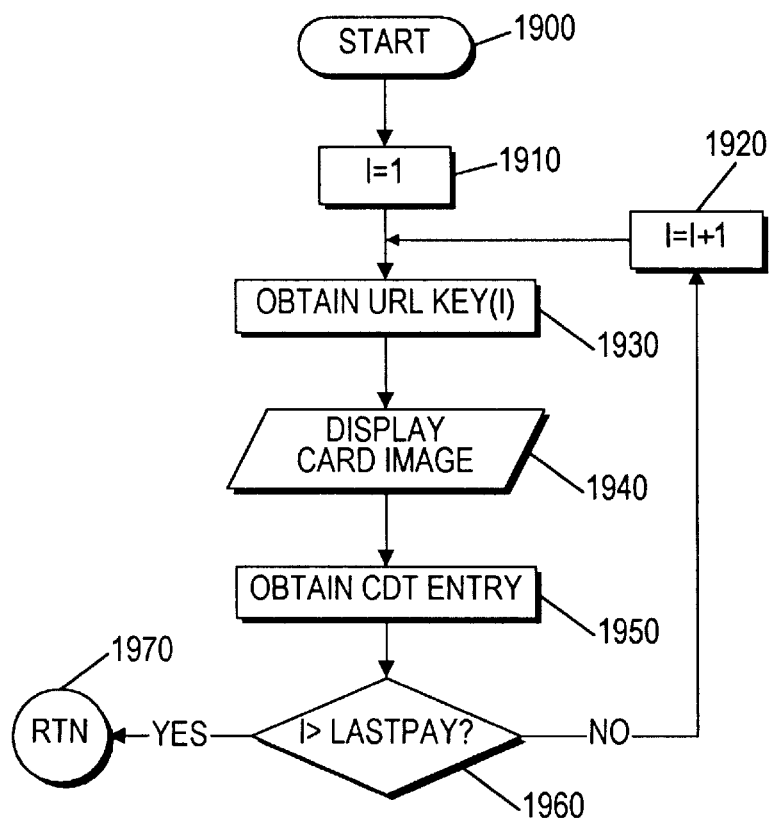
FIG. 19 is a flowchart of VPOS merchant pay customization in accordance with a preferred embodiment.

A preferred embodiment of the VPOS merchant pay customization software in accordance with a preferred embodiment is provided in FIG. 19 which illustrates the logic utilizing a flowchart, and a listing of the source code below. Processing commences at terminal 1900 and immediately flows to function block 1910 where an index variable is initialized for stepping through each of the accepted payment instruments for the merchant's page. Then, at function block 1930, a URL key is obtained associated with the current merchant pay page and index value. The URL key is a registry key name that points to a picture of a credit card that the merchant has associated with the pay page and which the merchant accepts as payment At output block 1940 the card image associated with the URL key is obtained and displayed on the terminal. The CDT entry is obtained at function block 1950 utilizing the URL key. The CDT is utilized for storing information associated with each card. Then, at decision block 1960, a test is performed to determine if the last payment method card has been processed and displayed on the merchant display. If not, then the index is incremented at function block 1920 and the loop reiterated to process the next card at function block 1930. If all the cards have been processed, then control is returned to the merchant program for processing the transaction at terminal 1970.

Figure 20A:
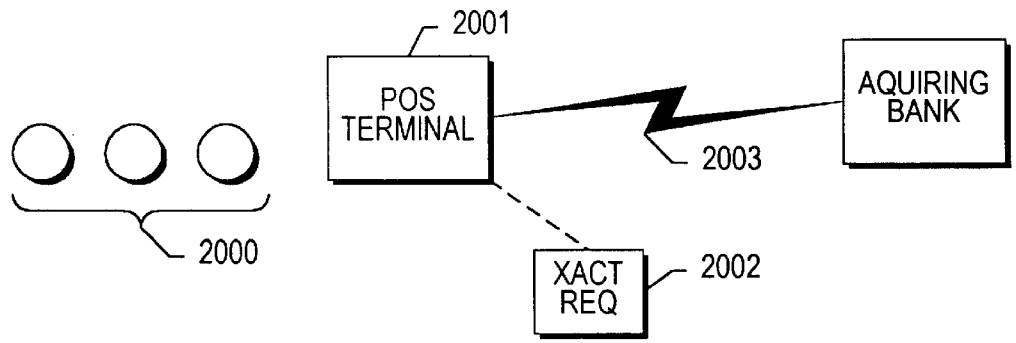
FIGS. 20A–20H are block diagrams and flowcharts setting forth the detailed logic of thread processing in accordance with a preferred embodiment.
Figure 20B:
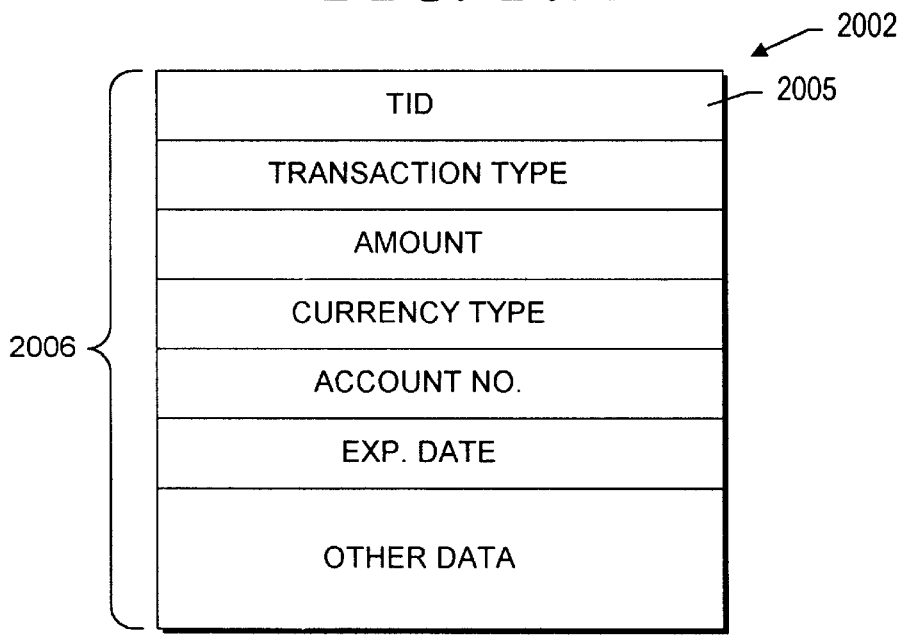
Figure 20C:
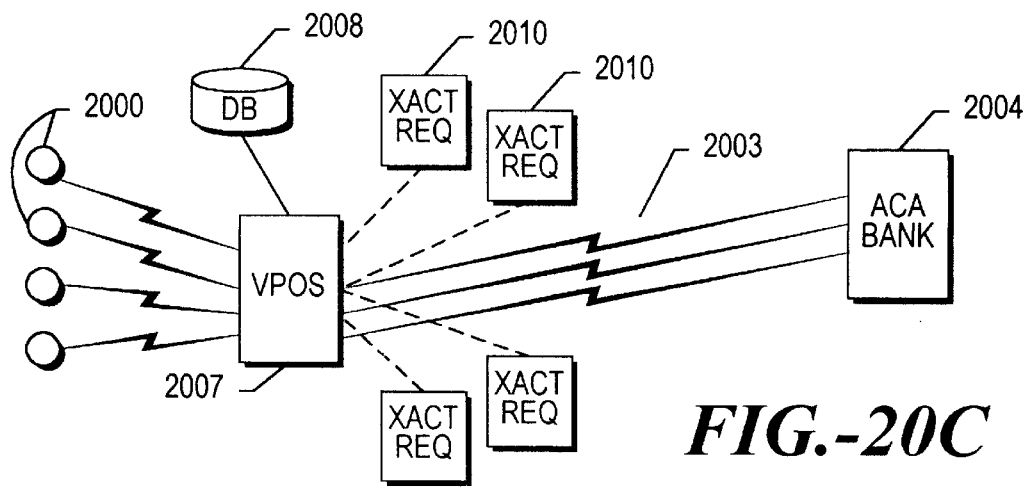
Figure 20D:
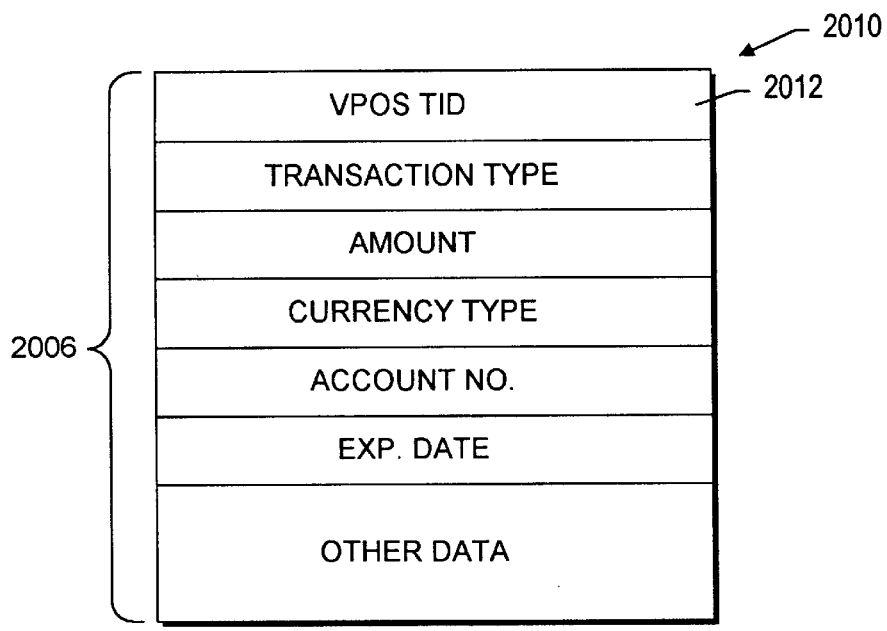
Figure 20E:
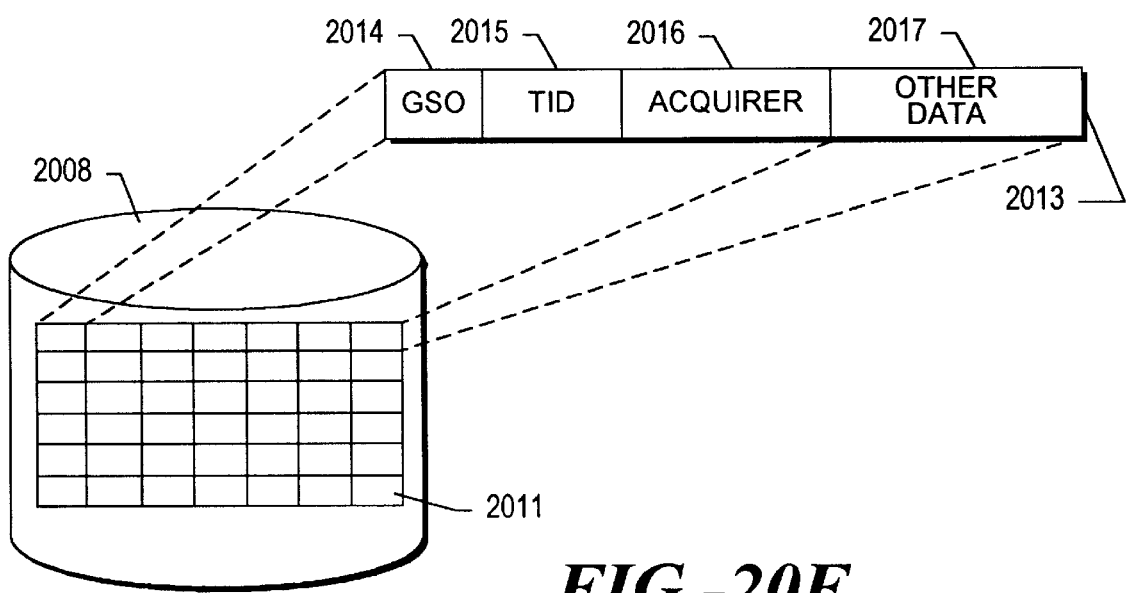
Figure 20F:
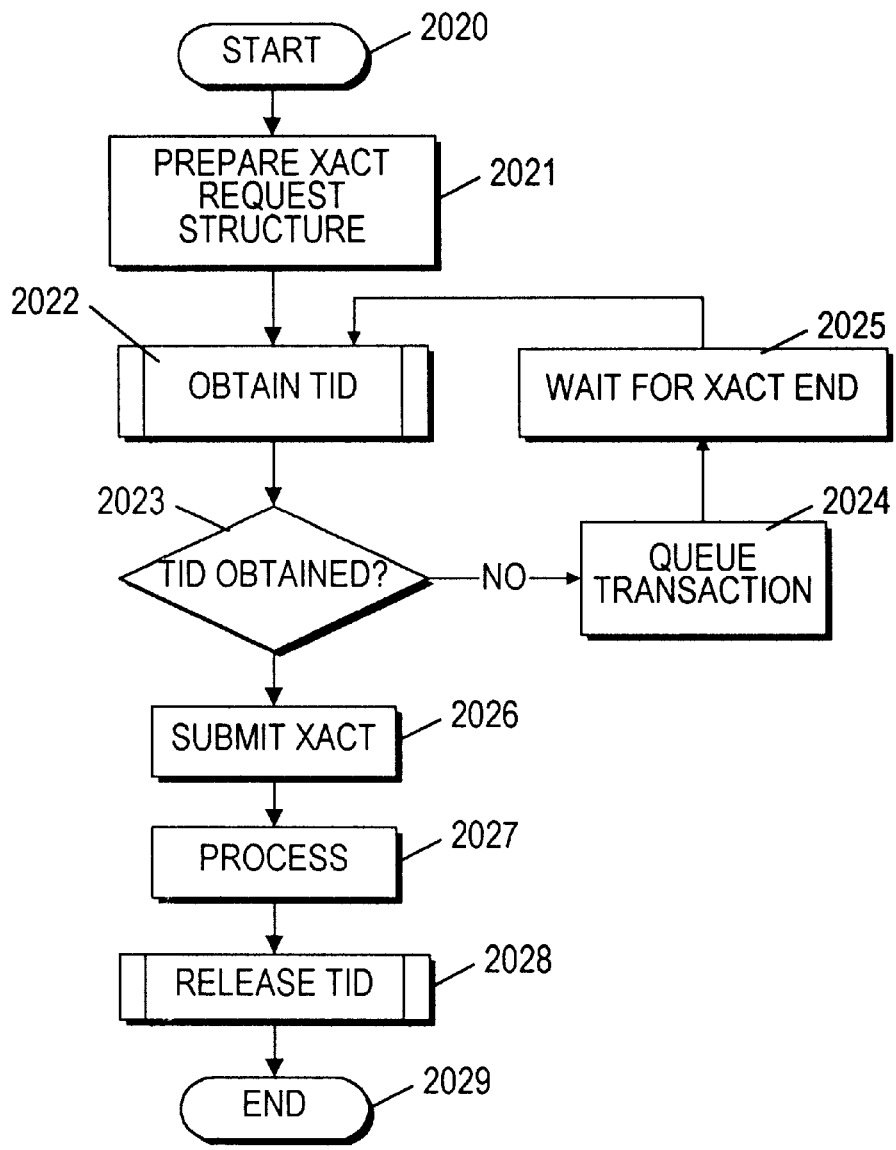
Figure 20G:
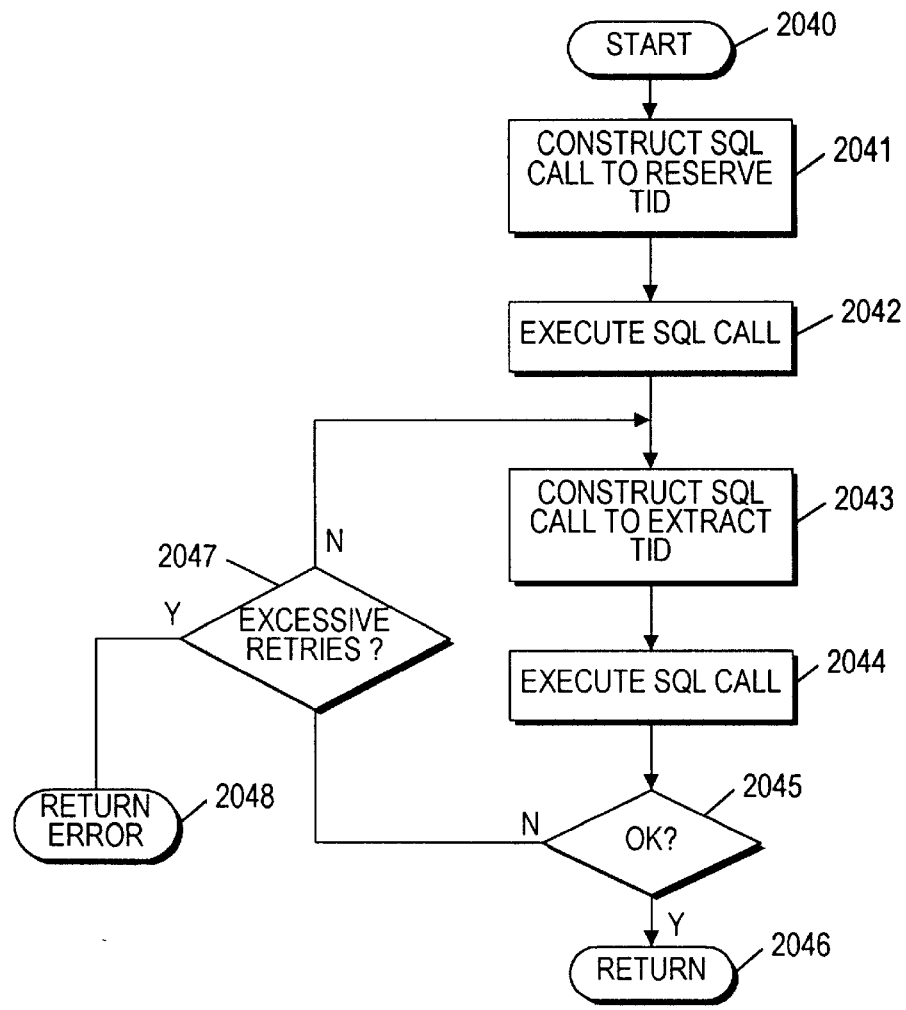
Figure 20H:
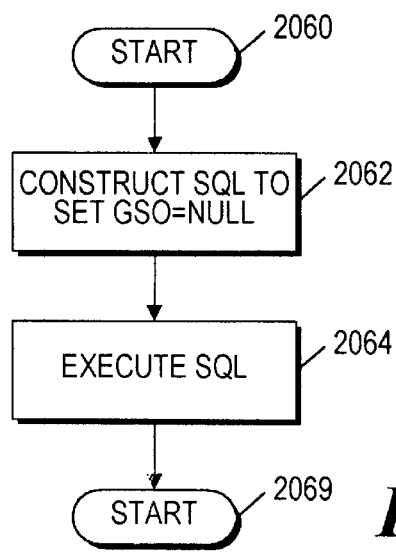

FIG. 20A–20H are block diagrams and flowcharts setting forth the detailed logic of thread processing in accordance with a preferred embodiment. FIG. 20A illustrates a prior art approach to POS processing utilized in most grocery stores and department stores today. FIG. 20B is a data structure of a POS transaction request in accordance with a preferred embodiment. FIG. 20C illustrates VPOS architecture with account requests being processed by a single acquiring bank. FIG. 20D illustrates a VPOS Transaction request data structure in accordance with a preferred embodiment. The transaction type, VPOS Terminal ID, Amount, Currency type, Digital Signature, Account number, Expiration date and other information are all stored in this record for later retrieval. FIG. 20E is a blow up of a portion of a TID allocation database in accordance with a preferred embodiment. FIG. 20F–H are flowcharts of the detailed logic in accordance with a preferred embodiment.

- 142 -

```
       #include "rr.h"
10     #ifndef _NT
       #define _NT
       extern void _setenvp();
       #endif 15     ////////////////////////////////////////////////////////////
       /
       // AcquireBillHtml
       // On Pay page, output form entries to acquire billing information
       ////////////////////////////////////////////////////////////
20     /
       EStatus AcquireBillHtml(CWSINT& clWSINT, int nTot, CProf& clProfile,
       EPCLCurrency eCurrency) {
           //Current time
           time_t tNow; //figure out current year for Credit card expiry
25         struct tm *tmNow;
           char szYear[DB_YEAR_SZ + 1];
           char szAmount[FORMATTED_CURRENCY + 1];
```

- 143 -

```
           time(&tNow);
           tmNow = localtime(&tNow);
           strftime(&szYear[0], (size_t)DB_YEAR_SZ + 1, "%Y", tmNow); //needs
       extra 1 for null
5          int nYear = atoi(szYear);
       /*<TH>Payment Type</TH>\n<TD><INPUT SIZE = 20 NAME=b_instrument
       VALUE=\"" \
               << clProfile.m_b_instrument << "\"></TD>" \
               << "*/
10         clWSINT << "<CENTER><TABLE BORDER=0><CAPTION ALIGN =
       TOP><B>Bill To</B></CAPTION>\n";
           clWSINT << "<TR ALIGN=LEFT><TH>Account Number</TH><TD
       COLSPAN = 5><INPUT SIZE = 56 MAXLENGTH = "
               << ACCT_NUM_SZ << " NAME=b_card> </TD></TR>\n";
15         clWSINT << "<TR ALIGN=LEFT><TH>Name on
       Card</TH><TD><INPUT SIZE= 20 MAXLENGTH= " << NAME_SZ
               << " NAME=b_name VALUE=\"" << clProfile.m_b_name
               << "\"> </TD><TH>Expiration</TH><TD>Month <SELECT
       NAME = b_expire_month><OPTION> 01\n <OPTION> 02\n" <<
20             "<OPTION> 03\n <OPTION> 04\n<OPTION> 05\n<OPTION>
       06\n<OPTION> 07\n<OPTION> 08\n<OPTION> 09\n" <<
               "<OPTION> 10\n<OPTION> 11\n<OPTION> 12\n</SELECT>
       Year <SELECT NAME = b_expire_year><OPTION>" << nYear <<
               "<OPTION>" << nYear + 1 << "<OPTION>" << nYear + 2 <<
25     "<OPTION>" << nYear + 3 << "<OPTION>" << nYear + 4 <<
               "</SELECT></TD></TR>\n";
           //<TH>Expires</TH><TD>Month <INPUT SIZE=3
       NAME=b_expire_month> Year <INPUT SIZE=5
```

```
        NAME=b_expire_year></TD></TR>\n";
                clWSINT << "<TR ALIGN=LEFT><TH>Address Line 1</TH><TD
        COLSPAN=5><INPUT SIZE=56 MAXLENGTH= " << ADDR_SZ
                        << " NAME=b_addr1 VALUE=\"" << clProfile.m_b_addr1 << "\">
 5      </TD></TR>\n";
                clWSINT << "<TR ALIGN=LEFT><TH>Address Line 2</TH><TD
        COLSPAN=5><INPUT SIZE=56 MAXLENGTH= " << ADDR_SZ
                        << " NAME=b_addr2 VALUE=\"" << clProfile.m_b_addr2 << "\">
        </TD></TR>\n";
10              clWSINT << "<TR ALIGN=LEFT><TH>City</TH><TD><INPUT
        MAXLENGTH= " << CITY_SZ << " NAME=b_city VALUE=\""
                        << clProfile.m_b_city << "\"> </TD>" <<
        "<TH>State/Province</TH><TD><INPUT MAXLENGTH= " << STATE_SZ
                        << " NAME=b_state VALUE=\"" << clProfile.m_b_state << "\">
15      </TD></TR>\n";
                clWSINT << "<TR ALIGN=LEFT><TH>Country</TH><TD><INPUT
        MAXLENGTH= " << COUNTRY_SZ
                        << " NAME=b_country VALUE=\"" << clProfile.m_b_country <<
        "\"> </TD><TH>Zip/Postal Code</TH><TD><INPUT MAXLENGTH= "
20                      << ZIP_SZ << " NAME=b_zip VALUE=\"" << clProfile.m_b_zip <<
        "\"> </TD></TR>\n";
                clWSINT << "<TR ALIGN=LEFT><TH>Email</TH><TD><INPUT
        MAXLENGTH= " << BEMAIL_SZ << " NAME=b_email VALUE=\""
                        << clProfile.m_b_email << "\"> </TD>"          <<
25      "<TH>Phone</TH><TD><INPUT MAXLENGTH= " << BPHONE_NUM_SZ
                        << " NAME=b_phone VALUE=\""     << clProfile.m_b_phone <<
        "\"> </TD></TR>\n";
                clWSINT << "</TABLE></CENTER><P>\n";
```

- 145 -

```
        //NPW      << " NAME=b_addr1> </TD>" << "<TH>Payment
Instrument</TH>\n<TD><SELECT NAME =b_instrument>";
        //hack from ini (bug) which pay instruments supported
5       //NPW clWSINT << "<OPTION> Credit Card\n" << "<OPTION> Debit
Card\n</SELECT></TD></TR>\n";
        CurrFormat(nTot, eCurrency, szAmount);
        clWSINT << "<CENTER><FONT SIZE=5>Total = " << szAmount <<
"</FONT></CENTER>";
10      return (eSuccess);
    }

/////////////////////////////////////////////////////////////////
15  //PayButtonsHtml
    // Output buttons on pay page: return to shop, pay, pay window,
    // modify order
/////////////////////////////////////////////////////////////////
20  void PayButtonsHtml(CWSINT& clWSINT, char* pszShopUrl, CRRReg&
    clReg) { char *pszHomeUrl = clWSINT.LookUp("home_url");
        char *pszModifyUrl = clWSINT.LookUp("modify_url");
25      char *pszSoftUrl = clWSINT.LookUp("soft_url");

if (!pszHomeUrl) pszHomeUrl = pszShopUrl; //Home Page
        //if (!pszModifyUrl) pszModifyUrl = pszShopUrl; //Shopping Cart
``` typically

```
        clWSINT << "<CENTER><H4>By pressing the Pay! button I agree to
    pay the above total amount<br> according to the card issuer
5   agreement<H4></CENTER>\n";
        clWSINT << "<CENTER>\n<A HREF = " << pszShopUrl << "> <IMG
    SRC=" << clReg.m_szReturnShop << " BORDER = 0></A>\n";
    #ifdef _SC
        clWSINT << "<INPUT TYPE = IMAGE NAME = gso SRC = " <<
10  clReg.m_szModifyOrder << " BORDER = 0>\n";
    #else
        if (pszModifyUrl)
            clWSINT << "<A HREF = " << pszModifyUrl << "> <IMG SRC=" <<
    clReg.m_szModifyOrder << " BORDER = 0></A>\n";
15  #endif
        clWSINT << "<INPUT TYPE = HIDDEN NAME = home_url VALUE = " <<
    pszHomeUrl << ">\n"
            << "<INPUT TYPE = IMAGE NAME = vpos SRC = " << clReg.m_szPay <<
    " BORDER = 0>\n"
20          << "<INPUT TYPE = HIDDEN NAME = shop_url VALUE = " <<
    pszShopUrl << ">\n"
            << "<INPUT TYPE = HIDDEN NAME = store VALUE = " <<
    clWSINT.LookUp("store") << ">\n"; //Can't be NULL or error previously
        if (pszSoftUrl)
25          clWSINT << "<INPUT TYPE = HIDDEN NAME = soft_url VALUE =
    " << pszSoftUrl << ">\n";
        clWSINT << "</CENTER>\n";
    }
```

- 147 -

```
///////////////////////////////////////////////////////////
// DisplayPayPage
// Outputs billing form, buttons, and static gso
5   ///////////////////////////////////////////////////////////
EStatus DisplayPayPage(CWSINT& clWSINT, CRRReg& clReg, int nError) {

EStatus eStat;
10      char szFileLine[BUFFER_SZ + 1];
        char *pszTag, *pszRefererUrl, *pszShopUrl, *pszExePath,
    *pszServerName;
        time_t tNow;
        int nTagExist = FALSE;
15      HKEY hCardsKey; //To enumerate cards
        long retCode;
        int nNoCards;
        DWORD dwtype, dwlen;
        HKEY hCardKey;
20      char szCardBuf[MAX_PATH + 1], szCardPic[MAX_PATH + 1];

#ifdef _SC
        CPOLBk clBkGso;
    #else
25      char *pszTxn, *pszGsoNum, *pszGsoOpaque, *pszTot;
    #endif //Shipping headers.  If come from gso page and cookies are not set,
```

- 148 -

```
        set.
                CProf *pProfile;
                pProfile = new CProf();
                if (!pProfile) return (eRRNewFailed);
5               eStat = pProfile->Init(clWSINT);
                if (eStat != eSuccess) return (eStat); //Init failed ifdef _SC /*No session cookie for the pay page.  This means the user will
        either use a long
10                      term cookie or type in their info each time*/
                clWSINT << "Set-Cookie: profile=" << pProfile->GetCookieLine() << ";
        path=/\n";
        /*      if (clWSINT.LookUp("Server Name"))
                        clWSINT << "; domain = " << clWSINT.LookUp("Server Name") <<
15      ";\n";*/
        #endif ifdef _SC
                //Shipping filled in?
20              if (!(pProfile->m_s_name[0] && pProfile->m_s_addr1[0] && pProfile-
        >m_s_city[0] && pProfile->m_s_state[0] &&
                        pProfile->m_s_zip[0] && pProfile->m_s_country[0] && pProfile-
        >m_s_ship[0])) {
                        eStat = DisplayGsoPage(clWSINT, clReg, ERROR_DISPLAY);
25      //bug, return correct?
                        return eStat;
                }
                //Creates shopping basket from CGI/Cookies
```

```
            eStat = clBkGso.Init(clWSINT, *pProfile, clReg);
            if (eStat != eSuccess) return (eStat); //eRRBasketCreateError //Cookies then other headers
 5          clBkGso.ToCookies(clWSINT, REGULAR);
      #endif //clWSINT << "Pragma: no-cache\n";
            clWSINT << "Content-type: text/html\n\n";
10
            //Where to position the page. if all information is filled in, here.
            if (!nError) {clWSINT << "<A NAME=jump></A>";}

//Output HTML
15          ifstream ifPay;
            ifPay.open(clReg.m_szPayTemplate, ios::in | ios::nocreate);
            if (ifPay.fail()) return (eRRCantOpenPayTemplate); //couldn't read pay
      template file 20          //HTML Template
            while (ifPay) {
                  ifPay.getline(szFileLine, BUFFER_SZ);
                  if (!(pszTag = strstr(szFileLine, DYNAMIC_TAG)))
                        clWSINT << szFileLine << "\n";
25                else {
                        nTagExist = TRUE;
                        //Null the tag, Output the beginning of the line,
                        //make the dynamic basket call, output the rest of the
```

- 150 -

```
             line
                          if (strlen(szFileLine) == strlen(DYNAMIC_TAG))
                                  pszTag[0] = NULL;
                          else {
5                                 pszTag[0] = (char) NULL;
                                  pszTag += strlen(DYNAMIC_TAG) + 1; //was 9
                          }
                          clWSINT << szFileLine;
                          //Dynamic call
10                        pszRefererUrl = clWSINT.LookUp("Referer");
                          if (!pszRefererUrl) return (eRRNoRefererUrl);
                          pszExePath = clWSINT.LookUp("Executable Path");
                          if (!pszExePath) return (eRRNoExePath);
                          pszServerName = clWSINT.LookUp("Server Name");
15                        if (!pszServerName) return (eRRNoServerName);
                          clWSINT << "<FORM METHOD = POST ACTION = http";
                          if (clReg.m_nUseSSL)
                                  clWSINT << "s";
                          clWSINT << "://" << pszServerName << pszExePath <<
20   "#jump>";

/*clWSINT << "<FORM METHOD = POST ACTION = " <<
     pszExePath << "#jump>";*/

25                        //Setting Long Cookies
                          clWSINT << "<CENTER>If you wish to have billing and
     shipping defaults set in your browser, check this box "
                                  << "<INPUT TYPE = CHECKBOX
```

```
                NAME=long_cookies></CENTER>\n";
                        //Fill it in message
                        if (nError) {
                                clWSINT << "<A NAME=jump></A>";
5                               clWSINT << "<CENTER><H4>You must fill in
        <I>all</I> of the billing information except for <I>address line 2</I> and
        <I>email</I>.</H4></CENTER>";
                        }
                        //GsoNum
10      #ifdef _SC
                        time(&tNow); //For multithreading, append instantiation
        number
                        clWSINT << "<TABLE ALIGN=RIGHT><TR><TH>Order
        Number</TH><TD>" << tNow
15                              << "</TD></TR></TABLE><BR
        CLEAR=ALL>\n<INPUT TYPE=HIDDEN NAME=b_gso_num VALUE = " <<
        tNow << ">\n";
        #else
                        //Pay page API: transaction type, GSO #, gso opaque
20                      pszGsoNum = clWSINT.LookUp("b_gso_num");
                        if (pszGsoNum)
                                clWSINT << "<TABLE
        ALIGN=RIGHT><TR><TH>Order Number</TH><TD>" << pszGsoNum
                                << "</TD></TR></TABLE><BR
25      CLEAR=ALL>\n<INPUT TYPE=HIDDEN NAME=b_gso_num VALUE = " <<
        pszGsoNum << ">\n";
                        else {
                                time(&tNow); //For multithreading, append
```

- 152 -

```
               instantiation number
                       clWSINT << "<TABLE
       ALIGN=RIGHT><TR><TH>Order Number</TH><TD>" << tNow
                       << "</TD></TR></TABLE><BR
 5     CLEAR=ALL>\n<INPUT TYPE=HIDDEN NAME=b_gso_num VALUE = " <<
       tNow << ">\n";
                       }
                       //Some pay page only specifics: transaction to execute,
       gso opaque
10                     pszTxn = clWSINT.LookUp("transaction");
                       if (pszTxn)
                               clWSINT << "<INPUT TYPE=HIDDEN
       NAME=transaction VALUE = " << pszTxn << ">\n";

15                     pszGsoOpaque = clWSINT.LookUp("gso_opaque");
                       if (pszGsoOpaque)
                               clWSINT << "<INPUT TYPE=HIDDEN
       NAME=gso_opaque VALUE = \"" << pszGsoOpaque << "\">\n";
       #endif
20
       #ifdef _SC
                       //Bill to information & Payment Instrument
                       eStat = AcquireBillHtml(clWSINT, clBkGso.GetTot(),
       *pProfile, (EPCLCurrency) clReg.m_eDefaultCurrency);
25     #else
                       //Pay Page alone requires a total
                       pszTot = clWSINT.LookUp("total");
                       if (!pszTot) return (eRRNoPayTotal);
```

- 153 -

```
                    eStat = AcquireBillHtml(clWSINT, atoi(pszTot), *pProfile,
        (EPCLCurrency) clReg.m_eDefaultCurrency);
                    clWSINT << "<INPUT TYPE=HIDDEN NAME=total VALUE
        = " << pszTot << ">\n";
    5   #endif
                    if (eStat != eSuccess) return (eStat); //error from db?
        within AcquireBillHtml
                    clWSINT << "<P>\n";

10              //Output Buttons on Form pszShopUrl = clWSINT.LookUp("shop_url");
                    if (!pszShopUrl)
                            PayButtonsHtml(clWSINT, pszRefererUrl, clReg);
    15              else
                            PayButtonsHtml(clWSINT, pszShopUrl, clReg);

//Registry Card LookUp
                    clWSINT << "<CENTER><TABLE CELLSPACING =
    20  5><TR><TH>Cards Accepted:</TH>";
                    RegOpenKeyEx(clReg.m_hStoreKey, "API\\CDT", 0,
        KEY_READ, &hCardsKey);
                    dwlen = sizeof(int);
                    RegQueryValueEx(hCardsKey, "NoOfRows", 0, &dwtype,
    25  (LPBYTE)&nNoCards, &dwlen);
                    for (int i = 0; i < nNoCards; i++) {
                            RegEnumKey(hCardsKey, i, szCardBuf, MAX_PATH
        + 1);
```

- 154 -

```
                        RegOpenKeyEx(hCardsKey, szCardBuf, 0,
        KEY_READ, &hCardKey);
                        dwlen = MAX_PATH + 1;
                        retCode = RegQueryValueEx(hCardKey,
    5   "CardPicture", 0, &dwtype, (LPBYTE)szCardPic, &dwlen);
                        if (retCode != ERROR_SUCCESS) return
        eRRRegistryFailure;
                        clWSINT << "<TD><IMG SRC = " << szCardPic <<
        "></TD>";
    10                  RegCloseKey(hCardKey);
                }
                RegCloseKey(hCardsKey);
                clWSINT << "</TR></TABLE></CENTER>";
                clWSINT << "</FORM>\n<HR>\n";
    15
        #ifdef _SC
                //Output static HTML Table
                clBkGso.ToHtml(clWSINT, NOEDIT);
                //Output static Shipping information
    20          StaticShipHtml(clWSINT, *pProfile); //Also NO_EDIT
                clWSINT << "<HR>\n";
        #else
                //Pay page alone takes and passes through a gso
                if (pszGsoOpaque)
    25                  clWSINT << pszGsoOpaque << "\n";
        #endif
                //Rest of Line from template file
                if (pszTag)   clWSINT << pszTag;
```

```
                }
            }
            if (nTagExist != TRUE)
                    return(eRRNoDynamicTag);
5           else
                    return (eSuccess);
        }

////////////////////////////////////
10      //Receipt Page
        /////////////////////////////////////////////////////////////////
        /////////////////////////////////#ifdef _SC
        /////////////////////////////////////////////////////////////////
        /
15      // StaticShipHtml
        // On Pay page, output Static table of shipping information
        // based on cookies set in prior page
        /////////////////////////////////////////////////////////////////
        /
20      void StaticShipHtml(CWSINT& clWSINT, CProf clProfile) {
                clWSINT << "<CENTER><TABLE CELLSPACING=10><CAPTION ALIGN
        = TOP><B>Ship To<B></CAPTION>\n";
                clWSINT << "<TR><TH ALIGN=LEFT>Name</TH><TD>" <<
        clProfile.m_s_name << "</TD>" <<
25                      "<TH ALIGN=LEFT>Address Line 1</TH><TD>" <<
        clProfile.m_s_addr1 << "</TD></TR>\n";
                clWSINT << "<TR><TH ALIGN=LEFT>Address Line 2</TH><TD>" <<
        clProfile.m_s_addr2 << "</TD>" <<
```

- 156 -

```
                "<TH ALIGN=LEFT>City</TH><TD>" << clProfile.m_s_city <<
        "</TD></TR>\n";
                clWSINT << "<TR><TH ALIGN=LEFT>State/Province</TH><TD>" <<
        clProfile.m_s_state << "</TD>" <<
5               "<TH ALIGN=LEFT>Zip/Postal Code</TH><TD>" <<
        clProfile.m_s_zip << "</TD></TR>\n";
                clWSINT << "<TR><TH ALIGN=LEFT>Country</TH><TD>" <<
        clProfile.m_s_country << "</TD>" <<
                "<TH ALIGN=LEFT>Shipping Method</TH><TD>" <<
10      clProfile.m_s_ship << "</TD></TR>\n";
                clWSINT << "</TABLE></CENTER><P>";
        }
        #endif

15

///////////////////////////////////////////////////////////
        /
        // StaticBillHtml
        // On Receipt page, output static table of billing information
20      ///////////////////////////////////////////////////////////
        /
        void StaticBillHtml(CWSINT& clWSINT, CProf clProfile) {

/*<TH>Payment Type</TH>\n<TD>" << clProfile.m_b_instrument
25                  << "</TD>*/
                clWSINT << "<CENTER><TABLE CELLSPACING=10><CAPTION ALIGN
        = TOP><B>Bill To<B></CAPTION>\n";
                clWSINT << "<TR ALIGN=LEFT><TH>Account Number</TH><TD
```

```
         COLSPAN=3>" << clProfile.m_b_card << "</TD></TR>\n";
                 clWSINT << "<TR ALIGN=LEFT><TH>Name on Card</TH><TD>" <<
         clProfile.m_b_name <<
                     "</TD><TD><B>Expires:</B><I>Month</I> " <<
    5    clProfile.m_b_expire_month << " <I>Year</I> " << clProfile.m_b_expire_year
         << "</TD></TR>\n";
                 clWSINT << "<TR ALIGN=LEFT><TH>Address Line 1</TH><TD
         COLSPAN=3>" << clProfile.m_b_addr1 << "</TD></TR>\n";
                 clWSINT << "<TR ALIGN=LEFT><TH>Address Line 2</TH><TD
   10    COLSPAN=3>" << clProfile.m_b_addr2 << "</TD></TR>\n";
                 clWSINT << "<TR ALIGN=LEFT><TH>City</TH><TD>" <<
         clProfile.m_b_city << "</TD>"
                     << "<TH>State/Province</TH><TD>" << clProfile.m_b_state <<
         "</TD></TR>\n";
   15            clWSINT << "<TR ALIGN=LEFT><TH>Country</TH><TD>" <<
         clProfile.m_b_country <<
                     "</TD><TH>Zip/Postal Code</TH><TD>" << clProfile.m_b_zip
         << "</TD></TR>\n";
                 clWSINT << "<TR ALIGN=LEFT><TH>Email</TH><TD>" <<
   20    clProfile.m_b_email << "</TD>"
                     << "<TH>Phone</TH><TD>" << clProfile.m_b_phone <<
         "</TD></TR>\n";
                 clWSINT << "</TABLE></CENTER><P>\n";
         }
   25
         //////////////////////////////////////////////////////////////
         /
         //VposReceipt
```

//Generates a receipt from the return block and profile info.
/////////////////////////////////////////////////////////////
/
ifdef VPOS_OLE
    #ifdef _SC
        void VposReceipt(CWSINT& clWSINT, /* CVPCLFinCCTrans */ CVPCL_OleCCAuthOnly *pTxn, CProf& clProfile, CRRReg& clReg, CPOLBk& clBkGso) {
    #else
        void VposReceipt(CWSINT& clWSINT, /* CVPCLFinCCTrans */ CVPCL_OleCCAuthOnly *pTxn, CProf& clProfile, CRRReg& clReg) {
    #endif
else
    #ifdef _SC
        void VposReceipt(CWSINT& clWSINT, CVPCLFinCCTrans *pTxn, CProf& clProfile, CRRReg& clReg, CPOLBk& clBkGso) {
    #else
        void VposReceipt(CWSINT& clWSINT, CVPCLFinCCTrans *pTxn, CProf& clProfile, CRRReg& clReg) {
    #endif
endif
    //Set Long cookies (if applicable)
    struct tm *tmNow;
    char szDate[32]; //what is the max date? in this format/ bug
    time_t tNow;
    time(&tNow);
    tNow += clReg.m_nProfileLife * 86400;//ini constant for length of cookie stay
```

- 159 -

```
        tmNow = localtime(&tNow);
        strftime(szDate, (size_t)31, "%a, %d-%b-%y %H:%M:%S GMT",
   tmNow);
        if (clWSINT.LookUp("long_cookies"))
5            clWSINT << "Set-Cookie: cust_profile=" <<
   clProfile.GetCookieLine() << "; expires="
                << szDate << "; path=/\n"; //Profile cookies ifdef _SC //Shopping cart sets local cookies on receipt
10           clWSINT << "Set-Cookie: profile=" << clProfile.GetCookieLine() <<
   "; expires="
                << szDate << "; path=/\n"; //Profile cookies
   #endif
       /*clWSINT << "; domain = " << clWSINT.LookUp("Server Name") <<
15  ";\n";*/ ifdef _SC
         //Delete shopping basket
20     clBkGso.ToCookies(clWSINT, EXPIRE);
   #endif
        clWSINT << "Pragma: no-cache\n";
        clWSINT << "Content-type: text/html\n\n";
        clWSINT << "<HTML><BODY " << clReg.m_szBackgroundString <<
25 ">\n";
        clWSINT << "<A NAME=jump></A>\n";
        clWSINT << "<CENTER><IMG SRC=" << clReg.m_szReceiptBanner <<
   "></CENTER>\n";
```

- 160 -

```
            clWSINT << "<CENTER><H2>This is your receipt.  Please save it using
    the <I>Save As</I> option from the <I>File Menu</I> in your
    browser</H2></CENTER>";

5           //Vpos Return Block
            char szGso[PURCH_ORDER_NUM_SZ + 1];
            char szTransAmt[AMT_SZ + 1];
            char szDisplayTransAmt[FORMATTED_CURRENCY + 1]; //Extra point
    for decimal
10          enum EPCLCurrency eCurr;// = (EPCLCurrency)
    clReg.m_eDefaultCurrency;
            enum EPCLDecimals eDec;// = eTwoDecDigits;
            char szTime[TRANS_TIME_SZ + 1];
            char szPan[ACCT_NUM_SZ +1];
15          char szExpDate[EXP_DATE_SZ + 1];
            char szRetRefNum[RET_REF_NUM_SZ + 1];
            pTxn->GetRespTransAmt(szTransAmt, AMT_SZ + 1, &eCurr, &eDec);
            pTxn->GetPurchOrderNum(szGso, PURCH_ORDER_NUM_SZ +1);
            pTxn->GetRespTransDate(szDate, TRANS_DATE_SZ + 1);
20          pTxn->GetRespTransTime(szTime, TRANS_TIME_SZ +1);
            pTxn->GetRetRefNum(szRetRefNum, RET_REF_NUM_SZ +1);
            pTxn->GetPAN(szPan, ACCT_NUM_SZ +1);
            pTxn->GetExpDate(szExpDate, EXP_DATE_SZ+1);

25          clWSINT <<"<CENTER><TABLE BORDER=0
    CELLSPACING=10><CAPTION><B>" << clReg.m_szShopName
                << " - Order Number</B> - " << szGso
                << "</CAPTION>\n<TR ALIGN=LEFT><TH>Time</TH><TD>" <<
```

```
              szTime[0]
                     << szTime[1] << ":" << szTime[2] << szTime[3] << ":" <<
              &szTime[4] << "</TD><TH>Date</TH><TD>"
                     << szDate[0] << szDate[1] << "/" << szDate[2] << szDate[3] << "/"
   5          << &szDate[4] << "</TD></TR>"
                     << "<TR ALIGN=LEFT><TH>Account Number</TH><TD
              COLSPAN=3><B>" << szPan << "</B></TD></TD>"
                     << "<TR ALIGN=LEFT><TH>Authorization Code</TH><TD>" <<
              "No Auth?"
  10                 << "</TD><TH>Reference Number</TH><TD>" << szRetRefNum
              << "</TD></TR>"
                     << "</TABLE></CENTER>";
                  CurrFormat(atoi(szTransAmt), eCurr, szDisplayTransAmt);
                  clWSINT << "<CENTER><FONT SIZE=5>Total = " <<
  15          szDisplayTransAmt << "</FONT></CENTER><HR>\n";

//transtype, time, date, acct #, expire, vpos id, transaction type, auth
              code, ref#, amount 20              //Soft goods fulfillment
                  char *pszSoftUrl = clWSINT.LookUp("soft_url");
                  if (pszSoftUrl)
                         clWSINT << pszSoftUrl << "<HR>";

25          #ifdef _SC
                  //Static Gso, placeholder crap until do LnGrp
                  clBkGso.ToHtml(clWSINT, NOEDIT);
                  clWSINT << "<HR>";
```

- 162 -

```
        //Static Billing
        StaticBillHtml(clWSINT, clProfile);
        clWSINT << "<HR>";
        //Static Shipping
5       StaticShipHtml(clWSINT, clProfile);
        clWSINT << "<HR>";
    #else
        //Static passed gso if it exists
        char *pszGso = clWSINT.LookUp("gso_opaque");
10      if (pszGso) clWSINT << pszGso;
        //Static Billing
        StaticBillHtml(clWSINT, clProfile);
        clWSINT << "<HR>";

15  #endif
        //Merchant Signature Block (if/when applicable)

//Buttons
        char *pszHomeUrl = clWSINT.LookUp("home_url");
20      char *pszShopUrl = clWSINT.LookUp("shop_url");
        clWSINT << "<CENTER>\n<A HREF = " << pszShopUrl
            << "> <IMG SRC=" << clReg.m_szReturnShop << " BORDER = 
    0></A>\n"
            << "<A HREF = " << pszHomeUrl << "> <IMG SRC=" <<
25  clReg.m_szHome << " BORDER = 0></A>\n"
            << "</CENTER><HR>\n";

//Acquirer Banner
```

```
               char szPANLo[ACCT_NUM_SZ + 1], szPANHi[ACCT_NUM_SZ + 1],
       szBuf[MAX_PATH + 1];
               char  szTruncPAN[ACCT_NUM_SZ+1] ;
               HKEY hCardsKey, hCardKey;
    5          DWORD dwtype, dwlen;
               int nNoCards, nPANLen;
               long retCode;
               RegOpenKeyEx(clReg.m_hStoreKey, "API\\CDT", 0, KEY_READ,
       &hCardsKey);
    10         dwlen = sizeof(int);
               RegQueryValueEx(hCardsKey, "NoOfRows", 0, &dwtype,
       (LPBYTE)&nNoCards, &dwlen);
               for (int i = 0; i < nNoCards; i++) {
                       RegEnumKey(hCardsKey, i, szBuf, MAX_PATH + 1);
    15                 RegOpenKeyEx(hCardsKey, szBuf, 0, KEY_READ, &hCardKey);
                       dwlen = ACCT_NUM_SZ + 1;
                       retCode = RegQueryValueEx(hCardKey, "PANLo", 0, &dwtype,
       (LPBYTE)szPANLo, &dwlen);
                       if (retCode != ERROR_SUCCESS) return;
    20                 dwlen = ACCT_NUM_SZ + 1;
                       retCode = RegQueryValueEx(hCardKey, "PANHi", 0, &dwtype,
       (LPBYTE)szPANHi, &dwlen);
                       if (retCode != ERROR_SUCCESS) return;
                       nPANLen = strlen(szPANLo) ;
    25                 strncpy(szTruncPAN, szPan, nPANLen);
                       szTruncPAN[nPANLen] = '\0' ;
                       if((atoi(szTruncPAN) >= atoi(szPANLo) ) && (atoi(szTruncPAN) <=
       atoi(szPANHi))) {
```

```
                char szAcquirer[MAX_PATH + 1],
szAcquirerBanner[MAX_PATH + 1];
                szAcquirer[0] = NULL; szAcquirerBanner[0] = NULL;
                HKEY hAcquirersKey, hAcquirerKey;
5               int nNoAcquirers = 0;
                dwlen = MAX_PATH + 1;
                RegQueryValueEx(hCardKey, "Acquirer", 0, &dwtype,
(LPBYTE)szAcquirer, &dwlen);
                RegOpenKeyEx(clReg.m_hStoreKey, "API\\ADT", 0,
10  KEY_READ, &hAcquirersKey);
                dwlen = sizeof(int);
                retCode = RegQueryValueEx(hAcquirersKey, "NoOfRows",
0, &dwtype, (LPBYTE)&nNoAcquirers, &dwlen);
                for (int j = 0; j < nNoAcquirers; j++) {
15              retCode = RegEnumKey(hAcquirersKey, j, szBuf,
MAX_PATH +1); //Get jth Acquirer subkey in szbuf
                    if (retCode != ERROR_SUCCESS) break;
                    if (!strcmp(szBuf, szAcquirer)) {
                        RegOpenKeyEx(hAcquirersKey, szBuf, 0,
20  KEY_READ, &hAcquirerKey);
                        dwlen = MAX_PATH + 1;
                        retCode = RegQueryValueEx(hAcquirerKey,
"AcquirerBanner", 0, &dwtype, (LPBYTE)szAcquirerBanner, &dwlen);
                        if (retCode != ERROR_SUCCESS) break;
25                      clWSINT << "<CENTER><IMG SRC=" <<
szAcquirerBanner << "></CENTER>\n";
                        RegCloseKey(hAcquirerKey);
                        break;
```

- 165 -

```
                        }
                    }
                    RegCloseKey(hAcquirersKey);
                    break;
5               }
                RegCloseKey(hCardKey);
            }
            RegCloseKey(hCardsKey);
            clWSINT << "</HTML>";
10      }

////////////////////////////////////////////////////////////
15    /
      // VposPay
      // Create a PO object and invoke the vpos
      ////////////////////////////////////////////////////////////
      /
20    EStatus VposPay(CWSINT& clWSINT, CRRReg& clReg) {

EStatus eStat;
            EPCLTransType eTxn;
            char *pszTxn = clWSINT.LookUp("transaction");
25          char szBuf[MAX_CGI_VAR + 1]; //used for cgi variable tstore and for
      number later
      #ifdef _SC
            CPOLBk clBkGso; //GSO data structure
```

- 166 -

```
       #else
               //Total for transaction
               char *pszTotal = clWSINT.LookUp("total");
               if (!pszTotal) return(eRRNoPayTotal);
   5   #endif //Profile object
               CProf *pProfile;
               pProfile = new CProf();
  10           if (!pProfile) return (eRRNewFailed);
               eStat = pProfile->Init(clWSINT);
               if (eStat != eSuccess) return (eStat);

//Check billing information
  15           if (!(pProfile->m_b_name[0] && pProfile->m_b_addr1[0] && pProfile-
       >m_b_city[0] && pProfile->m_b_state[0] &&
                       pProfile->m_b_zip[0] && pProfile->m_b_country[0] && pProfile-
       >m_b_phone[0] &&
                       pProfile->m_b_card[0] && pProfile->m_b_expire_month[0] &&
  20   pProfile->m_b_expire_year[0])) {
                       eStat = DisplayPayPage(clWSINT, clReg, TRUE);
                       return eStat;
               }

25           //Payment transaction for a credit card
       #ifdef VPOS_OLE
                       CVPCL_OleCCAuthOnly *pTxn;
       #else
```

- 167 -

```
                CVPCLFinCCTrans *pTxn;
        #endif if (pszTxn) {
 5              eTxn = eNumTransTypes;
                if (!strcmp("authonly", pszTxn))
                    eTxn = eTransAuthOnly;
        /*      if (!strcmp("authcapture", pszTxn))
                    eTxn = eTransAuthCapture;
10              if (!strcmp("offlineauth", pszTxn))
                    eTxn = eTransOfflineAuth;*/
            }
            else
                eTxn = clReg.m_eDefaultAuthTrans;
15
            //Create Transaction object
            switch (eTxn) {
            case eTransAuthOnly:
                    #ifdef VPOS_OLE
20                      pTxn = new CVPCL_OleCCAuthOnly();
                    #else
                        pTxn = new CVPCL_CCAuthOnly();
                    #endif
                    if (!pTxn) return eFailure; // Transaction Init Failure
25              break;
            default:
                    return eRRIllegalTransaction;
            }
```

- 168 -

```
        //Transaction Initialize
        char *pszMerchant = clWSINT.LookUp("store");
        sprintf(szBuf, "MerchName=");
5       strncat(szBuf, pszMerchant, (MAX_CGI_VAR-10)); //The 10 is for
        MerchName=

// Connect to the OLE Automation Server
        #ifdef VPOS_OLE
10      eStat = pTxn->CreateDispatch() ;
        if (eSuccess != eStat) {
                return eFailure ;
        }
        #endif
15
        eStat = pTxn->InitTrans(szBuf);
        if (eStat != eSuccess) return eFailure; //eRRTxnInitFailed //GSO Number
20      char* b_gso_num = clWSINT.LookUp("b_gso_num");
        if (!b_gso_num) return (eRRNoGsoNum);
        //Compose Gso object
        //CPOLPO clPO(&b_gso_num);
        //Creates shopping basket from CGI/Cookies.  This information is
25      borrowed by
        //Line Group class. For each item in the basket, put it in the PO
        object.  We use a member function
        //That others using the library cannot use because they may not have
``` a basket object at their disposal.
//Those others must use the Set methods directly
//Then get prices from database. If prices differ, error code
ifdef _SC
5       eStat = clBkGso.Init(clWSINT, *pProfile, clReg);
        if (eStat != eSuccess) return (eStat);
//      eStat = clPO.InitFromBk(clBkGso);
        if (eStat != eSuccess) return (eStat);
endif
10      //set all stuff from profile object
        //set custcookie
        //set cust id
        //set personal message
        //Pay Page standalone. Call an integrator function, execute vpos
15  stuff, call an ending function.
        //The calls before and after are for the integrator to reconcile his
        database with the VPOS.

//GSO VERIFICATION suggestions
20      //Check to see if this purchase order exists in the database & if it is
        linked properly with this price
        //Insert GSO and line items into db with before VPOS Txn status
        //eStat = GsoVerify(b_gso_num, pszTotal); //For integrator to fill in.
        //if (eStat != eSuccess) return eStat; //Failed lookup check
25
    #ifdef _SC
        int nTot;
    /*  nTot = clBkGso.GetTot() * 100;

- 170 -

```
        if (((clBkGso.GetTot() * 100) - nTot) >= .5)
                ++nTot;
        sprintf(szBuf, "%.2f", nTot/100.0) ;  //Transaction Amount, hack to
    get past 2 digits*/
5       //erase szBuf below.  Lose precision by flooring this integer.  need to
    define round up/down
        sprintf(szBuf, "%d", (int)clBkGso.GetTot());
        pTxn->SetReqTransAmt(szBuf, (EPCLCurrency)
    clReg.m_eDefaultCurrency, eTwoDecDigits);
10  #else
        //Amount
        NumClean(pszTotal);
        pTxn->SetReqTransAmt(pszTotal, (EPCLCurrency)
    clReg.m_eDefaultCurrency, eTwoDecDigits);
15  #endif
        //GSO Num
        pTxn->SetPurchOrderNum(b_gso_num);
        //Retry Counter
        pTxn->SetRRPid(1); //The first time a transaction is executed this
20  must be set to 1
        //AVS Data
        if (clReg.m_nAVS) {
                char avs_zip[ZIP_SZ + 1];
                strncpy(avs_zip, pProfile->m_b_zip, ZIP_SZ);
25              avs_zip[ZIP_SZ] = NULL;
                NumClean(avs_zip);
                pTxn->SetAVSData(avs_zip);
        }
```

- 171 -

```
            pTxn->SetBName(pProfile->m_b_name);
            pTxn->SetBStreetAddress1(pProfile->m_b_addr1);
            pTxn->SetBStreetAddress2(pProfile->m_b_addr2);
            pTxn->SetBCity(pProfile->m_b_city);
5           pTxn->SetBStateProvince(pProfile->m_b_state);
            pTxn->SetBZipPostalCode(pProfile->m_b_zip); //Insert as is zip into
       db
            pTxn->SetBCountry(pProfile->m_b_country);
            pTxn->SetBEMail(pProfile->m_b_email);
10          pTxn->SetBDayTimePhone(pProfile->m_b_phone);

//Card Number and expiry date
            NumClean(pProfile->m_b_card);
            char szDate[DB_MONTH_SZ + DB_YEAR_SZ + 1];
15          strncpy(szDate, pProfile->m_b_expire_month, DB_MONTH_SZ);
            szDate[DB_MONTH_SZ] = NULL;
            strncat(szDate, pProfile->m_b_expire_year, DB_YEAR_SZ);
            pTxn->SetPAN(pProfile->m_b_card);
            pTxn->SetExpDate(szDate);
20
            //Execute Transaction
            eStat = pTxn->ExecuteTrans();
            if (eStat != eSuccess) return eStat; //DB or Internal Error of some
       kind
25
            //Transaction Shutdown
            eStat = pTxn->ShutDownTrans();
            if (eStat != eSuccess) return eFailure; //eRRTxnShutFailed
```

```
            //Gso after for integrator to fill in
            //Gso_reconcile(success or failure, gso_number);

5           //Delete cookies GSO. Set shipping/billing cookies.  Send receipt -
    member function of PO object.
    #ifdef _SC
            VposReceipt(clWSINT, pTxn, *pProfile, clReg, clBkGso); //This should
    be PO object
10  #else
            VposReceipt(clWSINT, pTxn, *pProfile, clReg); //Use Get Methods for
    Receipt
    #endif
    #ifdef VPOS_OLE
15          // Disconnect from the server
            pTxn->ReleaseDispatch() ;
    #endif
            return (eSuccess);
```

Default Gateway Configuration

The VPOS is initially shipped enabled to connect to a default gateway with a single instance of a gateway defined that accesses a predefined site for testing of an installation before bringing it online in a production mode. The test installation contacts and converses with an actual gateway that simulates live transactions. After the installation checks out utilizing a set of test transactions, the test gateway downloads the pre-checked customizations to the installation so that it can switch over to the production acquirer. This download processing is enabled in extensions to SET.

Internet Transaction Gateway

Payment methods that issue cards for conducting business utilize four major entities. These entities are the issuer, consumer, merchant and the acquirer. The issuing bank that provides the consumer with a credit card are usually not the same bank as the acquiring bank that serves the merchant. When the consumer utilizes a credit card to pay for a purchase, the merchant swipes the card through the POS terminal which makes a connection to the merchant's acquirer via the telephone network and transmits an authorization request with data read from the magnetic stripe. The acquirer's host processor, depending on the card number, will either perform local processing or switch the request to the correct issuing bank's host processor through the interchange network. In a few seconds, the authorization response is returned to the originating POS indicating either an approval or a rejection.

The Internet is a viable infrastructure for electronic commerce. Ubiquitous browser software for the World Wide Web provides around-the-clock access to a large base of information content provided by Web servers. Utilizing a preferred embodiment, consumers using browsers can shop at virtual stores and malls presented as Web pages managed by the merchants' servers. Consumers can make purchases and pay for them using credit cards or other digital payment instruments in a secure manner. For such Internet-based payments to be authorized, a "gateway" is necessary at the back end to channel transactions to legacy processors and interchange networks.

Figure 21A:
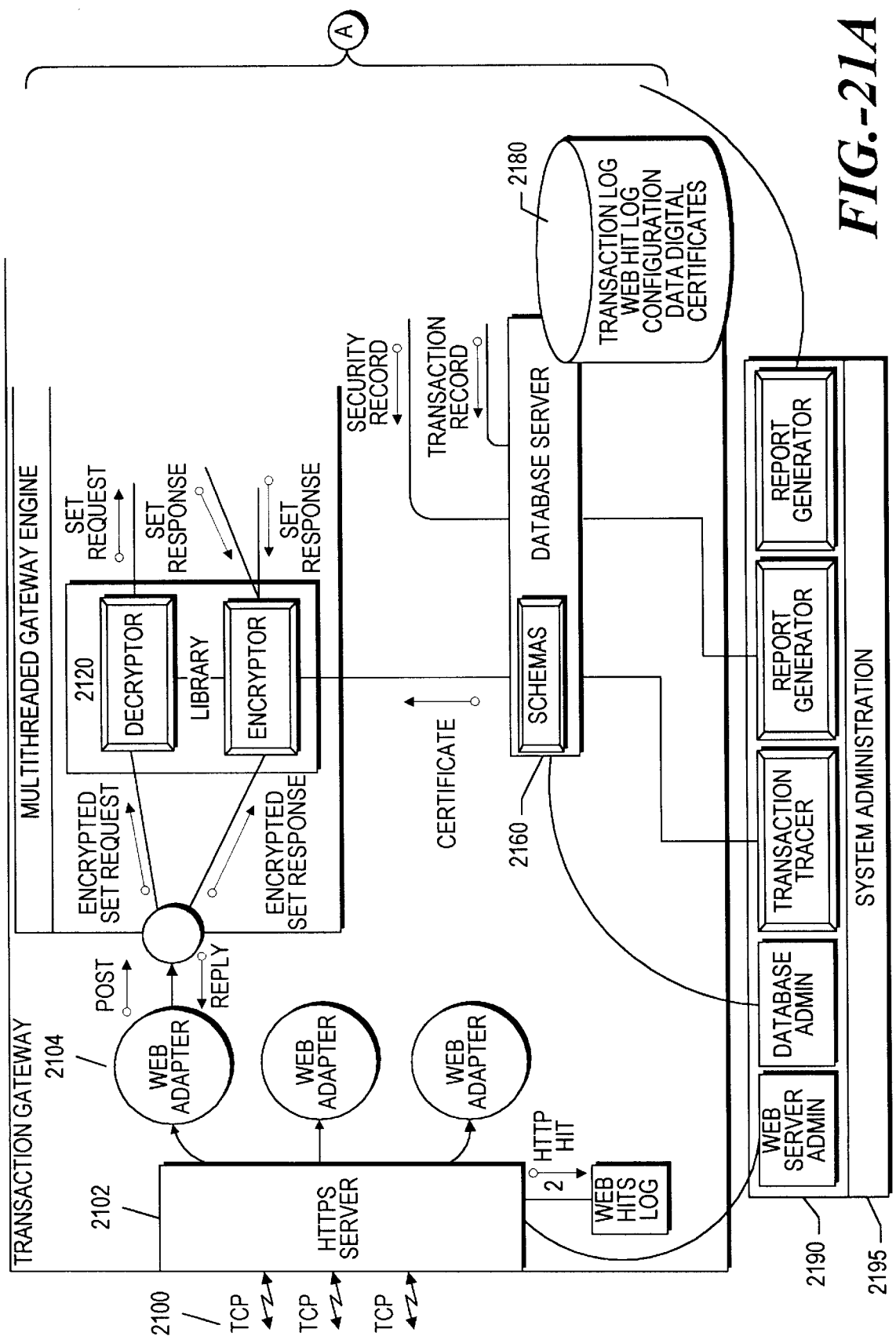
FIG. 21 is a detailed diagram of a multithreaded gateway engine in accordance with a preferred embodiment.
Figure 21B:
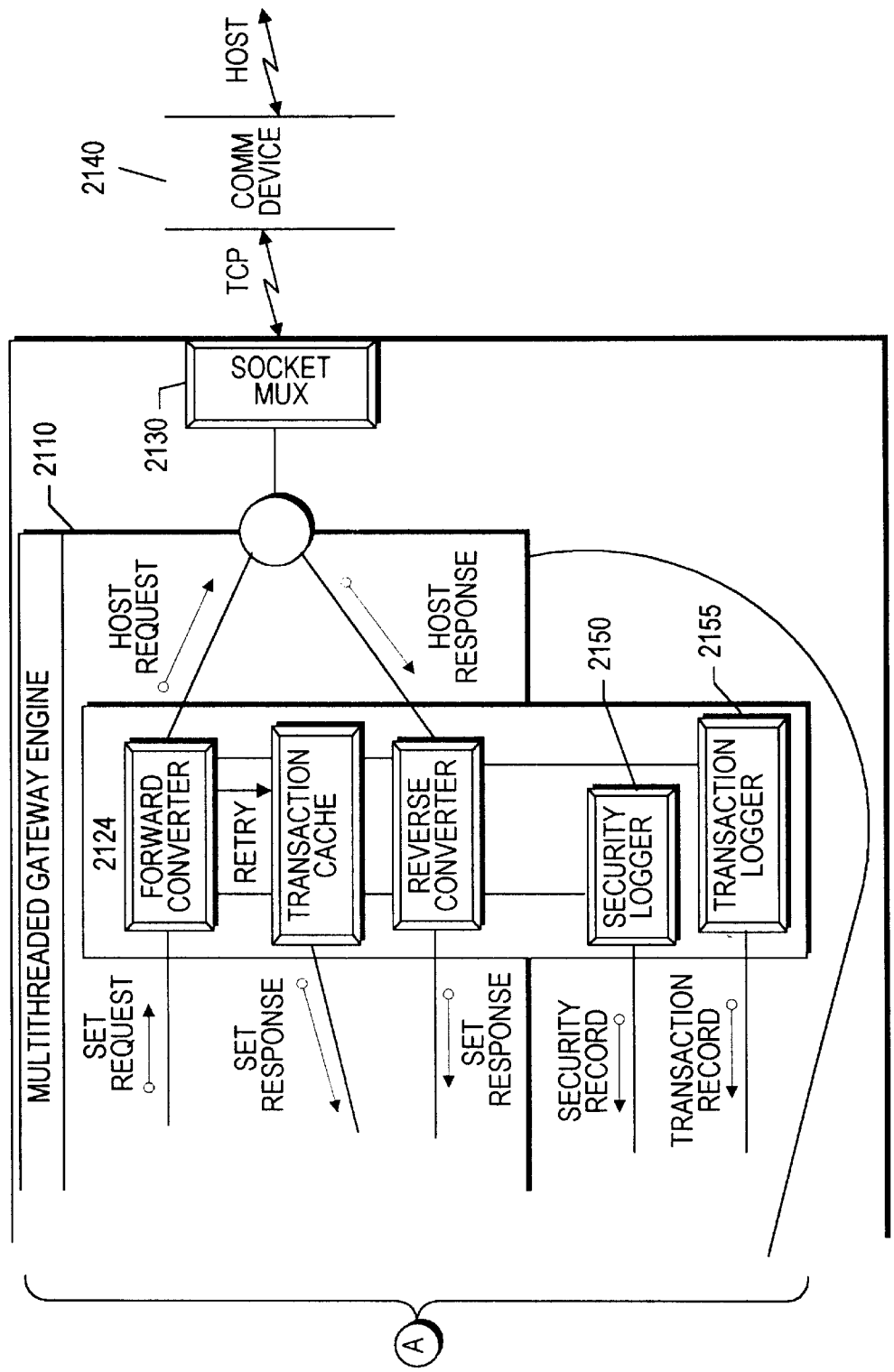

FIG. 21 is a detailed diagram of a multithreaded gateway engine in accordance with a preferred embodiment. Processing commences when a TCP transaction 2100 is received by a HTTPS Server 2102 and parsed to an appropriate Web Adaptor 2104 which posts an encrypted set transaction to the multithreaded gateway engine 2110. The encrypted SET request is received at a decryptor 2120 and decrypted into a standard SET transaction for converting by the forward converter 2124. The converted transaction is passed to the socket multiplexor 2130 to communicate via an existing communication link 2140 to a host computer. A security logger 2150 is also utilized for passing security records back via a database server 2160 to a database administration application 2190. A transaction logger 2155 also utilizes the database server 2160 to capture transaction logs in a database 2180. Other system administration tasks 2195 include a web server administration task 2190 which logs web hits in a log 2170.

FIG. 22 is a flow diagram in accordance with a preferred embodiment. Processing flows from customers 2200 that are paying for products over the internet or other communication medium utilizing HTTPS or other protocols to one or more merchants 2210, 2220 or 2230 to a gateway 2240 which directs transactions to a particular host processor 2250 for authorization processing in accordance with the present invention.

Internet Payment Authorization

The Gateway is a secure computer system that mediates transactions between the merchants' servers and a payment processor. The Gateway supports secure communications between merchants using the Internet on one side, and a processor using standard secure financial networks on the other side. Between the two interfaces, the Gateway maintains a detailed log of all transactions, whether in-progress, completed, or failed. The Gateway accepts transactions from merchants and converts them to Internet compatible formats before forwarding them to the host processor. Responses from the host, after the reverse conversions, will be returned to the originating merchants.

The Gateway performs many functions, including:

Receives encrypted credit card transactions from the merchants via the Internet

Unwraps and decrypts transactions

Authenticates digital signatures of transactions based on certificates

Supports all transaction types and card types

Accepts concurrent transactions from each of the merchant servers

Figure 23:
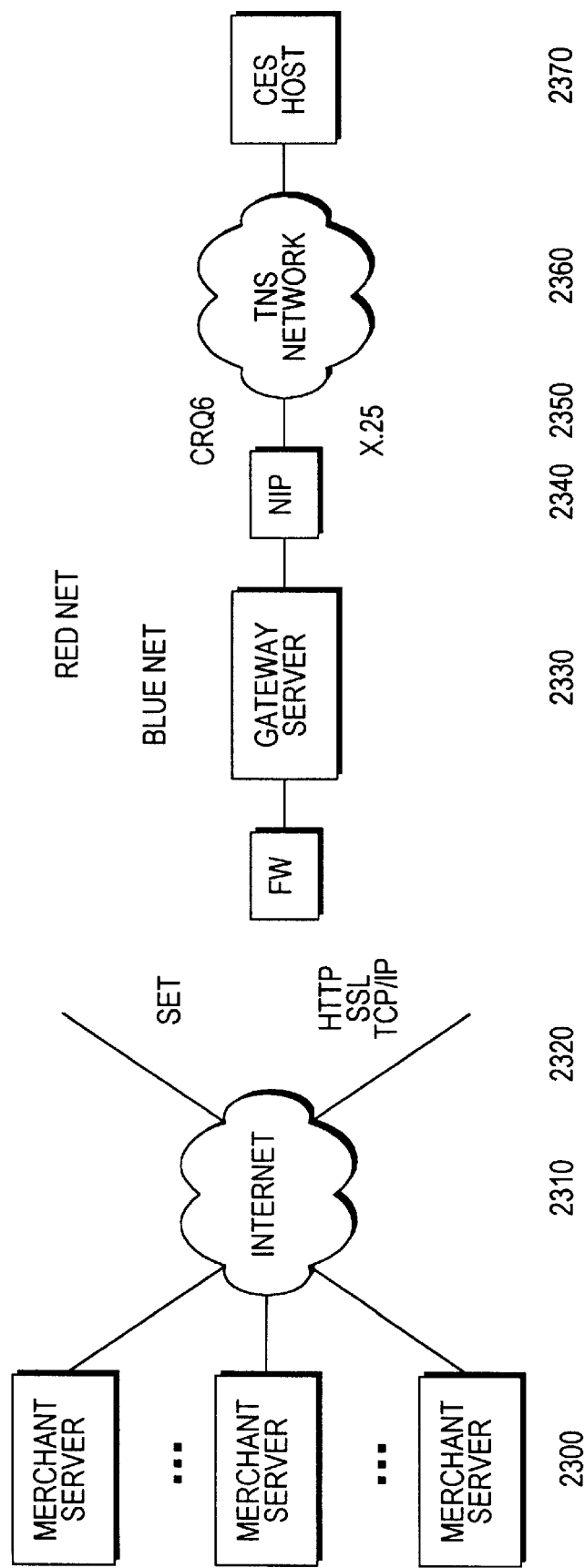
FIG. 23 illustrates a Gateway's role in a network in accordance with a preferred embodiment.

Converts transaction data to internet formats; forwards the mapped requests (in the clear) to a payment processor Converts transaction responses, correlates them with the original requests, and sends the mapped responses back to the merchants Provides logging, monitoring, reporting, and system administration FIG. 23 illustrates a Gateway's 2330 role in a network in accordance with a preferred embodiment. The Gateway 2330 strictly conforms to all SET stipulations regarding certificate management, PKCS signed data encapsulation, PKCS encrypted data encapsulation, ASN.1 representation, DER encoding, MIME encapsulation, and message sequencing. A merchant server 2300 communicates via the Internet 2310 using the SET protocol 2320 through a gateway server 2330 using a network interface processor 2340 to communicate to a legacy network 2360 in, for example the X.25 protocol 2350. The legacy host 2370 ultimately receives and processes the transaction from the merchant server 2300 without modification to its code.

Internet Communication Protocols

As discussed above, the TCP/IP protocol suite is utilized at the transport level. At the application level, in compliance with SET, all requests arrive at the Gateway in HTTP format. Similarly, all responses from the Gateway to the merchant servers will be transferred in HTTP. The HTTP protocol stipulates that a request-response pair will go through the same TCP connection and that the originator, in this case a merchant server, will establish a connection to send the request and will take down the connection when it has received the response.

Host Payment Protocols

Message conversions performed by the Gateway will be significantly more than format transliterations: per-protocol differences in data elements and message semantics must be considered carefully. The various transaction types that are supported are listed below.

| Transaction Types |
| --- |
| Credit card sale with capture |
| Credit card sale without capture |
| Credit card sale with capture including AVS (MasterCard and VISA) |
| Credit card sale without capture including AVS (MasterCard and VISA) |
| Credit card return (Credit) |
| Credit card post authorization (Force Post) |
| Credit card post authorization (Force Post) with partial reversal support, enhanced authorization data, and AVS result code (VISA) |
| Credit card sale with capture - Void |
| Credit card return (Credit) - Void |
| Totals request (for balancing) |

Host Communications Protocols

A virtual, private network between the Gateway and the host processor is established to expedite host communication. In addition, two Network Interface Processors (NIP)s—a "near end" NIP that interfaces to the Gateway and a "far end" NIP that interfaces to the host. The NIPs will handle virtual connections between themselves. The far-end NIP will take care of specific communication details. The near-end NIP is an IP-addressable device that converts between TCP messages and packets. It is installed on the Red Net 2330, which is a LAN outside the corporate firewall. The Gateway, on the Blue Net 2330, utilizes TCP/IP 2320 to communicate with the near-end NIP.

GATEWAY FEATURES

Because the Gateway must sustain reliable operations and enable graceful evolution, it is designed with some important attributes, including: Security, Availability, Performance, Scalability, and Manageability.

Security
Channel Security

At the application level, SET provides signed and encrypted data encapsulations of payment information portions of the transaction messages. Transport-level encryption of the entire message packet is required for additional security. The HTTPS protocol—i.e., HTTP over SSL 3.0—is utilized between the merchants and the Gateway. The virtual connections between the near-end NIP and the host are part of a private network. The termination will occur outside the firewall. Data between the Gateway and the host is sent in the clear with no encryption. In this network configuration, a transaction between a merchant's VPOS and the host will cross the firewall four times: SET request from VPOS to Gateway, legacy request from Gateway to NIP, LEGACY response from NIP back to Gateway, and SET response from Gateway back to VPOS.

Certificate Management
Payment Protocol Certificates

The Gateway uses certificates to authenticate the two parties involved in each MOSET transaction. Through a Certificate Authority, one certificate is issued for the Gateway and one certificate for each of the merchant servers.

Secure Channel Certificates

SSL will require separate certificates for the Gateway and the merchants.

Availability

Site redundancy and location redundancy allows the Gateway to sustain service through virtually instantaneous recovery from internal failures or external disasters that cause physical damages to the system. Minimum- outage recovery is possible with redundant configurations of important components.

Site Redundancy

The Gateway supports connections to a proprietary bank network and supports mirrored disk arrays.

Location Redundancy

The Gateway architecture supports location redundancy where a secondary remote system is connected to the primary system via dedicated WAN links for software-driven database duplication.

Scalability

The Gateway software architecture, the choice of third-party software components, and the selection of hardware platforms enable the system to gracefully adapt and evolve to take on new demands in different dimensions.

The Gateway resides on an HP 9000 that is housed in a standard 19" EIA rack.

| Gateway Hardware Configuration |
| --- |
| Server Hardware Description |

K-Class SMP Server - Model K420 - Standard Configuration

120 MHz PA-RISC 7200 CPU
128 MB ECC RAM
Built-in I/O includes Fast/Wide/Differential SCSI-2, EtherTwist
802.3 LAN, AUI, RS-232C Connectors, Centronics Parallel Port, and Internal Modem
650 MB CD-ROM Drive
HP-UX 10.10 Operating System (with two-user license)
4 HP-PB Slots
Additions

| | |
| --- | --- |
| 1 | SCSI-2 Disk Controller to support disk mirroring over dual SCSI-2 buses |
| 1 | 2 GB Internal SCSI-2 Disk Drive, 20 MB/s transfer rate, not mirrored for systems software and swap space |
| 1 | 4 GB External High-Availability Disk Arrays for databases - total of 4 x 2 MB modules required |
| 1 | 4 GB DAT drive with data compression |
| 1 | HP-PB Slot Expansion Option provides 4 additional HP-PB slots for peripheral controllers |
| 2 | FDDI interface cards (each card uses 2 HP-PB slots) |
| 1 | Option for eight-user license for HP-UX |

Cryptographic Hardware

Figure 24:
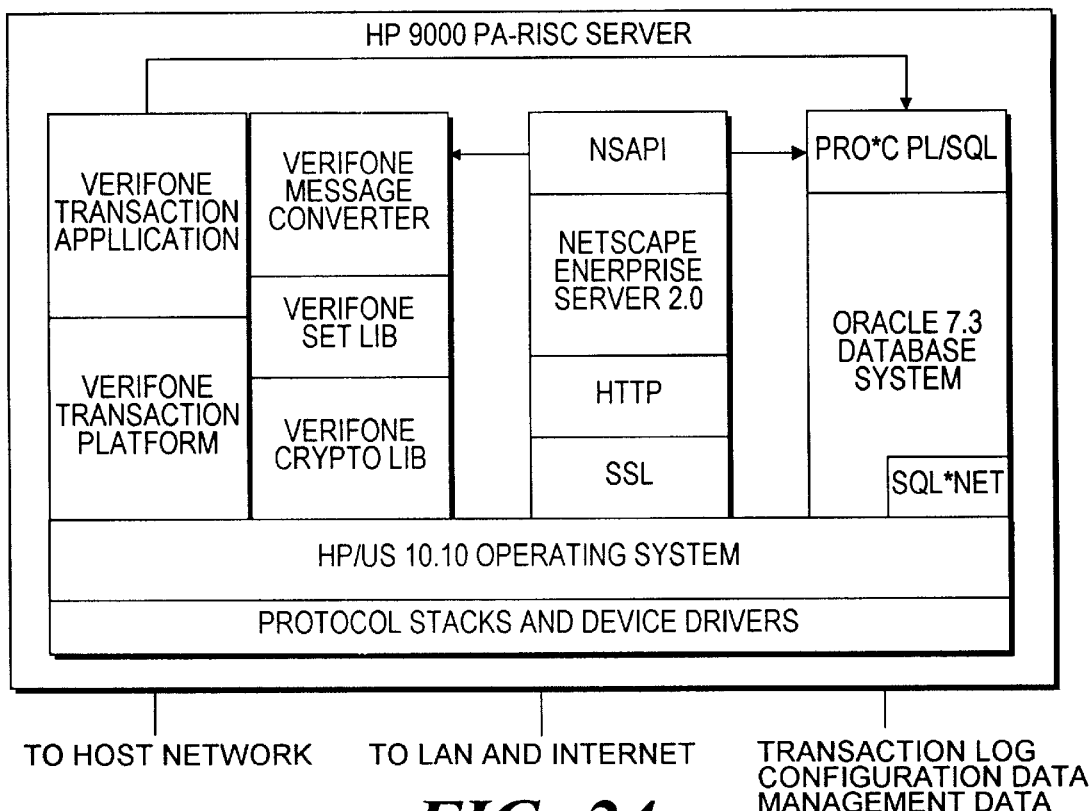
FIG. 24 is a block diagram of the Gateway in accordance with a preferred embodiment.

The encryption and decryption algorithms used in processing SET/SSL messages require significant computational power. A "security processor" is deployed with the Gateway to boost the performance of cryptographic algorithms. The processor is a networked peripheral device to the HP 9000 server. It provides cryptographic services suitable for SET/ SSL processing, and its services are accessible via calls to software libraries running on HP-UX. FIG. 24 is a block diagram of the Gateway in accordance with a preferred embodiment.

Gateway Architecture

Operating System Software

The Gateway runs under the HP-UX Version 10.10 operating system and is upgraded to support future significant system releases. HP-UX 10.10 conforms to major standards, including:

X/Open UNIX 95 (conforming with the Single UNIX Specification, SPEC 1170)

X/Open Portability Guide Issue 4 Base Profile (XPG4) OSF AES

IEEE POSIX 1003.1 and 1003.2

AT&T System V Interface Definition (SVID3 base and kernel extensions subset) Level 1 API support UC Berkeley Software Distribution 4.3 (BSD 4.3) including such features as job control, fast file system, symbolic links, long file names, and the C shell System V.4 File System Directory Layout This compliance with various software standards assures that while a preferred embodiment of the invention is disclosed in association with a best mode of practicing the invention other similar software and hardware environments can be readily substituted without undue experimentation.

Relational Database Management System (RDBMS) Software

The Gateway uses Oracle7 Server version 7.3 as the RDMBS and will be upgraded to use future significant system releases. The multi-threaded, multi-server architecture of Oracle7 provides applications with scalability to high-volume transaction workloads. When deployed with the HP 9000 K-Class platform, Oracle7 performs a symmetrically parallel database operation across all available processors. In addition, Oracle7 includes options for creating high-availability systems:

The Oracle7 Parallel Server option extends the reliability of applications by transparently harnessing the power of clustered computers in a single logical processing complex that can tolerate individual machine failures.

Oracle7 Symmetric Replication provides high data availability. Data can be replicated from the primary system to one or more alternative sites.

HTTP Server

The Gateway utilizes Netscape's Enterprise Server 2.0 as the HTTP server. The server is designed for large-scale Internet commerce deployment, Enterprise Server 2.0 achieves performance and reliability with such features as optimized caching, SMP support, enhanced memory management, and SNMP-based performance monitoring. Efficient process management features minimize system load and increase server reliability. Security features are provided using the SSL 3.0 protocol.

Protocol Stacks

Internet and LAN—The TCP/IP protocol stack will be provided as part of the HP-UX operating system.

Other Application-Level Protocols

Application-level protocols enable client-server interoperability. Each of the following protocols are transported using TCP or UDP.

HTML

HTML will be used to define screens for Gateway system administration.

HTTP

The HTTP layer is part of Enterprise Server 2.0. The server is administered with a Web browser.

SQL*Net

The Gateway's Oracle7 database can be accessed by administration clients using SQL*Net. Administration software can establish database connectivity to retrieve data for generating transaction reports.

SNMP

Enterprise Server 2.0 can be monitored using SNMP. The Gateway utilizes SNMP for remote system management.

Transaction Performance Monitoring and Measurement

The "hits" performance indicators are available from the Web server. Statistics can be generated at any time to highlight the load pattern or to pinpoint the time when the server was most active.

Gateway statistics about transaction requests (by transaction type) and transaction results (e.g., success, failed due to host, failed due to authentication, etc.) can be determined at any time for a particular time interval by generating a report.

The Gateway is upgradeable to interoperate with a real-time event monitoring system such as OpenVision's Performance Manager.

Basic Request/Response Mappings

The following table shows the basic request/response mapping between the SET protocol and the LEGACY protocol.

| SET Request/Response Pair | LEGACY Request/Response Pair and Transaction Code |
| --- | --- |
| AuthReq, AuthRes | LEG/CTR (05) |
| AuthRevReq, AuthRevRes | not supported |
| CapReq, CapRes | LEG/CTR (42 or 44) |
| CapRevReq, CapRevRes | LEG/CTR (41) |
| CredReq, CredRes | LEG/CTR (40) |
| CredRevReq, CredRevRes | not supported |
| BalReq, BalRes | CTA/CTL (48) |

Detailed Message Field Mappings

The following sections map the fields in LEGACY messages to fields in SET messages. The names of the SET fields are the names used in the SET ASN.1 specification. The full scope of the SET fields is listed in order to remove any ambiguity (but does not necessarily reflect actual naming conventions in source code).

| LEGACY - Authorization Request Record (LEG) | |
| --- | --- |
| LEGACY - Authorization Request Record | Place in SET request to get LEGACY request data |
| (a) Host Processing Address | hard-coded at Gateway to "VERI" |
| (b) Record Type | hard-coded at Gateway to "LEG" |
| (c) Control | hard-coded at Gateway to "6" |
| (d) Originating Merchant Number | from Merchant Certificate in unwrapped SET request |
| (e) Sequence Number | generated at Gateway |
| (f) Original Sequence Number | generated at Gateway |
| (g) Date and Time of Original Transaction | |
| 05 - CC Authorization Request | AuthReq. AuthReqDate |
| 40 - CC Capture Credit | CredReq. CredDate |
| 41 - CC Capture Void | CapRevReq. CapRevDate |
| 42 - CC Capture Post (non AVS) | CapReq. CapDate |
| 44 - CC Capture Post (AVS) | CapReq. CapDate |
| 76 - CC Authorization Reversal | This transaction code will not be used. |
| (h) Device ID - part 1 | hard-coded at Gateway to binary zeros. |

| LEGACY - Authorization Request Record (LEG) | |
|---|---|
| LEGACY - Authorization Request Record | Place in SET request to get LEGACY request data |
| (i) Device ID - part 2 | The Terminal-id generated by Merchant System and delivered to the Gateway software as a result of decoding the SET request |
| (j) Transaction Code | |
| 05 - CC Authorization Request | AuthReq. received |
| 40 - CC Capture Credit | CredReq received |
| 41 - CC Capture Void | CapRevReq received |
| 42 - CC Capture Post (non AVS) | CapReq received (if CapReq. RespData. AVSResult is blank) |
| 44 - CC Capture Post (AVS) | CapReq received (if CapReq. RespData. AVSResult is non-blank) |
| 76 - CC Authorization Reversal | This transaction code will not be used. |
| (k) Alphabetic Card Issuer Code | computed at Gateway from PAN |
| 05 - CC Authorization Request | AuthReq. PI. PANData. PAN |
| 40 - CC Capture Credit | CredReq. RespData. CapToken. TokenOpaque. PAN |
| 41 - CC Capture Void | CapRevReq. RespData. CapToken. TokenOpaque. PAN |
| 42 - CC Capture Post (non AVS) | CapReq. RespData. CapToken. TokenOpaque. PAN |
| 44 - CC Capture Post (AVS) | CapReq. RespData. CapToken. TokenOpaque. PAN |
| 76 - CC Authorization Reversal | This transaction code will not be used. |
| (l) Authorization Amount | |
| 05 - CC Authorization Request | AuthReq. AuthReqAmt |
| 40 - CC Capture Credit | CredReq. CredReqAmt (could be different than CapToken) |
| 41 - CC Capture Void | CapRevReq. CapRevAmt |
| 42 - CC Capture Post (non AVS) | CapReq. CapReqAmt |
| 44 - CC Capture Post (AVS) | CapReq. CapReqAmt |
| 76 - CC Authorization Reversal | This transaction code will not be used. |
| (m) Cash Back Amount | hard-coded to "00000000" (EBCDIC) |
| (n) Card or Driver's License Data | |
| 05 - CC Authorization Request | AuthReq. PI. PANData. PAN AuthReq. PI. PANData. CardExpiration |
| Account Number Expiry Date | |
| 40 - CC Capture Credit Account Number Expiry Date | CredReq. RespData. CapToken. TokenOpaque. PI. PAN CredReq. RespData. CapToken. TokenOpaque. PI. CardExp |
| 41 - CC Capture Void Account Number Expiry Date | CapRevReq. RespData. CapToken. TokenOpaque. PI. PAN CapRevReq. RespData. CapToken. TokenOpaque. PI. CardExp |
| 42/44 - CC Capture Post (non AVS or AVS) Account Number Expiry Date | CapReq. RespData. CapToken. TokenOpaque. PI. PAN CapReq. RespData. CapToken. TokenOpaque. PI. CardExp |
| 76 - CC Authorization Reversal | This transaction code will not be used. |
| (o) Additional Data | |
| 05 - CC Authorization Request ZIP Code | AuthReq. AVSData. ZIPCode (if VISA Card) blank (if non VISA Card) |
| 40 - CC Capture Credit | CredReq. RespData. LogRefID |
| WFB Reference Number | |
| 41 - CC Capture Void | CapRevReq. RespData. LogRefID |

| LEGACY - Authorization Request Record (LEG) | |
|---|---|
| LEGACY - Authorization Request Record | Place in SET request to get LEGACY request data |
| WFB Reference Number | |
| 42 - CC Capture Post Authorization Code | CapReq. RespData. AuthCode |
| 44 - CC Capture Post AVS | CapReq. RespData. CapToken. TokenOpaque. CPSAciFlag |
| (p) CPS ACI Flag | CapReq. RespData. CapToken. TokenOpaque. CPSTransId |
| (q) CPS Transaction ID | CapReq. RespData. CapToken. TokenOpaque. CPSValCode |
| (r) CPS Validation Code | CapReq. RespData. CapToken. TokenOpaque. VisaRespCode |
| (s) Visa Response Code | CapReq. RespData. CapToken. TokenOpaque. MerchantCatCode |
| (t) Merchant Category Code | CapReq. RespData. CapToken. TokenOpaque. EntryMode |
| (u) Entry Mode | |
| (v) Original Authorization Amount | CapReq. RespData. CapToken. AuthAmt CapReq. RespData. AVSResult |
| (w) AVS Result Code | CapReq. RespData. AuthCode |
| (x) Authorization Code | |
| 76 - CC Authorization Reversal | This transaction will not be used. |

LEGACY—Authorization Request Response (CTR)

The field Settlement Date is returned by the host in a LEGACY Authorization Request Response (when a transaction is force posted). This Settlement Date field contains the day that a posted transaction will be settled between the Merchant and the Acquiring Bank. Since WFB wishes that this date be made available to the Merchant for the purposes of financial record keeping this field must be returned to VPOS.

This field is not currently returned in any SET response message. The Payment Protocols Team must make a recommendation on how this data is to be returned by the Gateway to VPOS.

| LEGACY - Authorization Request Response | Place in SET response to put LEGACY data returned from host |
|---|---|
| (a) Host Processing Address | echoed by host, not included in SET response |
| (b) Record Type | echoed by host, not included in SET response |
| (c) Control | echoed by host, not included in SET response |
| (d) Settlement Date | TBD by Payment Protocols Team |
| (e) Sequence Number | echoed by host, not included in SET response |
| (f) Original Sequence Number | echoed by host, not included in SET response |
| (g) Account Indicator | not included in SET response |
| (h) Device ID - part 1 | echoed by host, not included in SET response |
| (i) Device ID - part 2 | echoed by host, included in SET response in a location to be determined by the Payment Protocols Team. The value echoed is the terminal-id as delivered in the SET request. |
| (j) Action Code | The Action code returned in the LEGACY response will be combined with the Error Code (if present) and translated to a canonical list of error codes. See section O |

-continued

| | |
|---|---|
| LEGACY - Authorization Request Response | Place in SET response to put LEGACY data returned from host |
| (k) Transaction Code | for exactly where this canonical error code will be returned for each transaction type. echoed by host, not included in SET response |
| (l) Authorization Amount | |
| 05 - CC Authorization Request | AuthResPayload . AuthAmt (if SalesInd = False) SalesResPayload . CapAmt (if SalesInd = True) |
| 40 - CC Capture Credit | CredRes . CredResSeq . CredResItem . CredActualAmt |
| 41 - CC Capture Void | CapRevRes . CapRevSeq. CapRevResItem . CaptureAmt |
| 42 - CC Capture Post (non AVS) | CapRes . CapRevSeq . CapResItem . CapResultPayload . CapAmt |
| 44 - CC Capture Post (AVS) | CapRes . CapRevSeq . CapResItem . CapResultPayload . CapAmt |
| 76 - CC Authorization Reversal | This transaction code will not be used. |
| (m) Authorization Code | |
| 05 - CC Authorization Request | AuthResorSale . RespData . AuthCode (if SalesInd = False) AuthResorSale . RespData . AuthCode (if SalesInd = True) |
| (n) AVS Result Code | AuthResorSale . RespData . AVSResult |
| (o) Reference Number AVS Result Data only received if transcode = 05 and VISA and approved but not captured | AuthResorSale . RespData . LOGRefId |
| (p) CPS ACI Flag | AuthResorSale . RespData . CapToken . TokenOpaque . CPSAciFlag |
| (q) CPS Transaction Id | AuthResorSale . RespData . CapToken . TokenOpaque . CPSTransId |
| (r) CPS Validation Code | AuthResorSale . RespData . CapToken . TokenOpaque . CPSValCode |
| (s) Visa Response Code | AuthResorSale . RespData . CapToken . TokenOpaque . VisaRespCode |
| (t) Merchant Category Code | AuthResorSale . RespData . CapToken . TokenOpaque . MerchantCatCode |
| (u) Entry Mode | AuthResorSale . RespData . CapToken . TokenOpaque . EntryMode |

Error Code Location in SET response messages

The following table shows the explicit SET field in which the canonical error code will be returned in SET response messages.

| SET Response Message | Location of Canonical Error Code |
|---|---|
| AuthRes | AuthResorSale . RespData . RespCode (if SalesInd = False) AuthResorSale . RespData . RespCode (if SalesInd = True) |
| AuthRevRes | AuthRev will not be supported by the Gateway |
| CapRes | CapRes . CapResSeq . CapResItem . CapCode |
| CapRevRes | CapRevRes . CapRevResSeq . DraftCaptureStatus |
| CredRes | CredRes . CredResSeq . CredResItem . CredCode |
| CredRevRes | CredRev will not be supported by the Gateway |
| BalRes | to be defined by Payment Protocols Team |

Error Code Values in SET response messages

The following table itemizes the proposed mapping of LEGACY specific action codes and error code pairs to the canonical error codes that will be sent in the SET response messages.

The canonical error response code values and descriptions were taken directly from "ISO 8583: 1987 section 4.3.8 Table 7".

VeriFone Proprietary SET Extensions

The SET protocol currently has no provisions to support "Balance Inquiry" requests. Balance Inquiry requests are used by the Merchant to query its Acquiring Bank as to various totals for the current days or past days transaction totals.

The following two sections detail a proposed mapping between the LEGACY protocol and two new VeriFone proprietary SET extensions: BalInq (Balance Inquiry) and BalRes (Balance Response). The BalInq request is used by VPOS to query the Gateway as to the transaction totals and BalRes is the response sent by the Gateway to VPOS.

| LEGACY - Administrative Inquiry Record | Place in SET request to get LEGACY request data |
|---|---|
| (a) Host Processing Address | hard-coded at Gateway to "VERI" |
| (b) Record Type | hard-coded at Gateway to "LEG" |
| (c) Control | hard-coded at Gateway to "ACY" |
| (d) Merchant Number | from Merchant Certificate in unwrapped SET request |
| (e) Device ID - part 1 | hard-coded at Gateway to null-data |
| (f) Device ID - part 2 | The Terminal-id generated by the Merchant System and delivered to the Gateway as a result of decoding the SET request. |
| (g) Date and Time of Inquiry | BalReq . InquiryTime |
| (h) Sequence Number | generated at Gateway |
| (i) Transaction Code | hard-coded at Gateway to "48" |
| (j) Feedback Level | |
| 10 - Totals online and offline for the Merchant 20 - Totals online and offline for the Chain | BalReq . FeedbackLevel |
| (k) Feedback Day | |
| 0 - Today 1 - Yesterday 2 - Two Days Back 3 - Three Days Back | BalReq . FeedbackDay |
| (l) Feedback Type | |
| 00 - All combined Visa and MasterCard Sales 10 - MasterCard Net Totals 20 - Visa Net Totals 40 - Discover Totals 50 - Amex Totals | BalReq . Feedback Type |
| (m) Feedback ID | |
| Level 10:7 Digit Merchant Level 20:5 Digit Chain | BalReq . FeebackId |

| LEGACY - Administrative Response Record | Place in SET response to put LEGACY data returned from host |
|---|---|
| (a) Host Processing Address | echoed by host, not included in SET response |
| (b) Record Type | echoed by host, not included in SET response |
| (c) Control | echoed by host, not included in SET response |
| (d) Settlement Date | BalRes . SettlementDate |
| (e) Sequence Number | echoed by host, not included in SET response |

-continued

| LEGACY - Administrative Response Record | Place in SET response to put LEGACY data returned from host |
|---|---|
| (f) Device ID - part 1 | echoed by host, not included in SET response |
| (g) Device ID - part 2 | The Terminal-id generated by the Merchant System and delivered to Gateway as a result of decoding the SET request. |
| (h) Action Code (O,D, or E) | used to determine Error Code below |
| (i) Transaction Code | echoed by host, not included in SET response |
| Additional Data | |
| (j) Error Code | BalRes . BalInqResCode (see section O) |
| (k) Total Item Count | BalRes . TotalItemCount |
| (l) Total Sales Amount (Credit Card) | BalRes . TotalCCSalesAmount |
| | BalRes . TotalSalesItemCount |
| (m) Totals Sales Item Count | BalRes . TotalCCCreditsAmount |
| (n) Total Credits Amount (Credit Card) | BalRes . TotalCCCreditsItemCount |
| (o) Total Credits Item Count (Credit Card) | |

Gateway Analysis for SET Message Handling

This section tackles general design considerations of the Gateway software and is not limited to LEGACY (unless specifically mentioned). The complete functional behavior of the Gateway will be described in a separate document.

Replay Attack Handling

A replay attack at the Gateway is a request where either:
a) the request is stale; the request was received "too late" with respect to the reqdate in the request. This window is specified by a configurable Gateway policy.
b) the request is not stale but the exact rrpid (Request/Response Pair Id) has already been seen before in a request and still logged in the Gateway database. The <xid, mid, rrpid> tuple will be the primary key that determine whether a request had already been received. This will allow the possibility of the same rrpid to be generated from the same merchant but for a xid and also allow the same rrpid to be generated by a totally different merchant.

New Attempt vs. Retry Attempt

It is possible that messages sent between the VPOS and Gateway may be lost in transit. This could happen either because of hardware/software problems in the Internet or for hardware/software reasons local to the Gateway or Merchant System.

The question is then "How does a Gateway recognize an honest retry attempt from an initiator?" First a little background into the nature of a SET request. All SET requests have the following fields:

| xid | merchant's transaction id |
|---|---|
| mid | merchant id (contained in certificate) |
| tid | terminal id (from Merchant System) |
| rrpid | request response pair id |
| reqdate | request date (from Merchant System) |
| reqdata | request specific data |

Let the following tuple represent a generic SET request:
<xid, mid, tid, rrpid, reqdate, reqdata>

The merchant establishes the xid during the shopping phase with the consumer. The same xid is used for both the AuthReq and the CapReq and subsequent CreditReq requests. Using the same xid for many requests makes it impossible for the Gateway to distinguish between repeated transactions vs. new transactions.

For example, how could a Gateway possibly determine whether two valid CredReq requests were to be interpreted as two individual credits or a retry of a single request.

request 1: $<xid_1, mid_m, tid_t, rrpid_1, reqdate_1, reqdata_1>$
  (perhaps a CredReq for $10.00)
request 2: $<xid_1, mid_m, tid_t, rrpid_2, reqdate_2, reqdata_1>$
  (perhaps a new CredReq for $10.00)

could also be interpreted as . . .

request 1: $<xid_1, mid_m, tid_t, rrpid_1, reqdate_1, reqdata_1>$
  (perhaps a CredReq for $10.00)
request 2: $<xid_1, mid_m, tid_t, rrpid_2, reqdate_2, reqdata_1>$
  (perhaps a retry of above)

The reqdates are different in both cases because the date is generated along with the rrpid to thwart replay attacks. In this example the Gateway will not be able to determine whether the second CreditReq should be performed or whether it is simply a retry to request 1 with $rrpid_1$. The Gateway must know whether or not to apply a new credit or to deliver a response that it may already have from the host (it may have came too late for the first attempt or have been lost on the way to VPOS). If no response was logged from the host for request 1, the Gateway could repeat its original request to the host when receiving request 2. In a sense, the Gateway will act as an intelligent request/response cache.

The Gateway splits the rrpid number space into two parts. One main part that will remain the same for the same request across all its retry attempts and a smaller portion to indicate the number of retry attempts. Then, rrpidRetryCount=rrpid MOD MAXRETRIES+1 (0 for initial request, >0 for a retry)

NOTE : The initial rrpids generated by VPOS software are equal to 0 MOD MAXRETRIES+1 and in subsequent retries the lower order digits are incremented by one for each retry attempt. This requires extra stored in the VPOS application. The VPOS software must persistently store the rrpid used (which contains the retry count of the transaction) so that repeated attempts will follow the correct semantics.

In general the Gateway will support the following logic [assuming the second request is fresh and not a replay attack]:
If two requests,
request 1: $<xid_1, mid_m, tid_t, rrpid_1, reqdate_1, reqdata_1>$
request 2: $<xid_1, mid_m, tid_t, rrpid_2, reqdate_2, reqdata_1>$
are received at $t_1$ and $t_2$ (where $t_2 > t_1$) and, $(rrpid_1 - (rrpid_1 \text{ MOD MAXRETRIES}+1)) = (rrpid_2 - (rrpid_2 \text{ MOD MAXRETRIES}+1))$ then the Gateway will interpret the second request as a retry request. But if, $(rrpid_1 - (rrpid_1 \text{ MOD100})) \neq (rrpid_2 - (rrpid_2 \text{ MOD MAXRETRIES}+1))$ then the Gateway will interpret the second request as a new request.

In addition to being able to distinguish between a retry and a new request, the proposed rrpid scheme can be used to determine how many VPOS requests got lost in the Internet. This is a useful value-added service for system management.

Robustness and Error Handling Issues

There are several robustness issues that need to addressed. The basic flow is that VPOS sends a request to the Gateway, the Gateway logs the SET key fields from the incoming attempt in the database. The Gateway then generates a host request which it logs completely in the database. The host handles the request and generates a response that is directed towards the Gateway which, when received is logged completely in the Gateway database. Finally the Gateway generates an SET response to VPOS, the contents of which is not logged in the database.

If the Gateway has not received the request or receives the request but is not able to log the request in the database it is easily handled by a VPOS retry attempt. This recovery action needs no further discussion. In general, if the VPOS does not receive a reply to a request it has sent to the Gateway it must retry persistently until a response is received. All retry attempts from VPOS for the same request must have the same base portion of the rrpid but a different value in the retry counter.

The Gateway must handle replay attacks as outlined previously in this document.

If the Gateway receives a request that it has already received from VPOS there could be several possible dispositions:

a) the request had already been handled completely with the host and a host response is in the Gateway database. In this case the Gateway can simply translate the host response to a SET response and send it to VPOS.

b) the request had been sent to the host before (as determined by a database field) but a response from the host is not on file. In this case the Gateway must retry the host request.

If the VPOS times-out for any reason, it must retry later using an rrpid that indicates a retry attempt. If the Gateway receives a late-response (after VPOS has given up) it simply logs it in the database for that retry attempt (if no retry attempt for the transaction is still outstanding at the host). There is a glare situation where the original response could arrive so late that it could be confused with the response from a currently outstanding retry attempt with the host. This situation is logged and the first response not sent back to VPOS.

A response from the host indicating a successful transaction may get lost on the way back to the Gateway or not be able to be logged in persistent storage in the Gateway. In either case VPOS is in a situation where the retry request when received by the host may result in a response from the host indicating that the request is a duplicate. The VPOS software must be able to handle this. In the LEGACY case when a duplicate post is received by the host the second one automatically causes the first one to void and the second transaction fails too. In this case VPOS should retry the transaction under a new rrpid. If the transaction goes through end-to-end all effects of the previous transactions will not matter.

TokenOpaque Contents

The Gateway requires information captured at the time of an AuthReq that must be repeated to the host at the time of the associated CapReq. The mechanism of choice (built into SET) for this is enabled utilizing this data in the TokenOpaque token of the CapToken which is sent in an AuthRes. This CapToken is stored at the Merchant system and represented to the Gateway at the time of the CapReq. The format of an TokenOpaque is an OctetString. The following general format (not specific to LEGACY) is proposed for capturing this information:

| Field Name | Field Data Type | Explanation/Example |
|---|---|---|
| VersionName | char(8) | e.g. "LEGACY" |
| VersionRevision | char(8) | e.g. "1.0" (generally <major, minor>) |
| PILength | integer | length of PI data |
| PI | unsigned char(PILength) | strongly encrypted |
| HostSpecDataLength | integer | length of host specific data |
| HostSpecData | unsigned char(HostSpecDataLength) | host specific data |

Host Specific Data (LEGACY-Only)

For "LEGACY" version "1.0", it is proposed that newline seperated "name=value" pairs be used to store the host specific data. A null character will terminate the host specific data. The following host specific data (name value pairs) will need to be included:

BrandID
    CPSACIFlag
    CPSTransactionId
    CPSValidationCode
    VisaResponseCode
    MerchantCategoryCode
EntryMode NOTE: PI contains PAN and ExpiryDate.

Proposal for AVS Data Encoding

The "Address Verification" data element for the "Address Verification Service" (AVS) is defined in SET as an IA5String. Each host may require different data to be sent to use the AVS feature. The Gateway will need to be able to extract the information from this to inter-work with the legacy systems. A well-defined format for this data is required, an IA5string blob is insufficient.

The following data structure is utilized to deliver the AVS data.\

StreetAddress1=800 El Camino Real\n
StreetAddress2=Suite 400\n
City=Menlo Park\n
StateProvince=CA\n
Country=USA\n
PostOfficeBox=\n
ZipPostalCode=94025\n
\n An empty line indicates the end of AVSData.

The detailed information that is available for the Address Verification Service depends on the Payment Window that captures the data from the consumer. The Merchant Systems Team defines the names that are used and the same names selected used globally.

AVS Data (LEGACY-Only)

For "LEGACY" version "1.0" only the ZipPostalCode name value pair is required. The Gateway will only use the first 5 characters of this value.

Transaction Replay Attacks

The processing of Internet-based payment transactions is a coordinated interaction between the Internet Transaction Gateway and the VPOS servers that is based on the following principles. A VPOS terminal, as the initiator of the payment transaction, is responsible for the round-trip logical closure of the transaction. VPOS will retry a transaction that has been initiated with the Gateway but where the response for the request was never received from the Gateway. A VPOS terminal selects—out of a pre-assigned range—a Terminal-Id that is to be used by the Gateway in a request to the host processor. This data element must be transported from the VPOS to the Gateway along with the payment-related information. The Terminal-Ids must be unique among the concurrent VPOS instances on a VPOS server system. However, the Terminal-Ids have no history. For example, a subsequent Force Post transaction need not use the same Terminal-Id as the original Authorization transaction. The VPOS will be responsible for making sure that only one request is outstanding for the same <Merchant-id, Terminal-id> data elements from a VPOS server system. The Gateway does not know that a response was successfully received by VPOS. This means that the VPOS must be responsible for initiating any retry attempts. The Gateway never initiates a retry attempt with the host processor without an explicit retry request from VPOS. The Gateway when asked to retry a request with the host, performs a relational database look-up and delivers a response that has already been received from the host processor but was previously missed by VPOS. This behavior of the Gateway is also known as the "transaction response cache." The Gateway will need to know that a VPOS request is a retry of something already sent. The prior request may or may not have been received. A solution for determining the difference between a retry attempt and a new request is described later in this document. VPOS must understand the "canonical" error codes that it will receive via the Gateway and be able to initiate the proper recovery action and/or generate the appropriate user-interface dialog.

Certificate Processing

Merchants require a mechanism for verifying legitimate cardholders is of valid, branded bankcard account numbers. A preferred embodiment utilizes technology to link a cardholder to a specific bankcard account number and reduce the incidence of fraud and thereby the overall cost of payment processing. Processing includes a mechanism that allows cardholder confirmation that a merchant has a relationship with a financial institution allowing it to accept bankcard payments. Cardholders must also be provided with a way to identify merchants they can securely conduct electronic commerce. Merchant authentication is ensured by the use of digital signatures and merchant certificates.

In a preferred embodiment, a holder of a payment instrument (cardholder) surfs the web (internet) for required items. This is typically accomplished by using a browser to view on-line catalog information on the merchant's World Wide Web page. However, order numbers can be selected from paper catalogs or a CD-ROM and entered manually into the system. This method allows a cardholder to select the items to be purchased either automatically or manually. Then, the cardholder is presented with an order form containing the list of items, their prices, and totals. The totals could include shipping, handling and taxes for example. The order form is delivered electronically from the merchant's server or created on the cardholder's computer by electronic shopping software. An alternative embodiment supports a negotiation for goods by presenting frequent shopper identification and information about a competitor's prices.

Once the price of goods sold and the means of payment has been selected, the merchant submits a completed order and the means for payment. The order and payment instructions are digitally signed by cardholders who possess certificates. The merchant then requests payment authorization from the cardholder's financial institution. Then, the merchant sends confirmation of the order, and eventually ships the goods or performs the requested services from the order. The merchant also requests payment from the cardholder's financial institution.

Figure 1C:
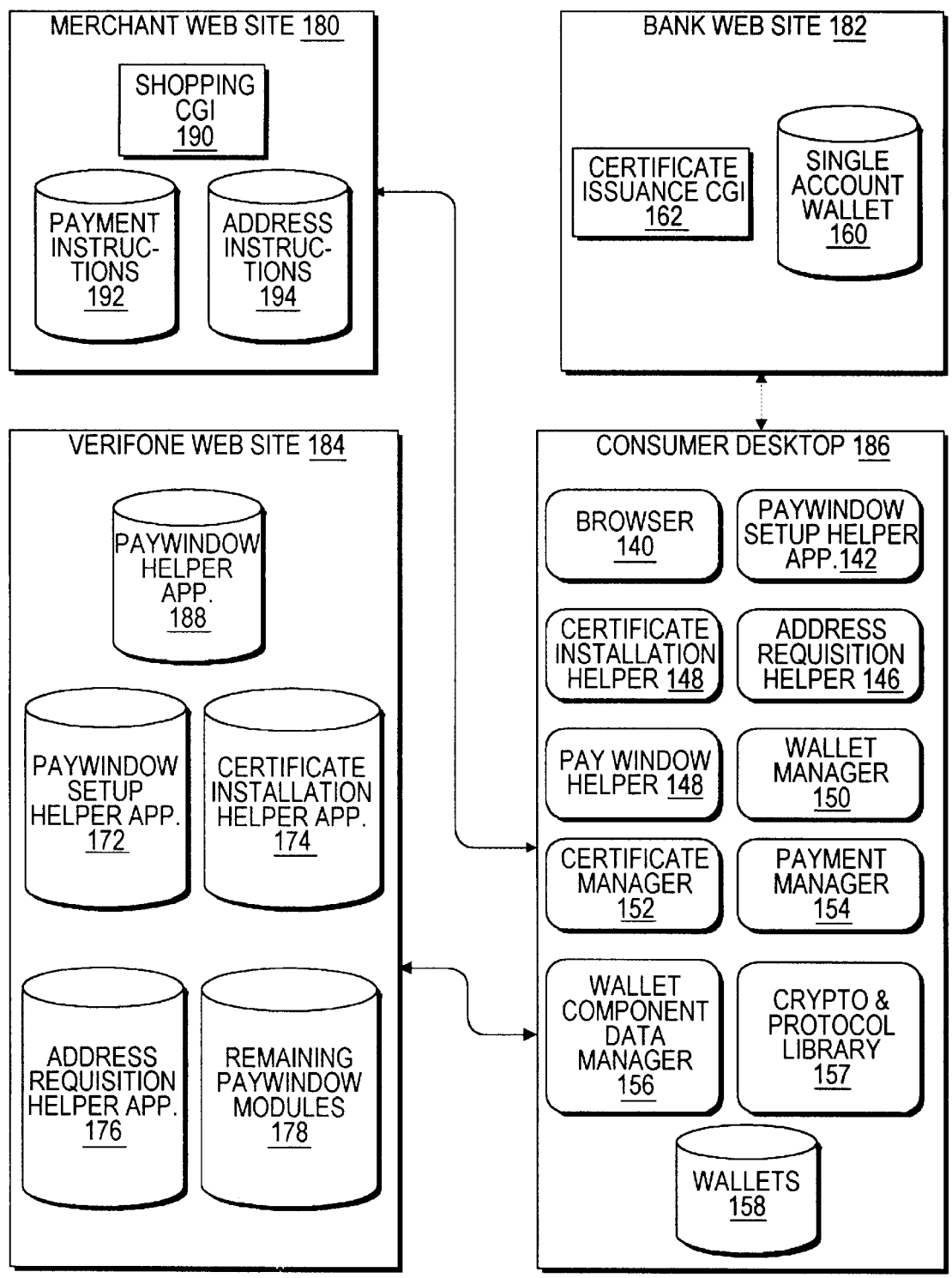
FIG. 1C is a block diagram of the system in accordance with a preferred embodiment.

FIG. 1C is a block diagram of a payment processing system in accordance with a preferred embodiment. The Certificate Issuance at the Bank Web Site 162 resides at the bank web site 182. It is utilized for issuing SET complaint/X.500 certificates to consumers. The implementation of this system may vary from one bank to another. However, the system gathers consumer's personal information, and after processing the information, the system issues a certificate along with a payment instrument to the consumer.

The Single Account Wallet 160 at the bank web site 182 represents the MIME message that is created by the Certificate Issuance system. This MIME message contains a VeriFone wallet. The VeriFone wallet contains a single payment instrument and the certificate associated with it. For security reasons, the private key is not included in the wallet. The has to specify a private key before using the instrument for payment. When the consumer is issued the certificate, this MIME message is sent to the browser. The browser launches the Certificate Installation application 174, 144 which is defined as a helper application in the browser. The Certificate Installation application 174, 144 reads the MIME message and install the wallet into the wallet database 158.

Various helper applications 188, 172, 174, 176 are provided to make the consumer's shopping experience easy and efficient including the following helper applications. The Paywindow helper application 188 is utilized by the consumer to authorize the payment to the merchant, to administer their wallets, to review their previously completed payment transactions and to perform housekeeping activities on the wallets. This application is defined as a 'helper' application on the consumer's desktop. The browser launches this application when the merchant system sends a MIME message requesting payment.

The PayWindow Setup Helper application 172 is used by the consumer to install helper applications and other modules from the web site onto the consumer desktop. When a consumer attempts to install an application for a first time, the consumer does not have a helper application on the desktop. Thus, the first time installation of an application requires a consumer to perform two steps. First the user must download the system package to their desktop and then the user must run setup to decompress and install the system. Thereafter, whenever the consumer gets a new release of system software, the browser launches this helper application which in turn installs the appropriate other system modules.

The Certificate Installation Helper Application 174 is utilized to install a wallet that is issued by a bank. When the bank's certificate issuance web system sends the MIME message containing the VeriFone wallet, the browser launches this application. This application queries a consumer to determine if the payment instrument contained in the wallet is to be copied to an existing wallet or to be kept in the new wallet. This application then installs the payment instrument and the certificate into the wallet database 158.

The Certificate Issuance CGI scripts 162 and the Single Account Wallet 160 at the Bank Web Site 182 is processed as described in the native system. The Certificate Installation Applet of the Bank Web Site 182 is utilized by the Certificate Issuance CGI scripts 162 system to deliver a consumer's certificate to the consumer's desktop.

Figure 26:
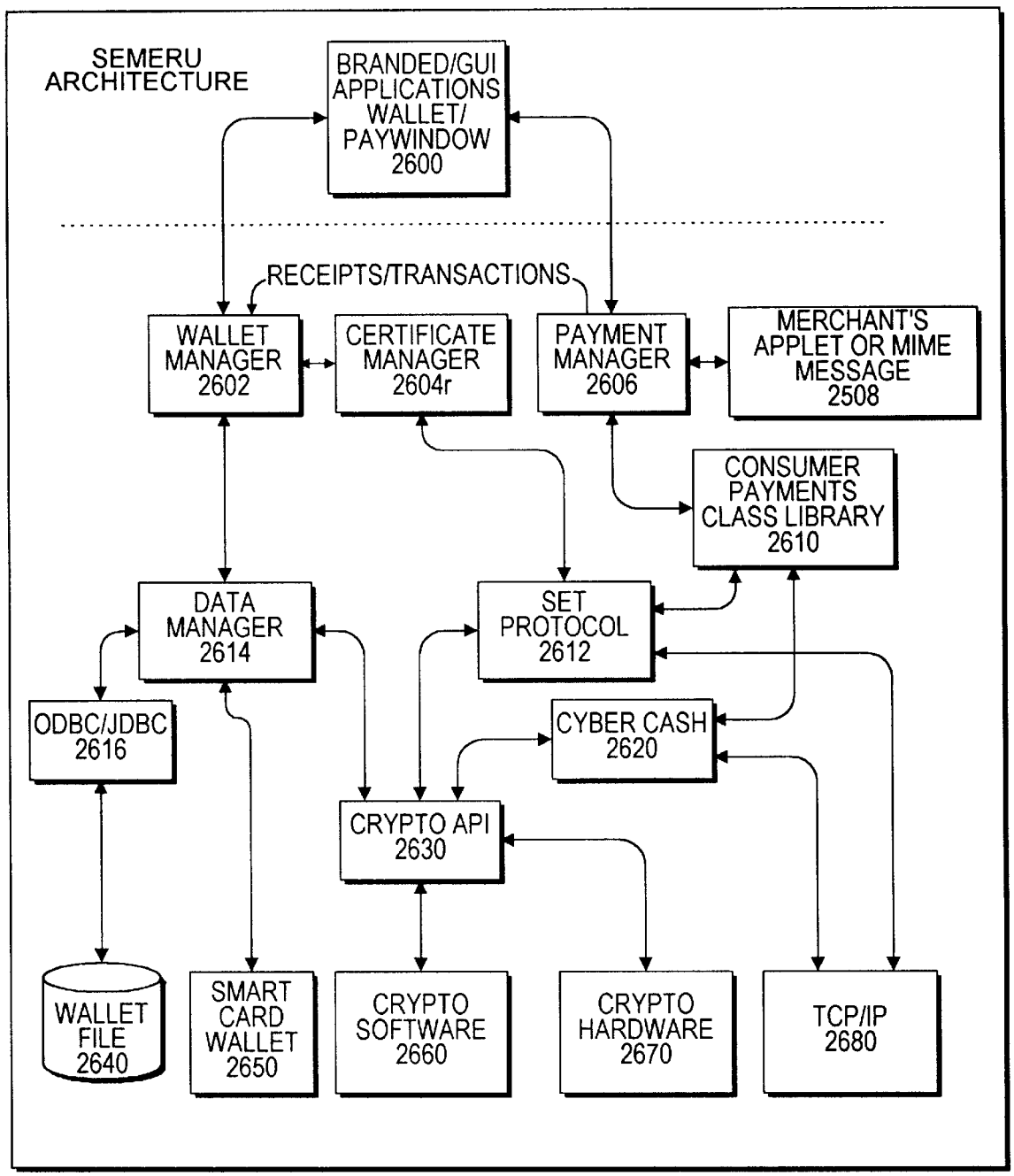
FIG. 26 is an architecture block diagram in accordance with a preferred embodiment.

FIG. 26 is an architecture block diagram in accordance with a preferred embodiment of the subject invention. Processing commences at function block 2600 where the Graphical User Interface (GUI) part of the application is initialized. The GUI application 2600 provides the consumer with support for ordering and making payments during the shopping process. There are also GUI components provided for wallet creation; importing, certificate and payment method creation and maintenance; and for transaction register review and reporting. The screen designs, and their associated logic, for the helper applications and applets are individually discussed in detail below.

The Certificate Manager 2604 manages the automatic downloading of a consumer's certificate from a bank, validation of a consumer's and a merchant's certificates and automatic requisition of certificate renewal.

The Payment Manager 2606 coordinates and completes the payment request that is received from the merchant system. The payment request is received via a MIME message in the native code implementation or via an applet in the Java implementation. The payment request received contains the final GSO, Ship-To name, merchant certificate, merchant URL, coupons and the payment amount. The Payment Manager 2606 then communicates with the payment related GUI component to interact with the consumer to authorize and complete the payment transaction. The Payment Manager 2606 is also responsible for determining the payment protocol based on the consumer's payment instrument and the merchant's preferred payment protocol.

Figure 27:
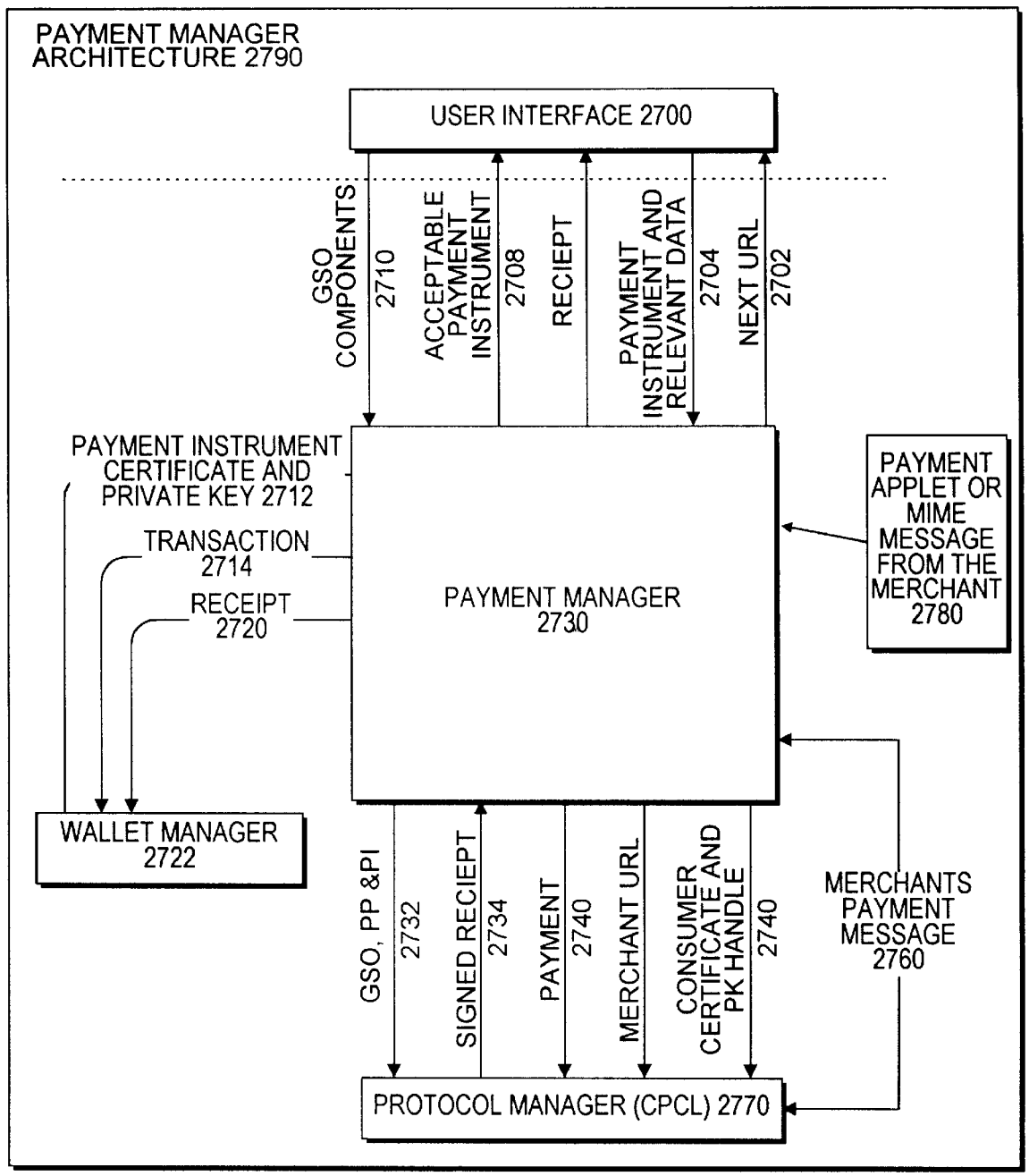
FIG. 27 is a block diagram of the payment manager architecture in accordance with a preferred embodiment.

The Payment Manager 2606 includes a well defined Application Programming Interface (API) which enables OEMs to interface with the Payment Manager 2606 to make payments to specific HTTP sites. The detailed logic associated with the Payment Manager 2606 is presented in FIG. 27.

The Payment Manager 2606 enforces standard operations in the payment process. For example the receipt and the transaction record can automatically be transferred to the Wallet file once the payment is completed. The payment manager architecture in accordance with a preferred embodiment is presented in FIG. 27. A user interfaces with the payment manager 2730 via a user interface 2700 that responds to and sends a variety of transactions 2710, 2708, 2706, 2704 and 2702. The transactions include obtaining the next record, payment record, receipt, acceptance of the payment instrument and GSO components. In turn, the payment manager 2730 sends transactions 2714 and receipts 2720 to the wallet manager 2722 and receives payment instruments, certificates and private keys from the wallet manager 2722.

The payment manager 2730 also sends and receives transactions to the protocol manager 2770 including a merchant's payment message 2760, a consumer certificate and PK handle 2750, a merchant URL 2742, a payment 2740, a signed receipt 2734 and a GSO, Selected Payment Protocol and Selected Payment Instrument 2732. The payment manager 2730 also accepts input from the payment applet or MIME message from the merchant as shown at function block 2780. One aspect of the payment processing is a Consumer Payments Class Library (CPCL) 2770 which encapsulates the payment protocols into a single API. By encapsulating the payment protocols, applications are insulated from protocol variations. A SET Protocol provides an implementation of the client-side component of the Secure Electronic Transaction (SET) Protocol. A complete implementation of the client-side component of the CyberCash micro-payment protocol is also provided.

The Wallet Manager 2722 provides a standard interface to the wallet. It defines the wallet database structures and the payment instrument data structures, controls the access to the wallet and provides concurrency checking if more than one application attempts to open the same wallet. The interface to the wallet manager 2722 is published to allow OEMs to interface with the wallet manager and access the wallet database. The wallet manager consists of the following sub-components:

Wallet Access

This component provides an interface to read and write wallet information.

Transaction Manager

This component provides an interface to read and write transaction corresponding to a wallet into the wallet database.

Payment Instrument Manager

This component manager provides a common interface to the specific payment instrument access components.

Credit Card Access, Debit Card Access, Check Access

These components deal with a specific payment instrument.

A Data Manager provides storage and retrieval of generic data items and database records. It is assumed that data fields, index fields or entire data records can be marked as encrypted and the encryption process is largely automated. The data manager has no specific knowledge of database records appropriate to different payment methods. This layer is separated out so as to reduce changes required when new payment methods are introduced. However RSA key pairs and certificates might be considered as "simple" data types. This component also provides an abstraction which supports wallet files on computer disk or contained in smart cards.

The Open Data Base Connectivity (ODBC)/Java Data Base Connectivity (JDBC) component provides Data Base Connectivity where formal database components are required. An embodiment of the Smart Card Wallet allows wallet data to be stored and/or secured by a cryptographic token.

A preferred embodiment includes a single file or directory of files comprising a "wallet" which contains personal information and information about multiple payment methods with the preferred implementation. These payment methods (Visa cards, debit cards, smart cards, micro-payments etc.) also contain information such as account numbers, certificates, key pairs, expiration dates etc. The wallet is envisaged to also contain all the receipts and transaction records pertaining to every payment made using the wallet. A Cryptographic API component provides a standard interface for RSA and related cryptographic software or hardware. This support includes encryption, signature, and key generation. Choice of key exchange algorithm, symmetric encryption algorithm, and signature algorithm should all be configurable. A base class stipulates generic behavior, derived classes handle various semantic options (e.g. software based cryptography versus hardware based cryptography.)

The Cryptographic Software portion provides RSA and DES support. This may be provided utilizing the SUN, RSA or Microsoft system components depending on the implementation selected for a particular customer. Cryptographic Hardware creates a lower level API which can underpin the Cryptography API and be utilized to replace Cryptography Software with an off the shelf cryptography engine.

The message sequence charts describe the flow of messages/data between the consumer, the browser and/or the various major components of the Semeru system. The major components of the system are the Merchant system which includes the vPOS, the PayWindow, and the Payment Gateway. The merchant system allows a consumer to shop, accept the payment transactions sent by the PayWindow application, and send payment transactions to the acquiring bank. The Consumer Payments Class Library (CPCL) module is a layer within the application which sends the payment transactions, securely, from the consumer to the merchant.

Figure 28:
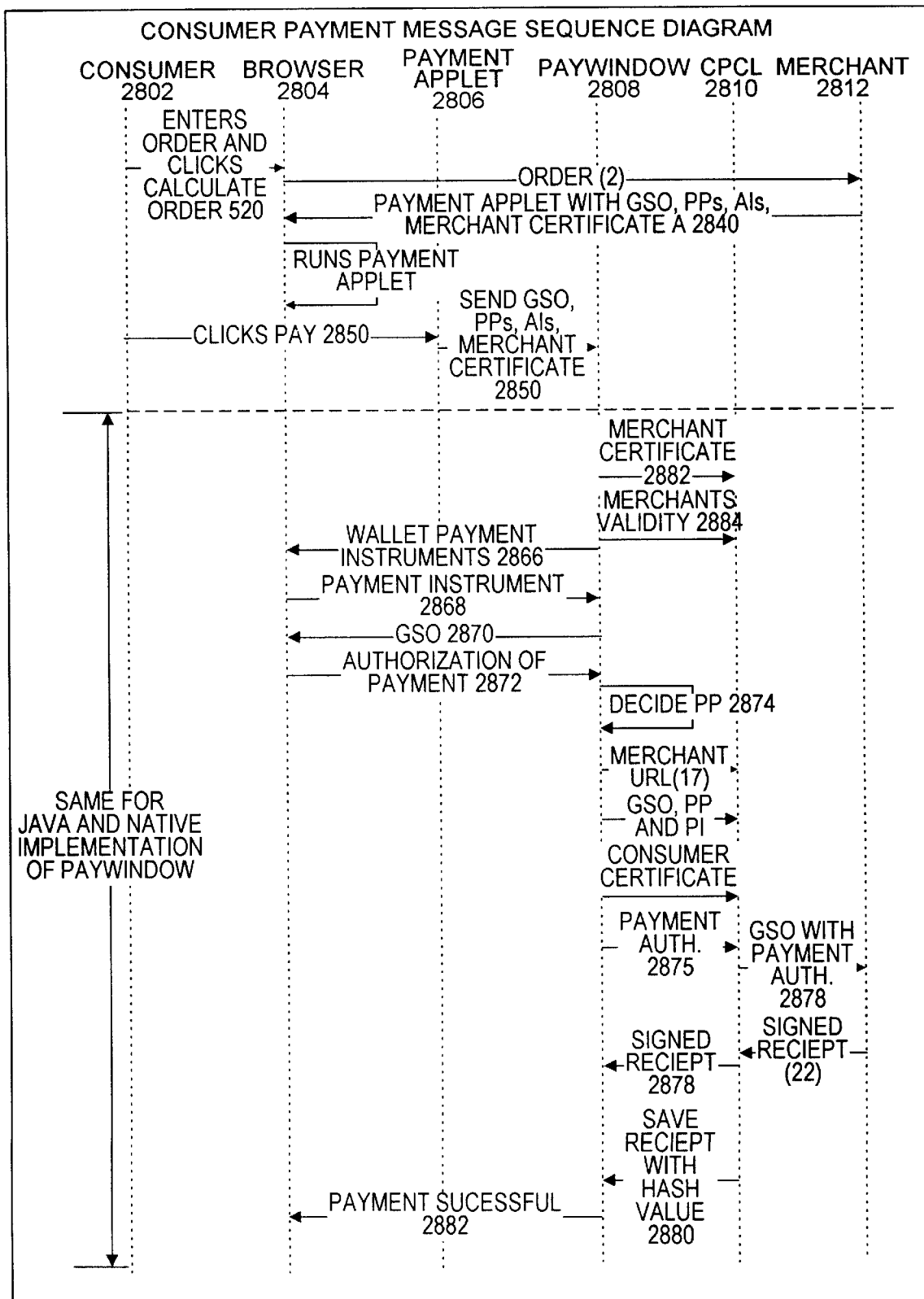
FIG. 28 is a Consumer Payment Message Sequence Diagram in accordance with a preferred embodiment of the invention.

FIG. 28 is a Consumer Payment Message Sequence Diagram in accordance with a preferred embodiment of the invention. The diagram presents the flow of messages between the consumer, the browser, the merchant system, the PayWindow application, and CPCL. This message flow describes the payment process from the time an order is completed and the consumer elects to pay, to the time the payment is approved and the receipt is returned to the consumer. The difference between the Native implementation and Java implementation of the PayWindow application is in the delivery of the order information to the PayWindow. Once the order information is received by the PayWindow, the flow of messages/data is the same for both implementations. In the case of the Native implementation, the order information is delivered via a MIME message. This MIME message is sent to the PayWindow by the browser via a document file. In the Java implementation, the order information is delivered to the PayWindow by an applet. The merchant system sends an applet with the order information to the browser which in turn delivers the order to the PayWindow. Once the order is received, the PayWindow interacts with the consumer and the Protocol modules for the completion of the payment process.

Enters Order and Clicks Calculate Order 2820

This message represents the consumer order entry and the clicking of the 'Calculate Order' button. The consumer's shopping experience is all condensed into this one message flow for the purpose of highlighting the payment process. The actual implementation of the shopping process varies, however, the purpose does not, which is the creation of the order.

Order 2830

This message represents the order information which is sent by the browser to the merchant via an HTML form.

Payment Applet with GSO, PPPs, AIs, merchant certificate and URL 2840

On receipt of the order, the merchant system calculates the payment amount. This message represents the HTML page which is sent by the merchant system detailing the payment amount along with the Java payment applet which contains the GSO, PPPs, AIs, merchant certificate and URL.

Run Payment Applet 2845

The Java enabled browser runs the Payment applet. The applet displays a button called "Pay" for the consumer to click. This is embedded in the HTML page delivered by the merchant.

Clicks Pay 2850

This message represents the clicking of the Pay button on the browser by the consumer after confirming the payment amount.

GSO, PPPs, AIs, merchant certificate and URL 2860

This message represents the GSO, PPPs, AIs, merchant certificate and the merchant URL carried by the Java applet. The Java applet now delivers these to the PayWindow application.

Merchant certificate 2862

This message represents the merchant's certificate which is sent to the CPCL module for checking the validity of the merchant.

Merchant's validity 2864

The CPCL modules examines the merchant's certificate and sends this message to the PayWindow indicating whether or not the merchant is a valid merchant.

Wallet, Payment Instruments 2866

This message represents the wallets and payment instruments that are displayed to the consumer. Not all payment instruments from a wallet are shown to the consumer. Only the ones accepted by the merchant are shown.

Payment Instrument 2868

This message represents the payment instrument selected by the consumer. This message is created in the current design when the user double clicks on the payment image in the "Select Payment Method" Window.

GSO 2870

This indicates that the GSO is displayed to the consumer in the "Make Payment Authorization" screen.

Authorization of Payment 2872

This message represents the authorization of the payment by the consumer. The consumer authorizes the payment by clicking the 'Accept' button on the "Payment Authorization" screen.

Decide Payment Protocol 2874

Once the consumer authorizes the payment, the payment protocol is decided by PayWindow based on the merchant's Payment Protocol Preferences and the consumer selected payment instrument.

Payment Authorization 2875

These messages represent the merchant's URL, the GSO, payment protocol (PP) to use, account number, certificate and the private key handle (PK) associated with the payment instrument which is sent to the protocol module.

GSO with Payment Authorization 2876

This message represents the payment instructions which is sent by the protocol module to the Merchant system. The GSO, PI, consumer certificate and PK is packaged based on the payment protocol.

Signed Receipt 2878

This message represents the digitally signed transaction receipt received by the protocol module from the merchant.

Save Receipt with Hash Value 2880

The digitally signed transaction receipt is saved by the PayWindow for future reference.

Payment Successful 2882

This indicates that the transaction receipt and the 'payment successful' have been displayed to the consumer.

Certificate Processing

A payment instrument must be certified by a "certificate issuing authority" before it can be used on a computer network. In the case of credit card payments, the issuer may be one of the card issuing banks, but it might also be a merchant (eg SEARS), a transaction aquiring bank or an association such as VISA or Mastercard.

Payment instrument information is stored in the consumer's wallet. The certificate which authorizes the payment instrument will be stored along with that data in a secured database. The process of acquiring a certificate is described below. A certificate can be delivered to a consumer in a preconfigured wallet. The consumer receives a wallet which contains the certificate together with the necessary details associated with a payment instrument including a payment instrument bitmap which is authorized by a certificate issuing authority or the agencies represented by the issuing authority.

Obtaining a certificate

A consumer will deliver or cause to be delivered information to a certificate issuing authority. FIG. 29 is an illustration of a certificate issuance form in accordance with a preferred embodiment. A user may fill out the form on-line, on paper and mail it in, or get his bank or credit card company to deliver it. The consumer delivered data will usually contain a public key belonging to a security key pair generated by consumer software. This information will normally be mailed to the consumer's address and actuated by a telephone call from the consumer. The certificate authority takes this information and uses it to validate that he is indeed entitled to use the payment method. This processing normally takes a few days to accomplish.

Information will normally be exchanged with the organization issuing the payment method in the physical space if there is one, and with credit agencies. The certificate information is loaded into the consumer's software to enable payment processing to proceed online.

In some cases the consumer will be able to select details about a payment instument holder (wallet) he desires to own. This may be the icon representing a holder, the access password or other information. After creating the certificate, the issuing authority can use information received in the certificate application to create a custom payment instrument holder ready to use. This payment instrument holder will contain the following information. Payment instrument information including card number 2900 and expiration date 2902. Personal information including name 2904, address 2906, social security number 2908 and date of birth 2910.

Figure 30:
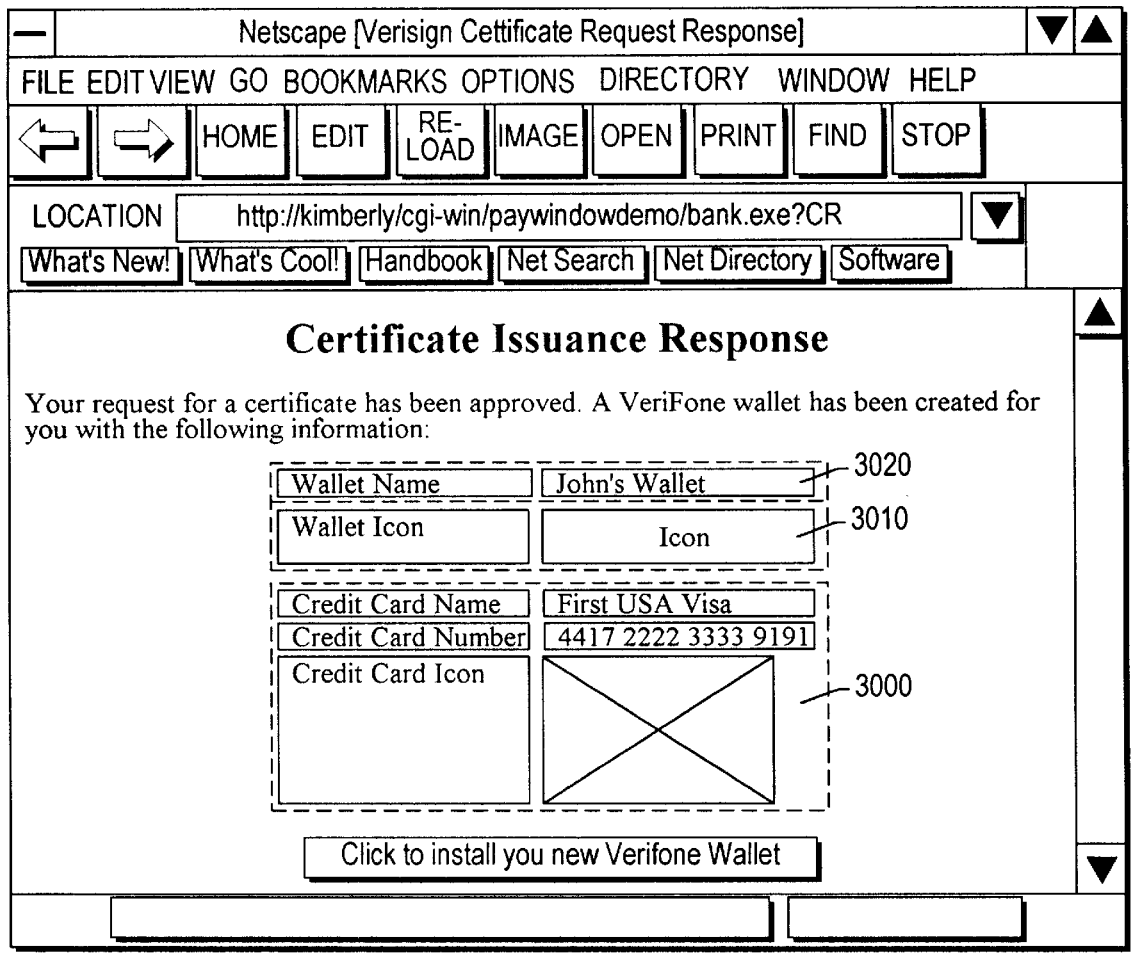
FIG. 30 illustrates a certificate issuance response in accordance with a preferred embodiment.
Figure 31:
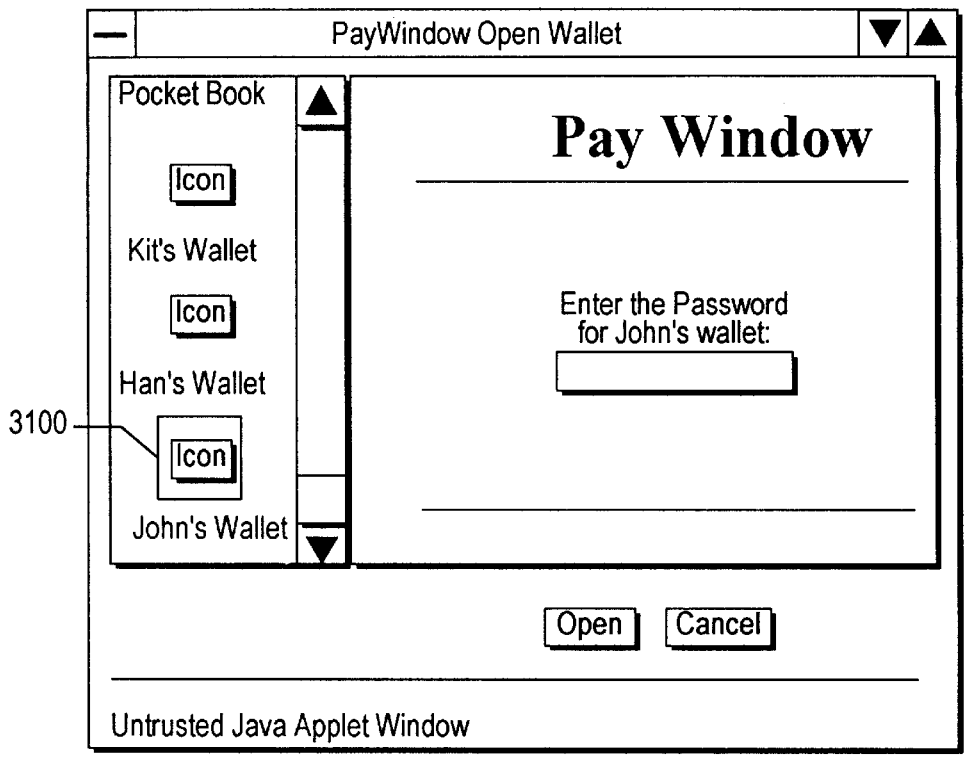
FIG. 31 illustrates a collection of payment instrument holders in accordance with a preferred embodiment.

The associated certificate (eg X509 standard), an associated public key or in some cases public/private key pair (eg RSA), and an approved bitmap representing the payment instrument are provided to the requesting consumer. FIG. 30 illustrates a certificate issuance response in accordance with a preferred embodiment. An approved bitmap for a VISA card is shown at 3000. Also a default payment holder 3010 and a default payment holder name are provided with the certificate issuance. After the consumer aquires the payment instrument holder 3010, the payment instrument holder is immediately visible to him in his collection of payment instrument holders. FIG. 31 illustrates a collection of payment instrument holders in accordance with a preferred embodiment. The predefined payment instrument holder 3100 is the same JOHN's WALLET that was predefined based on defaults by the certificate issuance form.

Figure 32:
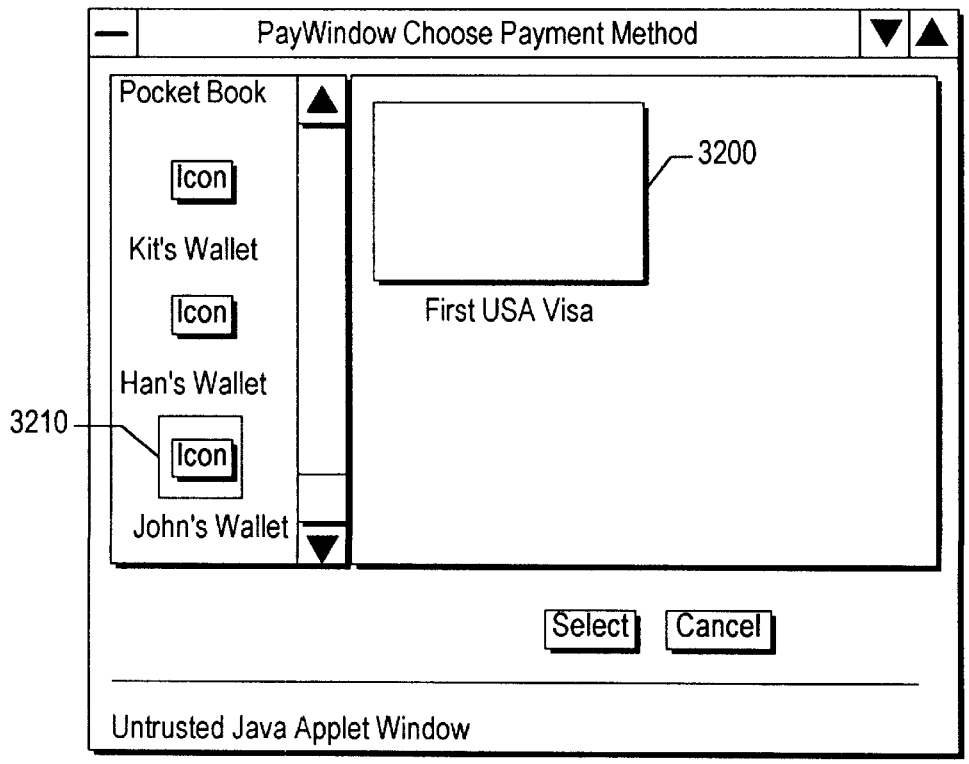
FIG. 32 illustrates the default payment instrument bitmap in accordance with a preferred embodiment.

FIG. 32 illustrates the default payment instrument bitmap 3200 associated with the predefined payment instrument holder 3210 resulting from the consumer filling in and obtaining approval for a VISA card.

Figure 33:
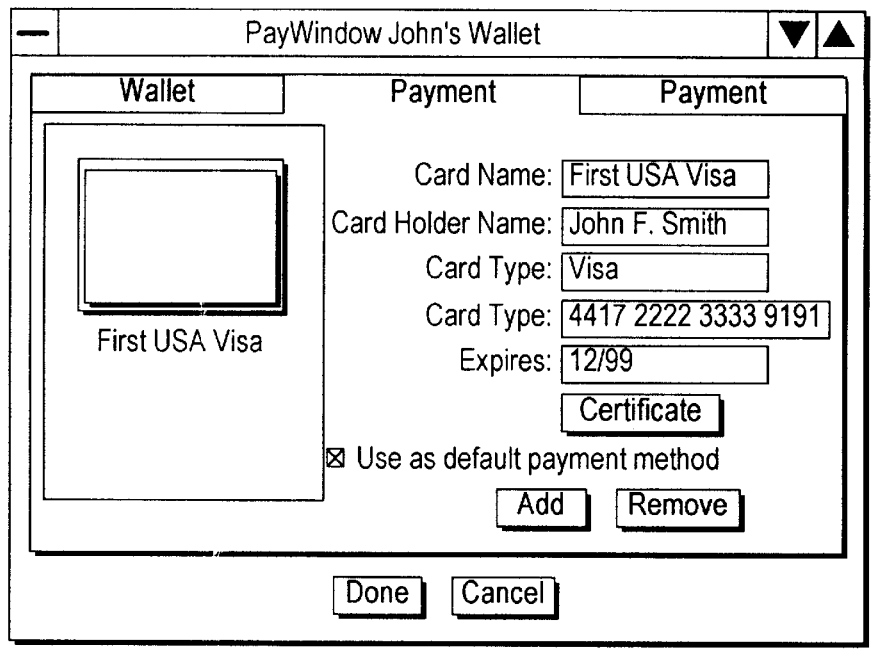
FIG. 33 illustrates a selected payment instrument with a fill in the blanks for the cardholder in accordance with a preferred embodiment.
Figure 34:
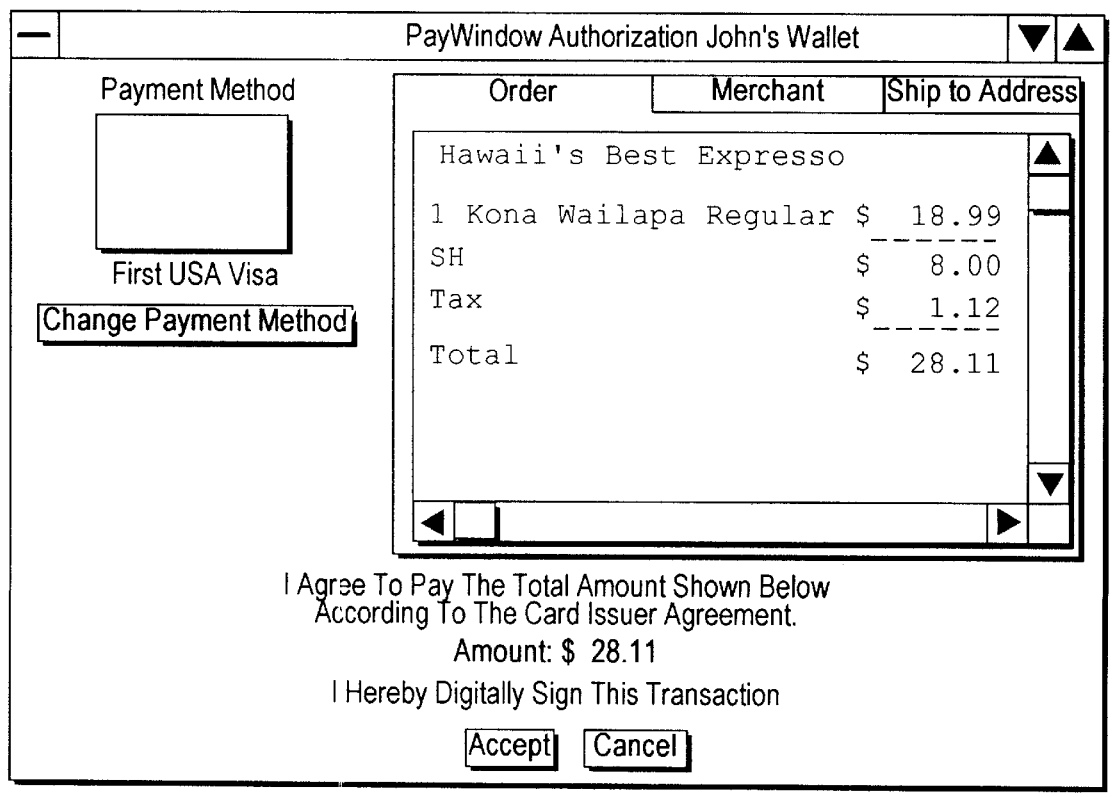
FIG. 34 illustrates a coffee purchase utilizing the newly defined VISA card in accordance with a preferred embodiment of the invention.

FIG. 33 illustrates a selected payment instrument with a fill in the blanks for the cardholder in accordance with a preferred embodiment. Next time the payment instrument holder is opened in a payment context the certificate issuing authorty's approved instrument bitmap can be used to select the payment instrument and utilize it to make purchases. FIG. 34 illustrates a coffee purchase utilizing the newly defined VISA card in accordance with a preferred embodiment of the invention.

Figure 35:
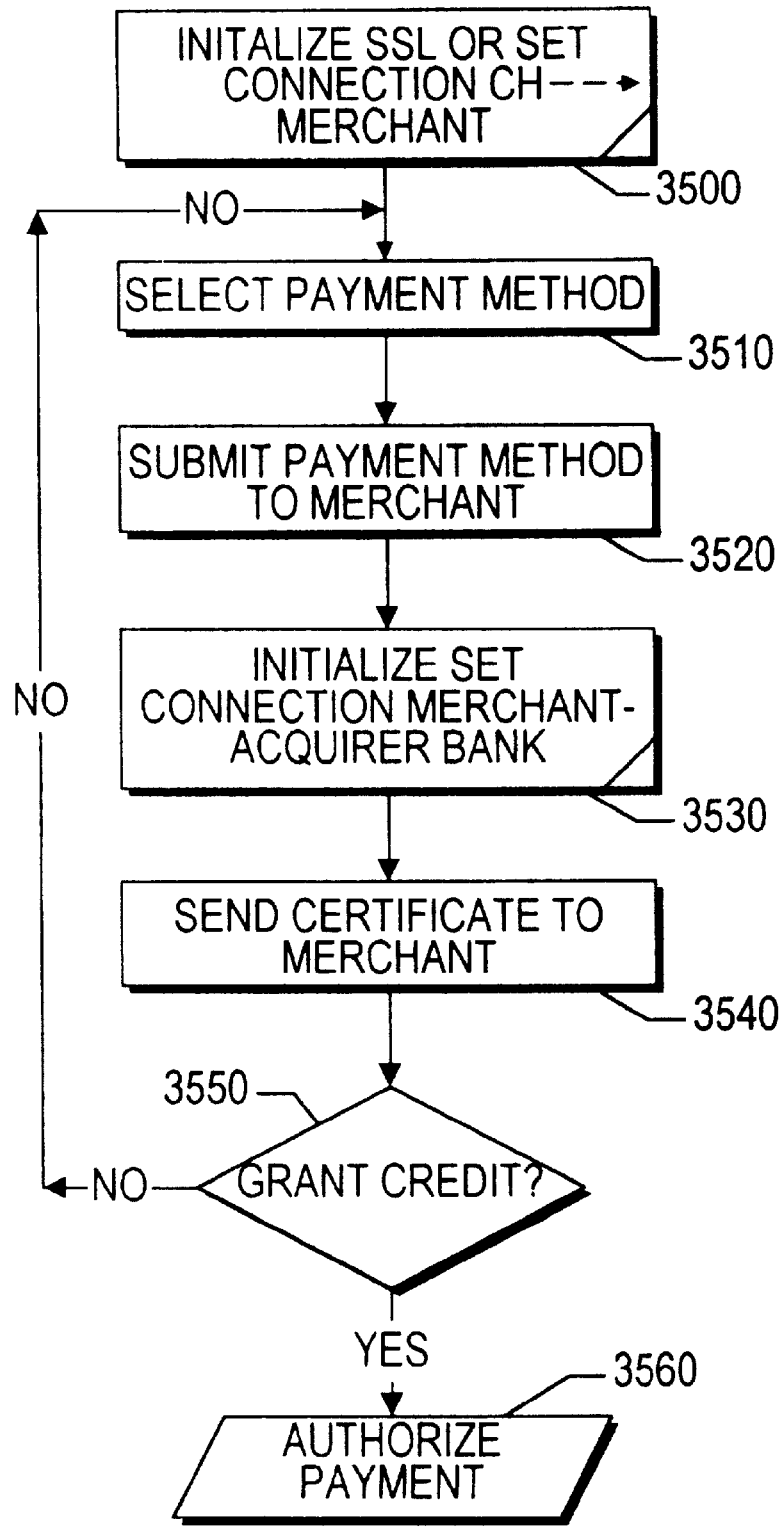
FIG. 35 is a flowchart of conditional authorization of payment in accordance with a preferred embodiment.
Figure 36:
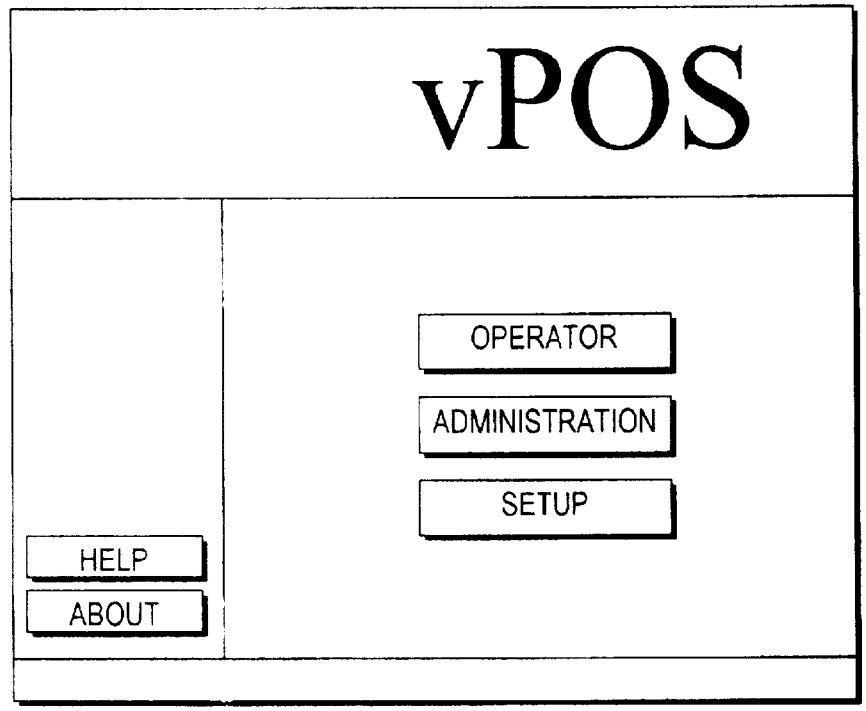
Figure 37:
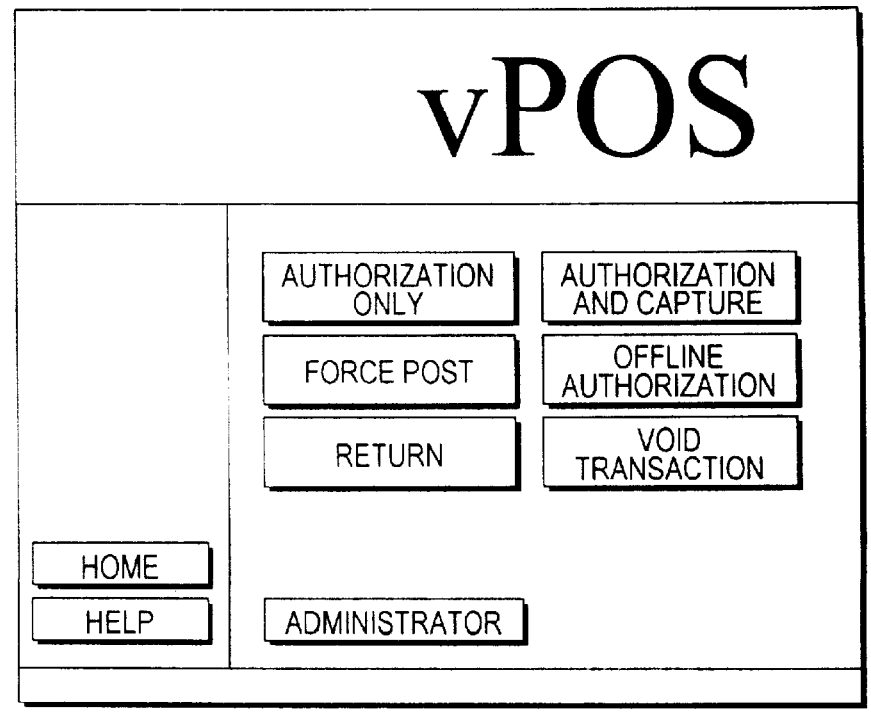

FIG. 35 is a flowchart of conditional authorization of payment in accordance with a preferred embodiment. Processing commences at 3500 where the program initializes the connection between the cardholder and the merchant using SET or SSL for encrypted communication. Then, at function block 3510, the cardholder selects the payment instrument for the particular transaction. Payment instruments could include VISA, MASTERCARD, AMERICAN EXPRESS, CHECK, SMARTCARD or DEBIT CARDS. The payment method is then submitted to the merchant at function block 3520. The merchant then initializes the SET connection to the acquiring bank at function block 3530 if the connection is not already established. Then, at function block 3540, the certificate is submitted to the merchant from the acquiring bank. The certificate includes a public key portion and a private key used as an irrebutable digital signature to authenticate the parties to the transaction. The certificate also includes information on the level of credit risk which allows a merchant to conditionally decide on the authorization or rejection of credit under a particular payment instrument based on their risk level and the merchant's personal comfort level with the ability of the cardholder to pay. This processing has not previously been possible because the information returned from the authorizing bank did not include a level of credit risk a cardholder posed, it only contained credit rejected or approved.

FIGS. 36–48 are screen displays in accordance with a preferred embodiment.

CMI process

This note describes VFI's process for creating key-pairs and obtaining the certificates which bind the identity of the key-holder to the public component of those key pairs. The same process is used both for vPOS and vGATE. Thus, the discussion focuses only on the case of vPOS (i.e. the merchant) and the Certification Authority (CA).

Public key cryptography is the study and practice of encryption, decryption and authentication of messages using two forms of keys: public keys (also known as "public components of a key pairs") and private keys (also known as "private components of key pairs".) Public key cryptography employs mathematical abstractions called "key pairs" which have two halves: the public component and the private component. These two corresponding halves induce mathematical transformations which are mutual inverses of each other. This allows an agent to transform a message using the public component and later reverse that transformation using the private component, or vice-versa. Transformation (via the induced function) using the public component is an effective means of encryption. Reversing this transformation using the private component decrypts the message.

Transformation using the public component is an effective means of digital signature. Reversing this transformation using the public component decrypts the message and thus verifies the signature.

If two agents on an open network are required to transmit messages back and forth to each other using public-key cryptography, then both agents will likely need their own key pair. Lets take two agents "Alice" and "Bob", with their own key pairs <A_pub, A_priv> and <B_pub, B_priv>. Both Alice and Bob keep their own respective private components to themselves as a secret that no one else can know. Additionally, Alice and Bob publish (on the open network) their public components so that everyone can have access to them. Now when Alice wishes to correspond with Bob, she takes the public component of Bob and encrypts her message using B_pub. She sends this encrypted message to Bob who, after receiving it, decrypts the message using his private component B_priv. If Bob would like to sign a message M so that Alice knows that it is from him, Bob would encrypt M using B_priv and then send M together with the encrypted version of M to Alice. Alice would then apply B_pub to the encrypted version and compare it to the original message sent by Bob. If Alice finds that these two messages (the original M and the decrypted M) match, then she can conclude that only Bob could have sent the message.

The entire preceding discussion makes one crucial assumption: Alice knows that B_pub is in fact the public component which belongs to Bob (and vice versa.) If Alice mistakenly uses a public component which belongs not to Bob, but some malicious third party; then Alice's messages to Bob can be intercepted and read by that malefactor. Digital certificates are used in order to guarantee that agents use the correct public component.

Certificates are digitally signed messages which attest to the ownership of a public component. Minimally, a certificate is a signed message which includes the name of the owner of the key-pair, and a copy of the public component. These message are signed by a trusted third party known as a Certification Authority. The process of obtaining such certificates for vPOS and vGATE is key to the CMI process.

Overview of the CMI process

Five steps are used in VFI's CMI process. They are:
1) Creation of key pairs
2) Storage of private components
3) Secure upload of public component
4) Registration
5) Retrieval All steps are performed using a browser operating in one of two modes: 1) interacting locally with a vPOS web server, or 2) remotely over the open Internet using SSL. The key aspects are that the creation, storage, and certification of key pairs is done on one host under administrative control from another host (via a browser.) This is important since it facilitates the utilization of a public-key management scheme for vPOS which can be controlled by a browser either at the console of the machine (via local interactions with the web server) or remotely (via remote interactions with the web server.)

Details of the CMI process

Creation of Key Pairs

A user is directed to a URL on vPOS which starts a CGI program which creates a key-pair. This process must accumulate sufficient amounts of entropy so that the key-pair is ensured to be unique.

Storage of Private Components

The vPOS unit then saves the private component of the key pair to disk in a secure fashion. The vPOS administrator is prompted for a password which is used to secure the storage of the private component.

Secure Upload of the Public Component

The public component of the key pair is then delivered back to the vPOS administrator (who represents the agency being certified) embedded transparently in a hyperlink in the web page which serves as a response to the key-creation request. The hyperlink is created in such a way so that when the administrator clicks on it, the browser establishes an SSL link with the Certification Authority and uses it to upload the public component of the key pair.

Registration

Once the Certification Authority receives the public-component of the key-pair, it responds to the administrator (via the browser) with an HTML form which prompts for identifying information. This information will be used to establish the true identity of the requester and thus determine his eligibility for certification. After the administrator has completely filled in the form, the Certification Authority has all information necessary to issue a certificate. If at some later point, the CA decides to issue a certificate; it may notify the administrator via email or even real-time.

Download

If the CA issues a certificate to the administrator, the vPOS administrator can simply download the certificate off the web site via ftp, email, or the Web.

DETAILS OF THE CERTIFICATION PROCESS

Application for an Account

Before the merchant receives vPOS software, the business must first establish an account with the bank. Even if the merchant has an account with the bank which allows them to process credit card transactions at the physical point-of-sale, an application for an "Internet Merchant" account must be sent to the bank. The bank has policies which determine what kind of paperwork is required in order to establish an account. Minimally, the paperwork must include some means by which the bank can establish the legal identity of the merchant and/or the corporation that the merchant will be running. The bank will also be asking for a variety of documents to demonstrate both credit-worthiness and the viability of the business.

The merchant sends the application to the bank via US Mail. The bank then begins its evaluation of the application. If the bank approves the application, the merchant will receive two items via US Mail:

1) A vPOS software module (together with manuals)
2) An approval letter which contains two crucial parameters:
   a) The Merchant ID number (known as the MID)
   b) A shared secret generated by the bank which will be used as proof to the bank that this merchant has been approved. The precise form of this secret will vary from bank to bank.

The two parameters delivered in the letter are generated by the bank. The shared secret should not be shared with anyone except for the merchant, the bank, and the certification authority. If it somehow escapes, the security of the scheme is undermined.

2.0 Overall UI Flow

In this context, the term "administrator" refers to the person operating the vPOS or vGATE installation. This individual must have direct access to the console of the host in question and must necessarily be a trustworthy party.

The UI flow for certificate management begins on he "Certificate Management" page. This page will be referenced by the main administrative page of vPOS and vGATE. It will contain a sequence of links which will lead the administrator through all steps necessary to create key-pairs, deliver certificate requests, accept signed certificates, and install them into the database.

The steps the administrator must follow are:

Create an administrator's password

Generate an encryption key-pair and submit a corresponding CSR

Generate a signature key-pair and submit a corresponding CSR

Pickup a signed encryption certificate

Pickup a signed signature certificate

Load the encryption certificate into the certificate database

Load the signature certificate into the certificate database

Once these steps, which are detailed below, have completed then the vPOS and vGATE is available to process transactions.

Password Creation

This page asks the user to create a password. The page should spell out specific guidelines as to what sort of passwords are secure, and which are not. There will also be an HTML form which will prompt the administrator for a password, and a retype of the password. Two important side-effects will result from the successful creation of a password:

1) A backup of the password will be created on a floppy disk.
2) A checksum file will be created allowing further uses of this password to be verified against the checksum before the password is used for encryption/decryption.

The presence of a checksum file will also allow the software to understand that it has already created a password (and a backup file for this password.) This one password will be used for secure access to all sensitive data in the vPOS system. It will be used to store PANs in the database, and private components of key-pairs.

Creation of a Key Pair

Once the vPOS/vGATE software is installed and the administrator has access to the Internet via an SSL capable browser, then both vPOS and vGATE have administrative interfaces which are rendered via CGI programs accessed locally on the server. This same UI paradigm will be used for key-management functionality. The administration pages for vPOS and vGATE will both contain links to a "Create Key Pair" page that will begin the certification process. Clicking on this link initiates an HTML form which lets the user know that they are about to create a key pair. The form prompts for the password that was already created in a previous phase. Once the administrator hits the SUBMIT button on the web page, a CGI program is invoked which begins to cut an RSA key pair. Here is what the CGI program does:

1) Checks to see if the password matches its checksum via the SecStorMgr interface. Reject the password with an appropriate message if it does not match.
2) Reserves enough system memory so that we can create a key pair of the appropriate length (usually 1024 bits.) This may be derived from a variety of system phenomena, including mouse movement.
3) Creates an RSA key pair
4) Stores the private component on a disk using password-based encryption (with the password that the user just typed in.) The encryption will also be performed by the SecStorMgr interface.
5) Creates a PKCS-10 formatted CSR. Do not include any attributes in the PKCS-10 message at all. The PKCS-10 format demands that you sign the public component using the private component.
6) Routes the CGI program output (via stdout) to the next page for the user to interact with. This page will contain some user-friendly text, like: "Success—You have generated a key pair!!". It will also contain a hyper link to the CA which has (as a URL parameter) the PCKS-10 formatted, base64 encoded signed public key. The link will be of the format:

--- https://www.CA.com/cgi/certify_prog?-setpkcs10="0df87jd4jd3296aaa...

---

By clicking on the link, the administrator transfers control over to the CA, while at the same time uploads the public component to the CGI program. At this point, the administrator should see a web page asking him or her to enter in a number of parameters that will go into the certificate. The page the CA displays should be an HTML form (the content of which is a negotiated by the bank and the CA.) Filling this form in brings us to the next step.

Submitting a Certificate Signing Request

After filling out the form completely, the administrator presses the SUBMIT button which uploads the form data to the CA. If any of the form components are ill-formatted, or if the signed public key does not verify correctly, the requests are rejected. Among the data components that will be prompted for (outside of those required by the SET specification) is the aforementioned shared secret. This secret (known only to the bank, the merchant, and the certification authority) is transmitted to the Certification Authority so that the bank has some means to identify valid certificate signing requests. Then, the administrator presses the SUBMIT button and receives confirmation of the receipt of valid parameters for a certificate, together with a reference number for this CSR. Now the administrator must wait until the bank and the Certification Authority informs him/her via email that the certificate is ready for retrieval.

CA/RA processing of a Certificate Signing Request

At this point, the CA (i.e. the Certification Authority) has all the information necessary to format and sign a certificate. The bank is the ultimate authority as to which certificates are to be signed. In "Certificate-lingo" the bank's role is called the RA (i.e. the Registration Authority.) Clearly the CA and the RA must exchange information in order to allow the bank to select the certificate signing requests that it believes are valid. This exchange is done by procedures negotiated by the CA and the RA. One example of an RA-style solution allows the bank to access the CA via an SSL-based web browser using hardware cryptography. There are other ways to achieve this same functionality, but in the end this a process which VFI need not address directly. These issues are among the topics that the CA and the bank will have to negotiate. The overall idea is that the bank (by some means) determines which CSRs are legitimate and communicates this information to the CA who signs only those requests.

If the CA receives consent from the bank to issue a certificate, then the CA formats a certificate and signs it using the bank's private-label key. The CA then places the certificate out on its Web server so that it is available for download. Finally, it emails a notice to the administrator that the certificate is ready. This step of the process may take a few days to complete, depending upon the frequency that the RA checks the CA and the amount of time required by the CA to sign and post the certificate.

Receiving a Signed Certificate

The email sent from the Certification Authority to the administrator contains a reference number that will allow the administrator to retrieve the certificate. The email will also include an URL which points to the web site where the certificate has been posted. The administrator will then direct his/her browser towards the URL contained in the email. A URL to the "pickup site" will also appear on the "Certificate Management" page in vPOS and vGATE. The "pickup site" page (hosted by the CA) will prompt for the reference number. Once the appropriate reference number has been entered, the administrator will see a page which contains hyperlinks which point to the certificates themselves. Clicking on these hyperlinks will prompt the server to download the certificate wrapped in a specified MIME type (application/x-set-cert.) The administrator can then save this certificate to disk in a filename of his/her choice.

The final act in the digital certification process is to have the administrator copy the certificate that has been saved to disk into the certificate database. This is done by specifying the location of the certificate file via a page found off of the vPOS/vGATE administration page. The software which reads this file will first verify that the certificate parses and is a valid digitally signed certificate before placing it in the database. The administrator will be able to see a decoded version of the certificate on the screen (presented in HTML) before he/she hits the SUBMIT button that sends the binary version to the database. The administrator will be doing both of these actions (obtaining and installing) both the signature certificates and the encryption certificates. This entails four separate actions in addition to the paperwork, key pair creation, and CSR submission phases.

HTTPS TRANSPORT SPECIFICATION

SET has a collection of messages devoted to the transport of CSRs and freshly signed certificates. In this design we have opted for a different transport mechanism for such data. The primary objective here was to streamline implementation by choosing a well-known transport mechanism which is relatively simple from the standpoint of interoperability. A secure version of Hyper-Text Transport Protocol (HTTP via SSL, aka HTTPS) is the means by which a CSR is uploaded. This scheme combined with the shared-secret mentioned above has met with approval from a wide range of customers and alliance partners. It is difficult to give a complete analysis of the relative security of this mechanism versus the mechanism specified in SET. As of this writing, no customer or alliance partner has raised any significant objection to the security or feasibility of this approach.

Another advantage of HTTPS as a transport protocol is that it integrates seamlessly with our chosen UI idiom: HTML. An HTTPS upload can be rendered in HTML. The information necessary to begin the CSR process at the CA's site can be encapsulated in a few parameters to the POST operation. Two types of information must be conveyed to the CA in the HTTPS post which serves to begin the processing of a CSR: 1) the public component of the key pair, and 2) the type of certificate being requested. The public component of the key pair will be delivered in base 64 encoded PKCS-10 format. The certificate type will be encoded as a pre-agreed set of flags between VFI and the CA.

The PKCS-10 format allows us to express several identifying parameters to the CA. The only component of the PKCS-10 format that we must fill out is the public component. Currently, no other fields are required; the information that is missing from these fields will be supplied in the aforementioned HTML form that the CA displays to the merchant. The PKCS-10 format demands that the public key is presented in a fashion that demonstrates that the sender has knowledge of the corresponding private component. Technically speaking, this means that the private component is signed with the private component. Tool-kits exist which perform these functions automatically.

A table is provided below of the acceptable POST name value pairs that will appear in our HTML.

| Name | Format of Value | Notes |
| --- | --- | --- |
| setpkcs 10 | one contiguous line of double-quotes enclosed base 64 encoded pkcs-10 formatted data | CAs may request some format adjustments to the PKCS-10 payload. None are known at this point. |
| cert_typ | Valid values are "ms", "me", "ps", and "pe". These mean | Unsupported flag values "ma" and "pa" will eventually allow |
| e | (respectively) "Merchant" Signature", "Merchant Encryption", "Payment-Gateway Signature", and "Payment-Gateway Encryption" | both "Encryption" and "Signature" CSRs to be created and uploaded simultaneously. |

An example of the HTML code that can be used to deliver the PKCS-10 message appears below. This page illustrates the code which creates a key-pair and corresponding PKCS-10 message.

```
<HTML>
<HEAD>
<TITLE> Certificate Request </TITLE>
</HEAD>
<form action ="https://www.CA.com/cgi-bin/cert_enroll.perl" method ="post">
<input type ="hidden" name="-setpkcs 10" value
="MIIBizCB9QIBADBOMQswCQYDVQQGEwJVUzERMA8GA1UECh
MlVmVyaUZvbmUxHTAb
BgNVBAsTFE1lcmNoYW501ENlcnRpZmljYXRlMQ0wCwYDVQQD
EwR2UE9TMIGfMA0G
CSqGSIb3DQEBAQUAA4GNADCBiQKBgQDVb9da5+PrOHffmxu
ScbZlzbMw1ipKR2rY
GHsQtEUvb3z88XHpXX4U9N0XBJ+25AG22iDoXeIG/8ubcslSWFoFQt
Pr3p8OIij
RvMcyeVCO7Y1Jx0jyzwP6645LiXQj57lmoxEokTMQn4TEsTab3j76E1
pg61mJ4f/
Cw9qJ8J/OQIDAQABMA0GCSqGSOb3DQEBAgIAA4GBAF/IPT4jsQA
qkxata6Gf3Uht
LO9tqadQFw/NwT/mUXuS7l+N6BtE/LZNLzCD3uzPE0ctJnAQt02yLtv
SAqqHZ7f
xD32SBkL3dbFKS9GeyeY+5z4bzvHeREf8Oqy8L3wV9JgrmmY9hc6QT
fo8q8ZsjBg
KNL34tXQyG6RPiBBIi0d">
<input type ="hidden" name ="-cert_"value ="ms">
[content omitted for sake of brevity]
</form>
```

PASSWORD-BASED SECURE STORAGE

Password-based encryption is a cryptographic technique which allows us reasonably secure storage of two forms of sensitive information: private-components of RSA key-pairs, and PANs. Although hardware cryptography would be a more secure means to store this data, we have come to the conclusion that it is not cost effective at this point for us to deploy such measures at vPOS. We will be deploying hardware cryptography as soon as possible in the vGATE code stream.

PBE schemes work by using symmetric key algorithms. The key is derived from a password which is not stored on the machine. The password is transformed into the symmetric key via a secure hash function. One disadvantage of this scheme is that if the user looses the password, the encrypted data becomes completely unusable. This property of PBE obviously leads us to the requirement for a backup of the password in some secure fashion. Backup of the password at an FI will probably have to happen in a manner determined by bank policy. Backup of the password at vPOS will be achieved by writing it to a floppy disk which is then ejected and stored in a safe place.

The PBE scheme will be used to store two classes of sensitive data (PANs and private-components of key pairs.) Since password management can be confusing (to the point of being insecure), we also have the implicit requirement that there must be one password that will work to decode all classes of sensitive data. In order to facilitate this password management requirement, this specification calls for a "checksum" file which allows the software to check successive password entries against the initial password in order to guarantee that one unique password is used across the entire system.

The security of PBE rests largely on the quality of the password chosen. If an administrator chooses a password which can be guessed by an attacker, the encryption algorithm will not be very much use. In the hacker community, many programs exist which contain libraries of commonly used "weak" passwords. These programs help an attacker sort through these weak passwords. Clearly our interface should enforce high standards of password quality. Many banks will have such policies available for our use.

A C++ API presenting PBE functionality compliant with the requirements listed above is presented below. After the class level interface, I will run through a few use-cases to illustrate usage.

```
// A secure storage management interface
        // This class manages a simple interface
        // to a PBE scheme which facilitates password
        // backup and persistent storage of a password
        // checksum scheme. The standard imagined use-case
        // is to first call a "create" method which establishes
        // the backup file and the checksum file. The user
        // can then close down his/her access to this class
        // and return later to first "open" the secure storage
        // and subsequently call "encrypt" and "decrypt".
        // Obviously the password backup file should be stored on some
        // highly secure medium (say a floppy that gets put in
        // a safe.)
define CPCL_SECSTOR_SUCCESS        0
define CPCL_SECSTORE_DOES_NOT_EXIST    1
define CPCL_SECSTOR_ERR_ALREADY_EXISTS   2
define CPCL_SECSTOR_WRONG_PASSWORD    3
define CPCL_SECSTOR_ERR_READING_BKUP    4
define CPCL_SECSTOR_ERR_WRITING_BKUP    5
define CPCL_SECSTOR_ERR_READING_CHKSUM   6
define CPCL_SECSTOR_ERR_WRITING_CHKSUM   7
define CPCL_SECSTOR_NOT_OPEN       8
define CPCL_SECSTOR_ENCRYPT_FAILED    9
define CPCL_SECSTORE_DECRYPT_FAILER   10
define CHECKSUM_TEST       "Version 1.0/test"
class CPCLSecStorageMgr
        {
                //Password storage
                unsigned char *sz_password;
public:
                ///////////////////////////
                // standard ctors/dtor
/////////////////////////////////////////////
                CPCLSecStorageMgr();
                CPCLSecStorageMgr(const CPCLSecStorageMgr &x);
                virtual ~CPCLSecStorageMgr();
/////////////////////////////////////////////
//Storage management primitives. These
//are virtual so that if you need to
//implement storage semantics differently,
//you may do so.
//////////////////////////////////////////////////////////
                //Create two files: a backup file and a checksum
                //file. I recommend that the checksum file be
                //the PBE of a fixed known test string CHECKSUM_TEST.
                //This means that you able to validate against
                //the checksum if and only if you know the password.
                //Return CPCL_SECSTOR_ERR_ALREADY_EXISTS if it exists.
                virtual int create(unsigned char *sz_StorMgrname,
                                unsigned char *sz_new_password,
                                unsigned char *sz_backup_filename) = 0;
                //Destroy the checksum file. I recommend that you
                //first verify that the password matches with the
                //checksum.
                virtual int destroy(unsigned char *sz_StorMgrname,
                                unsigned char *sz_new_password) = 0;
                //Check to see if the checksum file exists and matches
                //the password. If it does return CPCL_SECSTOR_SUCCESS.
                //else, return CPCL_SECSTORE_DOES_NOT_EXIST.
                virtual int exists(unsigned char *sz_StorMgrname,
                                unsigned char *sz_new_password) = 0;
                //This is basically a "create" but you leave out the
                //part where you create a backup file.
                virutal int restore(unsigned char *sz_StorMgrname,
                                unsigned char *sz_new_password,
                                unsigned char *sz_backup_filename) = 0;
```

```
        //Obtain access to an already "create"d checksum
        //file. Minimally, this must check for
        //the existance of the password checksum
        //file, and then check the password against the checksum.
        //We must also strcpy the password into "sz_password".
        //One way to define this is just:
        // {
        //    exists(unsigned char *sz_StorMgrname, password);
        //    strcpy(sz_password, password);
        //    return CPCL_SECSTOR_SUCCESS;
        // }
    virtual int open(unsigned char *sz_StorMgrname, password) = 0;
        // Key hygiene and datastore maintenance.
        // This must memset out the password to nulls
        // Anything else is up to the implementor.
    virtual int close() = 0;
///////////////////////////////////////////
//Once a StorageMgr has been created and opened, you can use
//it to encrypt or decrypt with these methods. Both of these
//methods should check to make sure that the sz_password field
//is non-null. If it is null, that means you have not "open"' d
//the StorageMgr. In this case, the routines should return
//CPCL_SECSTOR_NOT_OPEN. Contrary to what the name
//of the class suggests, there are no methods which
//actually *store* the bulk-encrypted data. That is
//up to you.
/////////////////////////////////////////////////////////
//
//INPUT
//OUTPUT
encrypt(unsigned char *sz_cleartext, unsigned char *sz_ciphertext);
//INPUT
//OUTPUT
decrypt(unsigned char *sz_ciphertext, unsigned char *sz_cleartext);
    };
//End of class definition
```

This interface will be used at the time the user creates a password and at the time a software component requires storage or retrieval of sensitive data. In order to create a password, the program would prompt for the password (and for a re-type of the password.) After checking that the password was sufficiently strong and that the re-typed password matches the original, the program would then:

```
// Create a SecStorMgr
        CPCLSecStorageMgr myMgr;
// call the create method
        myMgr.create ("LogicalStorageName", sz_usertypedpassword,
"a:\backup.txt");
/////////////////////////////////////////////////////////
/
//This method creates the checksum file and saves the backup.
//Presence of the checksum file is an indicator that a password
//has already been created.
/////////////////////////////////////////////////////////
///
```

Later on, when the program needs to encrypt or decrypt the data, the program would prompt for the password and then:

```
//Create a SecStorMgr
    CPCLSecStorageMgr myMgr;
//invoke the open method
////////////////////////////////////////////////////////////
/
//The password checksum file. If the password passes
//the checksum criteria, then the class prepares itself for
//encryption by copying the password into the private
//class variable sz_password.
////////////////////////////////////////////////////////////
///
    myMgr.open("LogicalStorageName", sz_usertypedpassword);
    //Now we can call encrypt/decrypt
    myMgr.encrypt(sz_Secret, sz_EncryptedSecret);
```

KEY MANAGEMENT

There are two very important security sensitive aspects RSA key-pairs that the vPOS/vGATE must address: 1) key pair creation, and 2) secure storage of the private component. Two possible interfaces exist for RSA key pair generation:

BCERT's GenerateRSAKeyPair (from RSA)

SMAPI's CPCLKeyPairGenOp (written here at VFI)

Either of these two interfaces will be sufficient for the first deployment since they invoke the same BSAFE interfaces. At some point a switch to the CPCLKeyPairGenOp will enable the removal of a dependency on BSAFE (we have a requirement to be CAPI capable as well as hardware-crypto enabled.) SMAPI was designed to abstract away from specific implementations of cryptographic interfaces, so we should move in the direction of SMAPI at our earliest convenience. Outside of the raw interfaces for key-pair generation, we must also worry about the random numbers supplied to the underlying routines. Much care must be taken in order to ensure that the byte streams supplied to key-generation routines are sufficiently "random". Without sufficient care, key-pairs can be predicted by attackers who apply reverse engineering techniques to the software. It is possible to measure the entropy of various system phenomena in a fashion which allows us to supply lower bounds on the number of bits of randomness we can expect to accumulate per second. By adding conservative estimates from all measured phenomena, we can acquire an overall understanding of how much time we need in order to accumulate a given level of randomness. This analysis, or some similar technique must be applied to help ensure that our key generation software is secure.

The second security sensitive aspect of key pair management is the storage of the private component. Once the key-pair has been generated, the private component must be stored on disk for later use. PBE schemes (covered above) will be used to store this data. A single routine is required to store this data. It has the following declaration:

```
int StorePrivateComponent(
    CPCLKey *privComp,          //Private Component to be stored
    unsigned char *sz_password, //Password used to store (via the
SecStorMgr)
    unsigned char *sz_SMname,   //Logical name of the SecStorMgr
    unsigned char *sz_path);    //File location in which to store
                                  the key
```

The semantics assume the caller retains deletion responsibility for all parameters. A similar function will be used to restore this data:

```
int FetchPrivateComponent(
    CPCLKey **privCompPtr,      //Priv. Component to be fetched
(creates memory!)
    unsigned char *sz_password, //Password used to retrieve
SecStorMgr)                     (via the
    unsigned char *sz_SMname,   //Logical name of the
                                  SecStorMgr
    unsigned char *sz_path);    //File location from which to read
                                  the
key
```

The semantics here assume the caller retains deletion responsibility for the last three parameters, and receives the responsibility to delete the newly created CPCLKey which is pointed to by *privCompPtr when they are through using that key. Here is pseudo-code for FetchPrivateComponent:

FetchPrivateComponent(privComp, sz_password, sz_SMname, sz_path)
1) Create a CPCLSecStorMgr and call its "open" method with password "sz_password" and logical name "sz_SMname".
2) Open the file referred to by "sz_path" and do an fgets on this file in order to extract the first CRLF-terminated line named. Convert this text into an integer, and assign it to a variable named "outputlen".
3) Do another fgets on this file in order to extract the encrypted private component. Name this string "EncryptedPrivComp".

Take a strlen on this string and assign the result to "inputlen".
4) Obtain string storage space for a string of length "outputlen". Name this string "ClearTextPrivComp".
5) Call the "decrypt" method of the CPCLSecStorMgr as follows: mySecStorMgr→decrypt (EncryptedPrivComp, inputlen, ClearTextPrivComp, outputlen);
6) Create a new CPCLKey from ClearTextPrivComp and outputlen. Assign a pointer to this new CPCLKey to *privCompPtr.
7) Return.

Although it is implicit in the discussion above, the file format for encrypted private components will resemble:

<ascii representation of length of cleartext>CRLF
<encrypted version of private component>CRLF Once we have a key pair, we must store the private component in the fashion described above and produce a PKCS-10 message from the public component. Example code for this operation can be found in the BCERT demo inside the "GenerateCertRequest" procedure.

Files that store private-components adopt the following conventions:

| Type of Private Component | File/Table name |
| --- | --- |
| Merchant encryption private component for a merchant named <name> | <name>.epc<br>epc == Encryption Private Component |
| Merchant signature private component for a merchant named <name> | <name>.spc<br>spc == Signature Private Component |
| Gateway signature certificate | gateway.epc |
| Gateway signature certificate | gateway.spc |

CERTIFICATE DELIVERY AND INSTALLATION

After the CA signs a certificate, an email message is sent to the requester informing them that their certificate is ready to be picked up. As described above, the administrator of the system will use their browser to download the certificate to the disk. The administrator will then use the certificate management interface to load the certificate into the certificate database. As mentioned above, the software will prompt for a filename (which is the location that the user downloaded the certificate to) and then displays a confirmation screen to the administrator before installing the certificate into the database. The confirmation screen should display the contents of the certificate in human readable form together with some indication as to whether the certificate passes the chain validation tests. This section describes the certificate database API that will be employed by the software that loads certificates.

There has already been extensive discussion of a generic database API for certificate services. The API below presents functionality necessary to deploy vPOS and vGATE. Although many needs are left unaddressed by this API. Many basic business process issues have yet to settle down completely, leaving many of the market requirements for this API in flux. It would be unwise at this point to attempt complete coverage of every foreseeable need at this juncture given the uncertainty surrounding issues such as CRLs, certificate renewal, and thumbprint support. When we see demonstrable market need for such services, this API will have to evolve and adapt to those requirements. This API is defined as an abstract base class so that different implementations on vPOS and vGATE can go their separate ways.

Note that this scheme does not require storage of multiple certificates per file/table. This aspect simplifies the implementation profile greatly since no DB schema is necessary. Again, it is my position that as demonstrable market need for more complete certificate services arise; we will be in a better position to understand storage and data-maintenance requirements. At that point we can re assess our requirements and re-implement on top of a true schema.

```
class CertDataStore
{
public:
    //SEMANTICS:
    //  1) Check to see that certificate passes chain-validation test
    //  2) copy sz_filename to <fixedpath>/"sz_tablename".enc
    virtual int InsertEncCert(
        unsigned char *sz_filename,
        unsigned char *sz_tablename) = 0;
    //SEMANTICS:
    //  1) Check to see that certificate passes chain-validation test
    //  2) copy sz_filename to <fixedpath>/"sz tablename".enc
    virtual int InsertSigCert(
        unsigned char *sz_filename,
        unsigned char *sz_tablename) = 0;
        //Except for administrative purposes this will never
        //be used by the gateway. This Will be used quite often
        //by the vPOS in order to send the certificate to the gateway
        //so that it can encrypt data back to the merchant.
    //SEMANTICS: Read <fixedpath>/"sz_tablename".enc and place in buf
    virtual int GetMyEncCert(
        unsigned char buf[],
        int buflen,
        unsigned char *sz_tablename) = 0;
        //Both vPOS and vGATE will make extensive use of this cert.
    // SEMANTICS: Read <fixedpath>/"sz_tablename".sig and place in buf
    virtual int GetMySigCert(
        unsigned char buf[],
        int buflen,
        unsigned char *sz_tablename) = 0;
        //This seems quite unnatural, but the vPOS has to have
        //access to this certificate in order to encrypt material
        //to the gateway. The Gateway in fact does not need this function
        //since it can call GetMyEncCert. The vPOS must have this function
        //since calling "GetMyEncCert" will fetch the encryption certificate
        //of the vPOS itself, not of the gateway.
    //SEMANTICS:
    //  1) Check to see that the certificate passes chain-validation test
```

```
// 2) Read <fixedpath>/gateway.enc and place in buf
virtual int GetGatewayEncCert(
    unsigned char buf[],
    int buflen) = 0;
};
```

Files that store certificates (or sequences of certificates) should adopt the following conventions:

| Certificate Type | File/Table name | Location | Source | Notes |
| --- | --- | --- | --- | --- |
| Merchant encryption certificate for a merchant named <name> | <name>.enc | vPOS only | CA | Signed by bankroot.crt |
| Merchant signature certificate for a merchant named <name> | <name>.sig | vPOS only | CA | Signed by bankroot. crt |
| Gateway signature certificate | gateway.enc | vPOS and vGATE | CA | Signed by bankroot. crt |
| Gateway signature certificate | gateway.sig | vGATE only | CA | Signed by bankroot. crt |
| Wells Fargo Brand CA certificate | bankroot.crt | vGATE and vPOS | Installation | Signed by CA root key |
| CA root key | NOT APPLICABLE | vGATE and vPOS source code (and binaries) at time of build | Installation | not signed |

SECURITY NOTE

If a hacker breaks into a merchant's site, many security compromises are possible. It is not clear how many measures we can take to prevent malfeasance once the site is compromised. One attack that is possible in this situation is to replace components of the certificate hierarchy so that the merchant is sending data (securely) to a recipient who is not the bank. This is the reason we have the CA root key hard-wired into the software. In order for this attack to succeed, the attacker must alter the vPOS executable. It is my position that this is the most we can reasonably do (short of hardware crypto.)

KEY IGNITION

Key ignition is the process of decrypting sensitive keying material and loading it into a process space. Both vPOS and vGATE will require two private components to be loaded into memory via this key ignition procedure. Both vPOS and vGATE have a persistent process which either calls down onto PCL or spawns a process which calls down onto PCL. In this process, three global variables should be defined:

unsigned char sz_password[MAXPASSWORDLEN];
  CPCLKey *SigPrivComp=NULL;
  CPCLKey *EncPrivComp=NULL;

Shortly after the persistent process boots up, the password should be passed into the process (via a UI prompt) and assigned to the sz_password variable. Before processing any transactions, the persistent process should execute the following code fragment precisely once:

```
int sig_retval, enc_retval;
    //Caller is responsible for deleting SigPrivComp and
EncPrivComp
    si_retval = IgniteSigKey(&SigPrivComp, sz_password);
    enc_retval = IgniteEncKey(&EncPrivComp, sz_password);
    memset(sz_password, NULL, MAXPASSWORDLEN);
```

It should be obvious from context that the implementation of IgniteSigKey and IgniteEncKey are implementable using constructors for CPCLKey and the routine FetchPrivateComponent mentioned above. The return values must be checked, if non-zero the caller must report the failure and shut down the process. Failure modes include: failure to find file, failure to read file, failure to decrypt data, and wrong password.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for certifying a party in communication with an application resident on a first computer, said first computer in communication with a second computer with a certification authority resident thereon, said first and second computers coupled by a network, comprising the steps of:

(a) creating a name-value pair for certification processing on said first computer;
  (b) transmitting a message containing said name-value pair to said certification authority on said second computer;

(c) transmitting other certification information, including identity information, from said first computer to said certification authority on said second computer; and (d) creating a certificate comprising said name-value pair and said other certification information by said certification authority on said second computer.

2. The method as recited in claim 1, in which said certification information is formatted in conformance with a Public-Key Cryptography Standard.

3. The method as recited in claim 1, wherein a browser is used to transmit and receive messages from said network.

4. The method as recited in claim 1, including the step of storing said name-value pair in a secure storage at said first computer.

5. The method as recited in claim 1, including the step of transmitting said certificate to said application resident on said first computer utilizing said network.

6. The method as recited in claim 1, wherein said network is a public network.

7. The method as recited in claim 1, including the step of storing certification authority rules at said second computer and tailoring said certification authority rules based on said other certification information transmitted by an administrative function resident on a third computer.

8. Apparatus for certifying a party in communication with an application resident on a first computer, said first computer in communication with a second computer with a certification authority resident thereon, said second computer in communication with a third computer utilizing an administrative function resident thereon, said first, second and third computers connected by a network, comprising:

(a) first computer software that is resident in said first computer and creates a name-value pair for certification processing on said first computer;

(b) second computer software that is resident in said first computer and transmits said name-value pair to said administrative function on said third computer for routing to said certification authority on said second computer;

(c) third computer software that is resident in said third computer and transmits other certification information from said administrative function to said certification authority on said second computer; and (d) fourth computer software that is resident in said second computer and creates a certificate comprising said name-value pair and said other certification information by said certification authority on said second computer.

9. The apparatus as recited in claim 8, in which said certification information is formatted in conformance with a Public-Key Cryptography Standard.

10. The apparatus as recited in claim 8, wherein a browser is used to transmit and receive messages from said network.

11. The apparatus as recited in claim 8, including a storage in which said name-value pair is securely deposited at said first computer.

12. The apparatus as recited in claim 8, including communication software that transmits said certificate to said application resident on said first computer utilizing said network.

13. The apparatus as recited in claim 8, wherein said network is a public network.

14. The apparatus as recited in claim 8, including certification authority rules stored at said second computer and tailored based on said certification information transmitted by said administrative function resident on said third computer.

15. A computer program embodied on a computer-readable medium for certifying a party in communication with an application resident on a first computer, said first computer in communication with a second computer with a certification authority resident thereon, said second computer in communication with a third computer utilizing an administrative function resident thereon, said first, second and third computers connected by a network, comprising:

(a) first computer software that is resident in said first computer and creates a name-value pair for certification processing on said first computer;

(b) second computer software that is resident in said first computer and transmits said name-value pair to said administrative function on said third computer for routing to said certification authority on said second computer;

(c) third computer software that is resident in said third computer and transmits other certification information from said administrative function to said certification authority on said second computer; and (d) fourth computer software that is resident in said second computer and creates a certificate comprising said name-value pair and said other certification information by said certification authority on said second computer.

16. The computer program as recited in claim 15, in which said certification information if formatted in conformance with a Public-Key Cryptography Standard.

17. The computer program as recited in claim 15, wherein a browser is used to transmit and receive messages from said network.

18. The computer program as recited in claim 15, including a storage in which said name-value pair is securely deposited at said first computer.

19. The computer program as recited in claim 15, including communication software that transmits said certificate to said application resident on said first computer utilizing said network.

20. The computer program as recited in claim 15, wherein said network is a public network.

21. The computer program as recited in claim 15, including certification authority rules stored at said second computer and tailored based on said certification information transmitted by said administrative function resident on said third computer.

* * * * *